United States Patent [19]

Ichikawa et al.

[11] Patent Number: 4,970,538

[45] Date of Patent: Nov. 13, 1990

[54] CAMERA SYSTEM WITH FLASH DEVICE

[75] Inventors: Tsutomu Ichikawa; Masayuki Yoshii; Norio Ishikawa; Akihiko Fujino; Masayuki Nakasa; Mashio Kitaura; Kenji Tsuji, all of Osaka, Japan

[73] Assignee: Minolta Camera Kabushiki Kaisha, Osaka, Japan

[21] Appl. No.: 491,688

[22] Filed: Mar. 9, 1990

Related U.S. Application Data

[62] Division of Ser. No. 352,494, May 16, 1989.

[30] Foreign Application Priority Data

| May 17, 1988 | [JP] | Japan | 63-119682 |
| May 17, 1988 | [JP] | Japan | 63-119683 |
| May 17, 1988 | [JP] | Japan | 63-119686 |
| May 17, 1988 | [JP] | Japan | 63-119687 |

[51] Int. Cl.$^5$ ............................................. G03B 15/05
[52] U.S. Cl. ............................................. 354/145.1
[58] Field of Search ............................... 354/145.1, 147

[56] References Cited

U.S. PATENT DOCUMENTS 4,363,542  12/1982  Kondo et al. ..................... 354/31

FOREIGN PATENT DOCUMENTS 55-175124  12/1980  Japan .
63-106734   5/1988  Japan .
1-266519   10/1989  Japan .

Primary Examiner—Michael L. Gellner
Attorney, Agent, or Firm—Burns, Doane, Swecker & Mathis

[57] ABSTRACT

A camera comprising a flash unit attachable to a camera body, a switching device and a control device. The flash unit includes a light emitter switchable between an emission permit state in which the light emitter is projected from a body of the flash device and an emission prohibit state in which the light emitter is retracted into the body. The flash unit further includes a control circuit for selectively placing the light emitter in the emission permit state and the emission prohibit state. A main switch is provided in the camera body to be switchable between a position for permitting a camera operation and a position for prohibiting the camera operation. When the light emitter is placed in the emission permit state when the main switch is switched to the position for permitting the camera operation.

11 Claims, 38 Drawing Sheets

FIG.25B    FIG.25A    FIG.25C
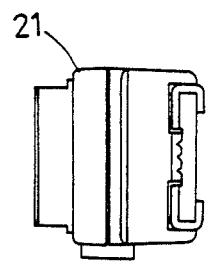
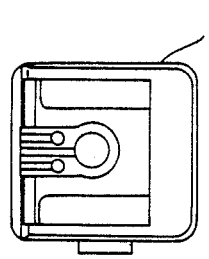
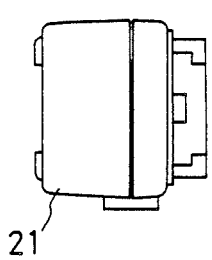
FIG.25D
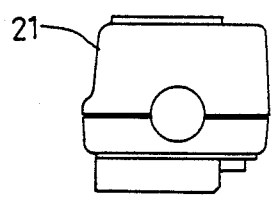
FIG.25E
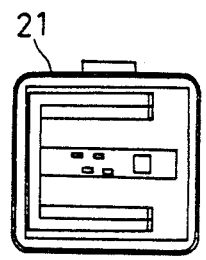

FIG.26B   FIG.26A
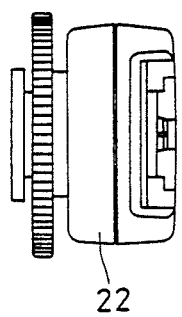
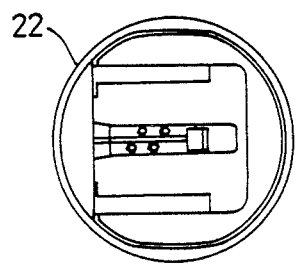
FIG.26C
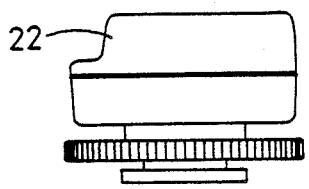
FIG.26D
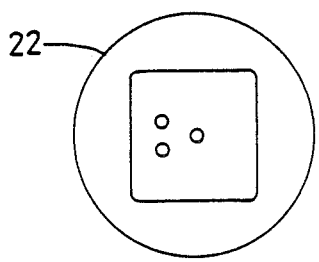
FIG.27
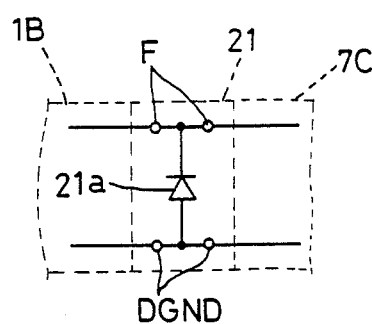

CAMERA SYSTEM WITH FLASH DEVICE

This application is a division of application Ser. No. 352,494, filed May 16, 1989.

BACKGROUND OF THE INVENTION

1. Field of the Invention

The present invention relates to a camera system having a flash device, and more particularly to a technique of controlling the flash device from a camera body.

2. Description of the Prior Art

In a known camera system having a flash device, the flash device has a light emitter projectable from and retractable into a flash body built in the camera body. Moreover, the flash device is switchable between an operable state with the light emitter projecting from the flash body and an inoperable state with the light emitter contained in the flash body. The camera system includes an operating mechanism for switching the flash device between the two states, and a starter switch for switching between an operation prohibiting state and an operation permitting state.

In the camera system noted above, the operating mechanism for switching the flash device between the two states is controlled by the following constructions:

(I) A manually operable switch is provided with a control device for detecting the operation of this switch and actuating the above-mentioned operating mechanism. The control device includes a lock mechanism for holding the light emitter in the retracting position which is urged to the projecting position. The lock mechanism is released when the switch is turned on.

(II) A metering device is provided for detecting brightness of a photographic object. The operating mechanism is automatically operable in response to results of metering by the metering device. The flash device is switched to the operable state when the metering device provides a low luminance detection signal, and is maintained in the inoperable state at other times.

The above constructions have the following disadvantages:

The construction (I) requires the switch specially for switching the flash device. The photographer could forget to operate this switch. If its operation is forgotten when a photographic object has a low luminance level requiring flash light, a photograph with correct exposure cannot be taken at a desired shutter chance.

In the construction (II), the operating mechanism is automatically operable in response to the luminance of the object detected by the metering device. The light emitter is in the operable position whenever the luminance of the object is below a predetermined level, which is free from the problem occurring with the construction (I). With cameras in general, the release button for starting a shutter release operation often has an additional function to start the metering operation before the shutter release operation for an intensive overall operation. In this case, the flash device is switched to the operable state in response to results of metering by the metering operation. A shutter release operation for flash photography cannot be started during the time taken for this switching. Because of this time lag, a momentary shutter chance may escape.

In another known camera system with a flash device, the camera body and the flash device detachably attached to the camera body include synchronizing contacts for transmitting an emission start signal output with an operation of a synchronizing switch in the camera body to the flash device, and charge controlling contacts for transmitting a charge control signal to a capacitor in the flash device for accumulating emission energy. Not only start of emission of the flash device but energy accumulation for the emission is controlled from the camera body.

In this type of camera, the synchronizing contacts and charge controlling contacts comprise separate contacts in the camera body and flash device, respectively, since these contacts transmit the different signals.

The separate synchronizing contacts and charge controlling contacts result in an increase in the number of parts of such a camera. The camera body generally includes a hot shoe while the flash device includes a foot, for attaching the flash device to the camera body. In this case, the separate contacts as noted above result in an increase in the number of contacts arranged in limited regions of the hot shoe and foot. This gives rise to the problem of spatial restriction to the arrangement of the contacts and the like.

In recent years particularly, various operations of the flash device are often controlled by a control device in the camera body to achieve an intensive overall operation. Such controls include not only the emission of and energy accumulation in the flash device, but control of an amount of light emission from the flash device based on flash light measured by the camera body, and control of an illuminating angle of the flash device in accordance with the focal length of an objective lens attached to the camera body. In this case, the above-mentioned problem is striking since the camera body and flash device must include contacts for transmitting various signals.

In a further known camera system with a flash device, the flash device includes a control circuit for controlling an overall operation of the flash device, and a boosting and flashing circuit. Depending on the type of flash device, these control circuit and the boosting and flashing circuit are operable with a voltage above ground level or with a voltage below ground level.

Assume here that a flash device having a control circuit and a boosting and flashing circuit operable with a voltage below ground level is attached to a camera body designed for attaching a flash device having a control circuit and a boosting and flashing circuit operable with a voltage above ground level. In this case, a voltage reverse to normal will act between the synchronizing terminal and the grounding terminal of the camera body, which results in malfunctioning of the camera.

A known measure taken to avoid this reverse voltage is connection of the synchronizing terminal and the grounding terminal through a diode. However, the camera body and the flash unit are often sold as a system, with the two items designed in matching relationship. In this case, the construction for preventing the reverse voltage would increase the cost of the camera body.

SUMMARY OF THE INVENTION

Having regard to the state of the art noted above, a first object of the present invention is to provide a camera system allowing the photographer to carry out flash photography without forgetting to switch for a flash and without missing a shutter chance.

A second object of the invention is to provide a camera system requiring a reduced number of contacts included in the camera body and flash device for transmitting signals therebetween.

A third object of the invention is to provide a camera system capable of preventing a reverse voltage without increasing the cost of the camera body.

The first object of the present invention is fulfilled, according to the present invention, by a camera system comprising flashing means including a light emitter switchable between an emission permit state in which the light emitter is projected from a body of the flash device and an emission prohibit state in which the light emitter is retracted into the body, and operating means for selectively placing the light emitter in the emission permit state and the emission prohibit state; switching means switchable between a first state for permitting operation of the camera system operation and a second state for prohibiting operation of the camera system; and control means for controlling the operating means to place the light emitter in the emission permit state when the switching means is switched from the second state to the first state.

The above control means operates in response to switching of the switching means to the first state which actuates the camera system, for causing the operating means to pull up and place the light emitter in the emission permit state. Thus, the switching means for actuating the camera also acts as an operating device for switching the flashing means. This construction assures setting of the flashing means to the operable state with start of the camera system, which eliminates the possibility of the photographer forgetting the necessary operation under photographic conditions requiring a flash. Furthermore, this construction has the advantage of dispensing with a device intended exclusively for switching of the flashing device, which results in a reduced number of components.

In another aspect of the invention, there is provided a camera system having a flash device with a light emitter and a capacitor for accumulating energy necessary for emission from the light emitter, and a camera body to which the flash device is detachably attached. This camera system comprises a synchronizing switch for outputting a first signal to cause emission from the light emitter in response to completion of a leading blade run of a focal plane shutter; a contact disposed between the flash device and the camera body and connected to the synchronizing switch for communicating the first signal and a second signal for controlling charging of the capacitor to the flash device; charge prohibiting means for prohibiting the charging of the capacitor during an exposure control; and voltage applying means for applying a potential difference between opposite ends of the synchronizing switch for obtaining the first signal, from the flash device through the contact during the exposure control. This construction fulfills the second objects of the present invention noted hereinbefore for the following reason.

The second signal is transmitted before the exposure control, whereas the first signal is transmitted only during the exposure control. Taking note of the difference in timing between the two signals, the invention provided the singal contact for transmitting these signals. During the exposure control, the charge prohibiting means prevents the synchronizing switch from charging the capacitor of the flashing means for accumlating energy necessary for light emission. The voltage applying means enables detection of the operation of the synchronizing switch.

The third object of the present invention is fulfilled by a camera system comprising a first flash including a first control circuit for controlling operation thereof, and a first boosting and flashing circuit for boosting and flashing the first flash; a second flash including a second control circuit for controlling operation thereof, and a second boosting and flashing circuit for boosting and flashing the second flash, the second control circuit and the second boosting and flashing circuit being operable with an opposite voltage to the first control circuit and the first boosting and flashing circuit; a camera body to which only the second flash is connectable; an adapter attachable to the second flash to render the same connectable to the camera body, the adapter including a synchronizing signal transmission line for transmitting a synchronizing signal output from the camera body to the second flash, and a grounding line for interconnecting the camera body and a grounding terminal of the second flash; and reverse voltage preventing means disposed between the synchronizing signal transmission line and the grounding line of the adapter.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show a camera system including a camera body and a flash unit according to the present invention, in which:

FIG. 25A is a top plan view of a first adapter applied to the camera system shown in FIG. 23, FIG. 25B is a rear view of the first adapter, FIG. 25C is a front view of the first adapter, FIG. 25D is a left side view of the first adapter, FIG. 25E is a bottom view of the first adapter, FIG. 26A is a top plan view of a second adapter applied to the camera system shown in FIG. 24, FIG. 26B is a rear view of the second adapter, FIG. 26C is a left side view of the second adapter, FIG. 26E is a bottom view of the second adapter, FIG. 27 is a diagram of a circuit in the first adapter.

DESCRIPTION OF THE PREFERRED EMBODIMENTS

An embodiment of the present invention will be described hereinafter with reference to the drawings.

Figure 1B:
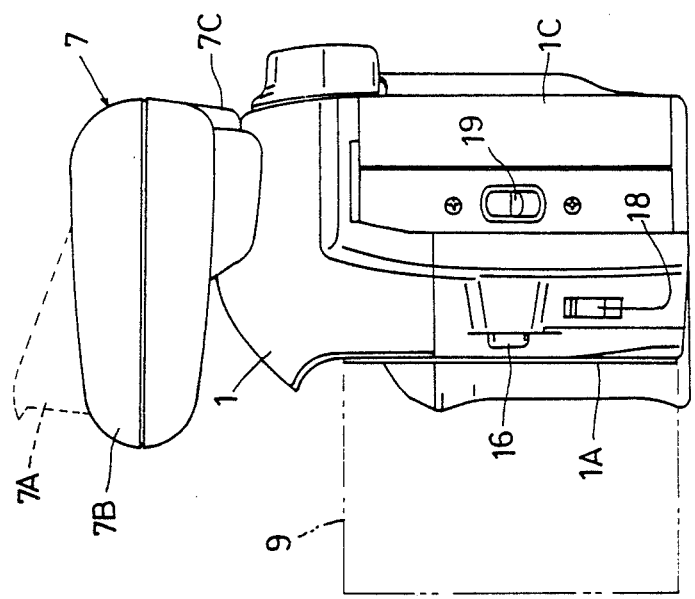
FIG. 1B is a side view of the camera system.
Figure 1A:
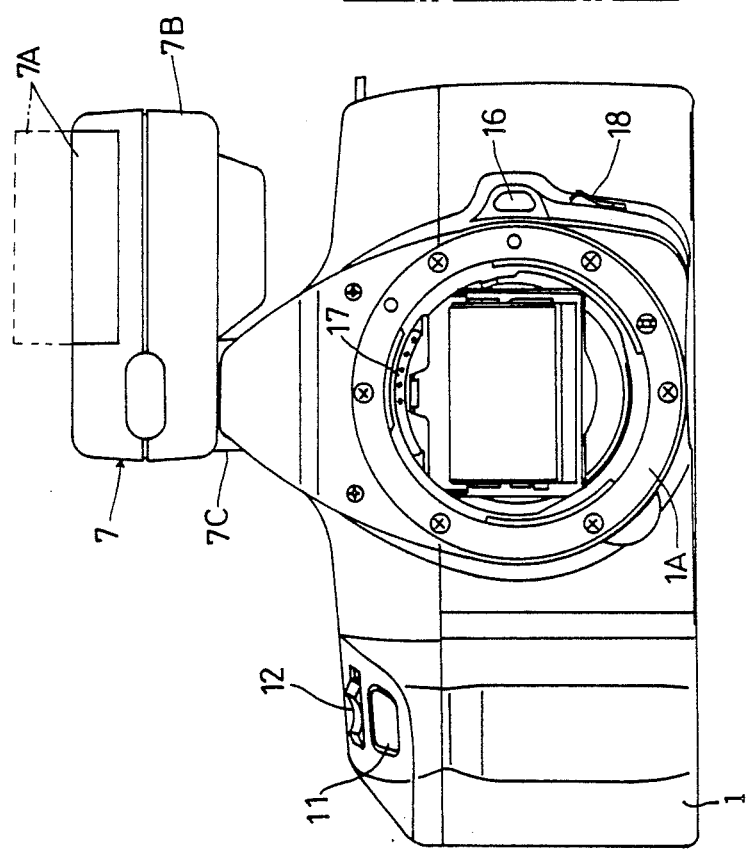
FIG. 1A is a front view of the camera system.
Figure 1C:
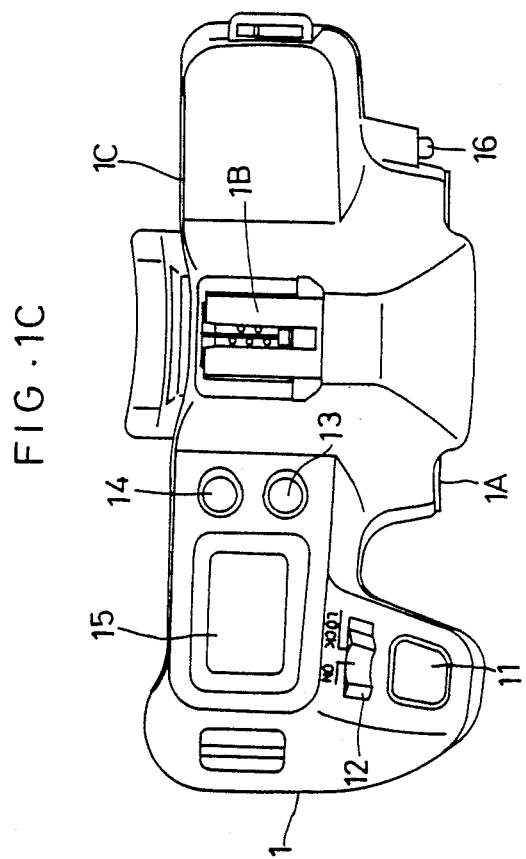
FIG. 1C is a top plan view of the camera body.

FIGS. 1A through 1C are schematic views of a camera system according to the present invention. This camera system comprises a camera body 1, an objective lens 9 removably attached to a lens mount 1A of the camera body 1, and a flash unit 7 removably attached to a hot shoe 1B of the camera body 1.

FIG. 1A shows the camera system without the objective lens 9 attached thereto, and FIG. 1C shows the camera system without the lens 9 and flash unit 7 attached thereto. Reference numeral 11 denotes a shutter release button for effecting a photo-taking action, and reference 12 denotes a main switch acting as a starter switch for switching the camera system between an operable state and an inoperable state. References 13 and 14 denote a pair of control keys for switching a camera operation, in which the control key 13 is a mode selector key and the control key 14 a self-timer key. Reference 15 denotes a panel for displaying operating modes selected by the pair of control keys 13 and 14, film counts and the like. Reference 16 denotes a lens change button for detaching the objective lens 9 from the lens mount 1A. Reference 17 denotes a group of contacts for communicating signals with the objective lens 9 attached to the lens mount 1A. Reference 18 denotes a focusing mode selector lever for switching the focusing mode between an automatic focusing mode and a manual focusing mode. Reference 19 denotes a back-cover release lever for releasing a back cover 1C. Although not shown, a halfway rewind switch is disposed on a bottom face of the camera body 1 for rewinding a film advanced halfway.

Figure 2A:
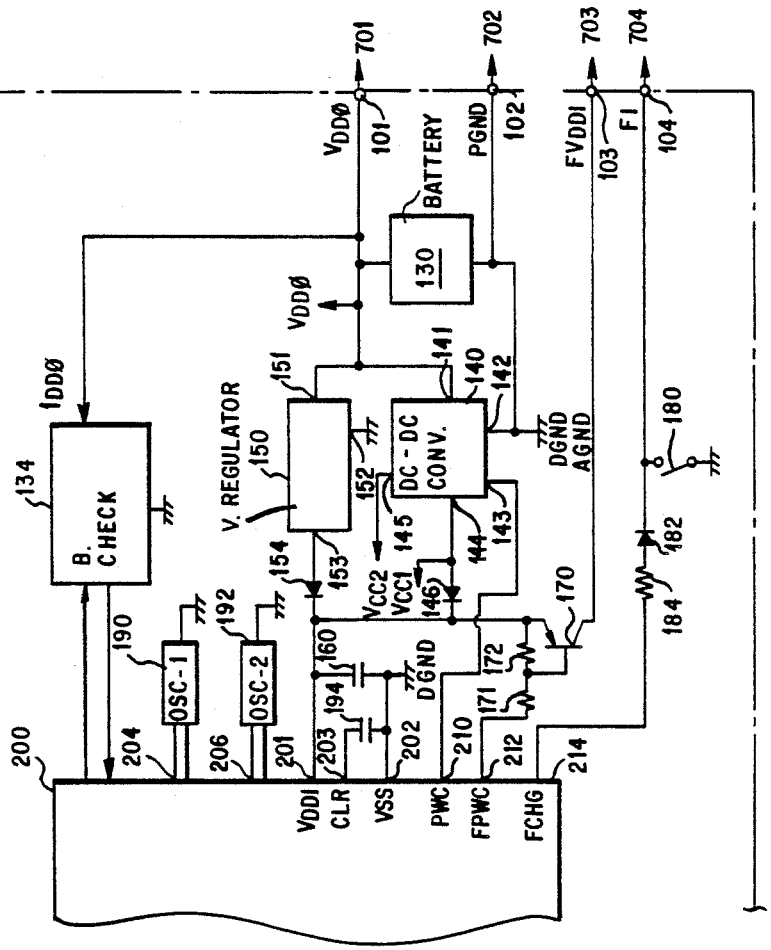
FIGS. 2A and 2B are a diagram showing a control circuitry of the camera body.
Figure 2A:
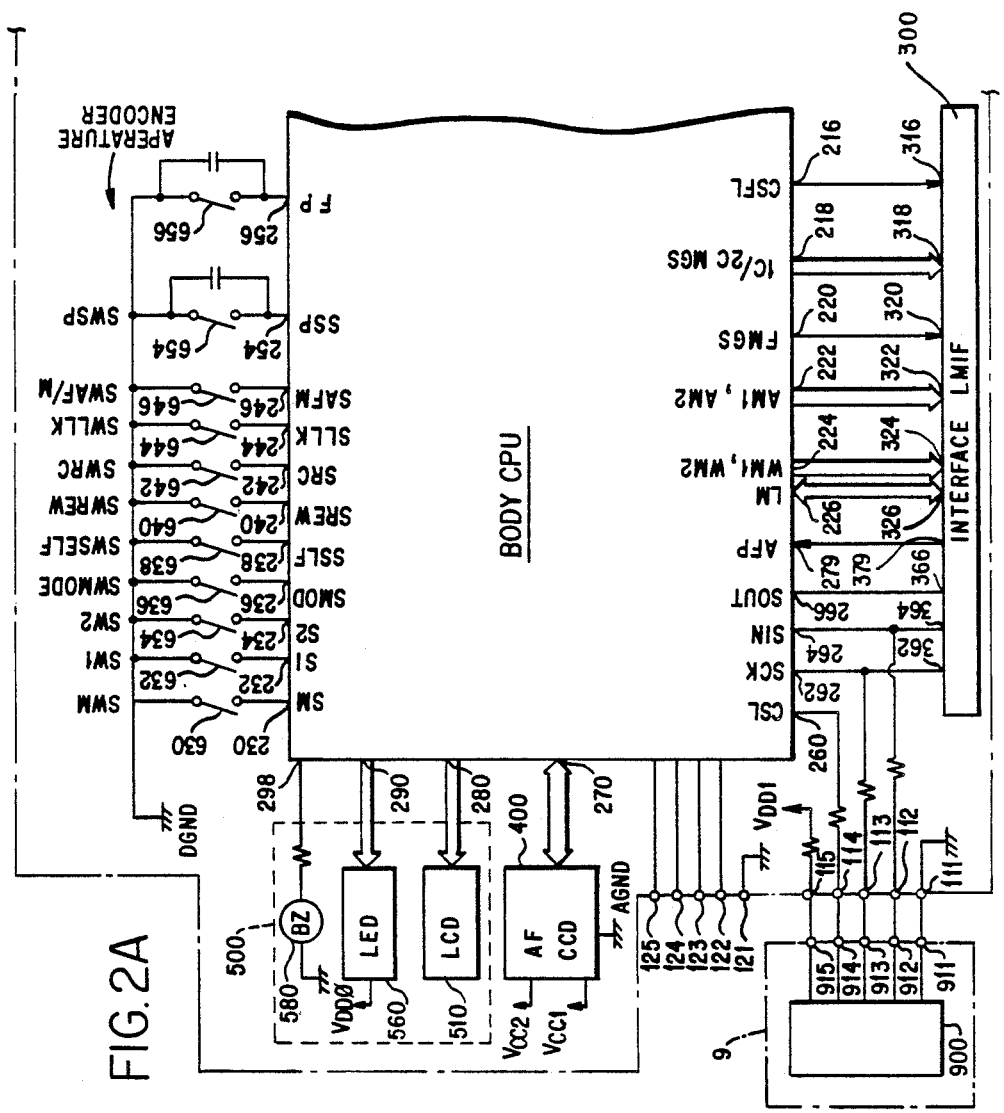
Figure 2B:
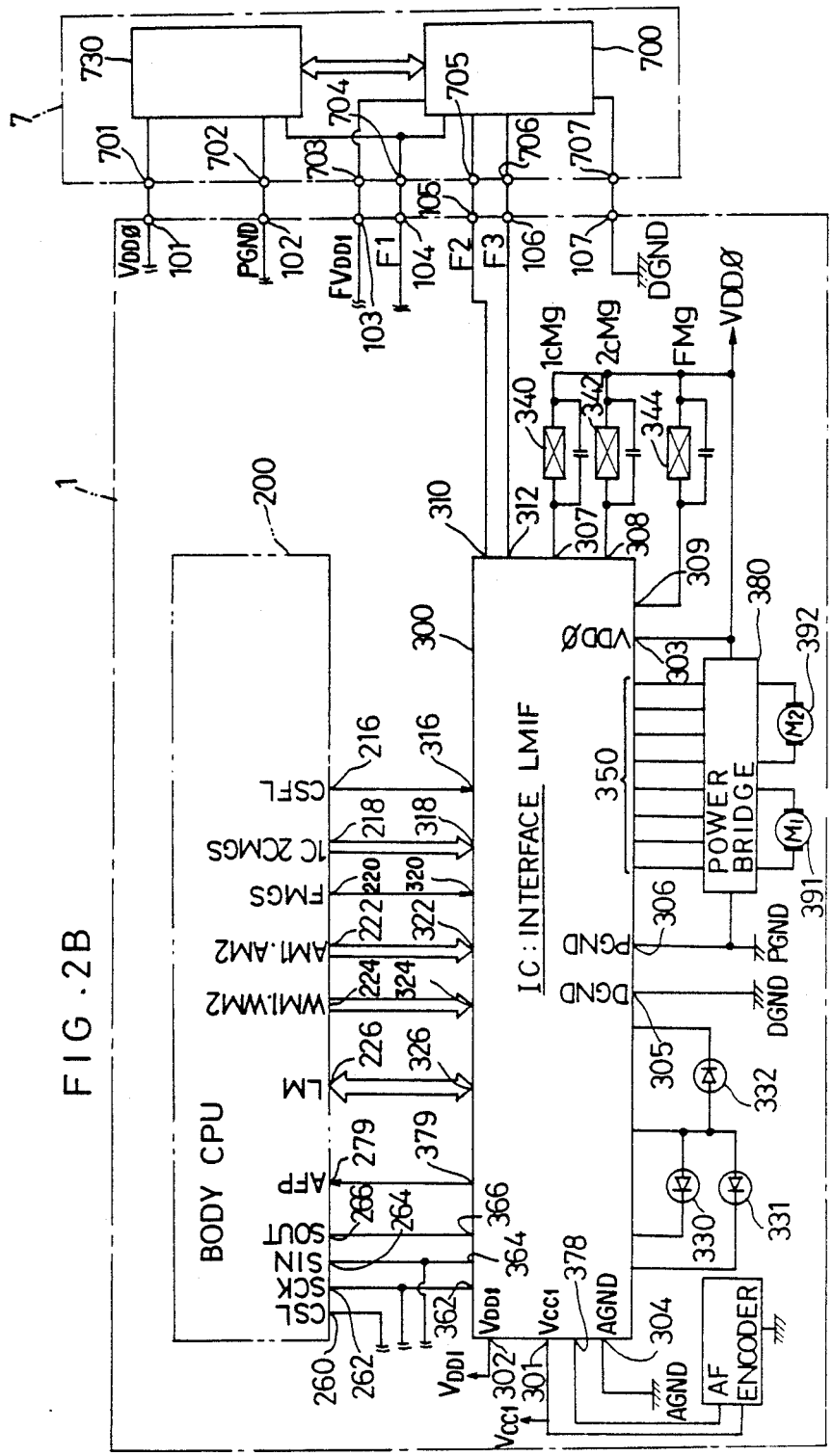

FIGS. 2A and 2B show an electric circuitry contained in the camera body 1 according to the present invention, in which the objective lens 9 and flash unit 7 are also shown.

Reference 200 denotes a CPU mounted in the camera body 1 (hereinafter referred to as to body CPU) for controlling an overall camera operation, i.e. controlling the flash unit 7 as well as various devices in the camera body 1. In other words, the body CPU 200 controls a metering operation, an autofocusing operation, a shutter releasing operation and a flashing operation, and communicates data with the flash unit 7 and objective lens 9.

Reference 700 denotes a control circuit mounted in the flash unit 7 and including a CPU as a main component thereof for controlling the flashing operation (hereinafter referred to as the flash CPU). Reference 900 denotes a lens circuit mounted in the objective lens 9 for storing various lens information relating to the particular lens 9 such as an open f-value and a focal length.

The camera body 1 includes an interface circuit (hereinafter referred to as LMIF) 300, a focus detecting circuit 400 and a displaying and warning circuit 500.

The flash unit 7 also includes a boosting and flashing circuit 730 described later.

Reference 130 denotes a source battery removably mounted in the camera body 1 for supplying power to the LMIF 300, focus detecting circuit 400 and displaying and warning circuit 500 as well as various motors, magnets and so on which will be described later. Reference 134 denotes a battery checking circuit for checking the voltage level of the source battery 130. As will be described later, the source battery 130 supplies power also to the flash unit 7, which is designed specially for use with this camera body. The battery checking circuit 134 has different criteria for checking voltage levels with and without the special flash unit 7.

Reference 140 denotes a DC-DC converter which receivers a control signal from an output terminal 210 of the body CPU 200. The DC-DC converter 140 is active when the control signal PWC is in low level, to boost the output of the source battery 130 applied between an input terminal 141 and a grounding terminal 142 and provide 5.5 V and 13 V outputs from a pair of output terminals 144 and 145, respectively. Reference 150 denotes a voltage regulator for receiving a fluctuating voltage applied between an input teminal 151 and a grounding terminal 152 from the source battery 130, and providing a stabilized 3.3 V output from an output terminal 153.

Reference 160 denotes a backup capacitor for the body CPU 200. The backup capacitor 160 normally is charged with the output of the voltage regulator 150 to maintain a potential of about 2.7 V when the source battery 130 is loaded in the camera body 1 and the body CPU 200 and DC-DC converter 140 are inactive. When the body CPU 200 is started and the DC-DC converter 140 begins a boosting operation, the backup capacitor 160 is charged up to about 5 V with the output of the DC-DC converter 140 through a diode 146. As will be described in detail later, the body CPU 200 and DC-DC converter 140 are inactive while a charging and boosting operation is taking place in the flash unit 7. During this period which is about 400 ms, the power supply from the DC-DC converter 140 is stopped and the body CPU 200 is supplied with power resulting from the charge maintained in the backup capacitor 160. The diode 146 disposed downstream of the DC-DC converter 140 and a diode 154 disposed downstream of the voltage regulator 150 prevent backflows when power is supplied from the capacitor 160 to the body CPU 200.

Reference 194 denotes a reset capacitor for the body CPU 200. The reset capacitor 194 initializes the body CPU 200 by outputting a reset signal to a reset terminal 203 of the body CPU 200 when the source battery 130 is loaded into the camera body 1. Reference 201 denotes a source terminal of the body CPU 200. Reference 202 denotes a grounding terminal of the body CPU 200.

Reference 190 denotes a high-speed clock oscillator circuit for outputting an 8.38 MHz high-speed clock signal to an input terminal 204 of the body CPU 200. Reference 192 denotes a low-speed clock oscillator circuit for outputting a 32.768 KHz low-speed clock signal to an input terminal 206 of the body CPU 200.

With this camera, the flash unit 7 has a lightweight construction which is achieved by supplying power to the flash unit 7 from the source battery 130 in the camera body 1. As will be described in detail later, the boosting and flashing circuit 730 of the flash unit 7 is powered directly from the source battery 130, whereas the control circuit 700 of the flash unit 7 is powered from the DC-DC converter 140 and voltage regulator 150. Reference 170 denotes a PNP transistor acting as a switching element for controlling the power supply to the control circuit 700 of the flash unit 7. The PNP transistor 170 becomes active when a control signal FPWC output from an output terminal 212 of the body CPU 200 is in low level, to supply the power to the control circuit 700, and stops the power supply when the control signal FPWC changes to high level.

Reference 214 denotes an ouput terminal for outputting a control signal FCHG to control the boosting and flashing circuit 730. The control signal FCHG, when in high level, actuates a booster circuit included in the boosting and flashing circuit 730 and, when in low level, stops the operation of the booster circuit. An X-contact switch 180 is connected to the signal line through which the control signal FCHG is transmitted.

The X-contact switch 180 is mechanically closable with completion of a run of the leading blade of a focal plane shutter (not shown). A switching signal thereof is transmitted to the control circuit 700 of the flash unit 7. The X-contact switch 180 is opened in interlocked relationship with charging of the focal plane shutter taking place after a shutter releasing operation.

Reference 216 denotes an output terminal for outputting a flash select signal CSFL to an input terminal 316 of LMIF 300. The flash select signal CSFL is in low level when the body CPU 200 makes a serial communication with the control unit 700 of the flash unit 7.

Reference 218 denotes a group of output terminals for outputting control signals 1c/2cMGS to a group of input terminals 318 of LMIF 300 for controlling a pair of shutter magnets 340 and 342 to drive the leading and trailing blades of the focal plane shutter. Reference 220 denotes an output terminal for outputting a control signal FMGS to an input terminal 320 of LMIF 300 for controlling an aperture magnet 344 to drive an aperture diaphragm. Reference 222 denotes a group of output terminals for outputting control signals AM1 and AM2 to a group of input terminals 322 of LMIF 300 for controlling an autofocusing motor (hereinafter referred to as the AF motor) 392. Reference 224 denotes a group of output terminals for outputting control signals WM1 and WM2 to a group of input terminals 324 of LMIF 300 for controlling a winding motor 391 to wind and rewind a film.

Reference 226 denotes a group of input/output terminals for outputting control signals to a group of input/output terminals 326 of LMIF 300 for controlling a metering circuit, and receiving metering signals provided by the metering circuit through the terminals 326. References 330 and 331 denote a pair of light receivers (photocells) for metering ambient light by a divided brightness metering method. Reference 332 denotes a light receiver for metering the flash light.

Reference 370 denotes an AF encoder circuit for detecting the position of a focusing lens component of the objective lens 9 and outputting the resulting detection signal to an input terminal 378 of LMIF 300 for enabling the autofocusing operation. This detection signal is input through an output terminal 379 of LMIF 300 to an input terminal 279 of the body CPU 200.

Reference 301 denotes a power source terminal of LMIF 300 for driving an analog circuit therein. Reference 302 denotes a power source terminal of LMIF 300 for driving a logic circuit therein. Reference 303 denotes a power source terminal of LMIF 300 for driving a power circuit therein, which is powered along with the pair of shutter magnet 340 and 342, the aperture magnet 344, and a bridge circuit 380 for driving the pair of motors 391 and 392. Reference 304 denotes an analog circuit grounding terminal of LMIF 300. Reference 305 denotes a logic circuit grounding terminal of LMIF 300. Reference 306 denotes a power circuit grounding terminal of LMIF 300.

Reference 307 denotes an output terminal connected to the shutter magnet 340 for driving the leading blade of the focal plane shutter. Reference 308 denotes an output terminal connected to the shutter magnet 342 for driving the trailing blade of the focal plane shutter. Reference 309 denotes an output terminal connected to the aperture magnet 344. Reference 350 denotes output terminals connected to the bridge circuit 380 for driving the pair of motors 391 and 392.

Reference 310 denotes a data input/output terminal for making the serial communication with the control circuit 700 of the flash unit 7. Reference 312 denotes an output terminal for outputting a clock signal during the serial communication.

Reference 260 denotes an output terminal for outputting a lens select signal CSL to the lens circuit 900. The lens select signal CSL becomes low level when the body CPU 200 makes a serial communication with the lens circuit 900 as will be described later.

Reference 262 denotes an output terminal for outputting a serial communication clock signal of 65.536 KHz, for example, divided from the 3.38 MHz highspeed clock signal when making the serial communications with the lens circuit 900 and the control circuit 700 of the flash unit 7. This clock signal is transmitted to the lens circuit 900 during the serial communication with the lens circuit 900. During the serial communication with the control circuit 700 of the flash unit 7, on the other hand, the clock signal is input to an input terminal 362 of LMIF 300 and output from the output terminal 312 of LMIF 300.

Reference 264 denotes an input terminal for receiving data during the serial communications with the lens circuit 900 and the control circuit 700. During the serial communication with the lens circuit 900, lens information data are input directly to the input terminal 264. During the serial communication with the control circuit 700, flash information data are input to the input/output terminal 310 of LMIF 300 and output from an output terminal 364 of LMIF 300 to this input terminal 264.

Reference 266 denotes an output terminal for outputting camera body information data during the serial communication with the control circuit 700. The data are input to an input terminal 366 of LMIF 300 and output from the input/output terminal 310 of LMIF 300 to the control circuit 700.

References 101 to 107 denote a group of contacts arranged on the hot shoe 1B of the camera body 1. When the flash unit 7 is attached to the hot shoe 1B, these contacts 101 to 107 are connected for data communication with a group of contact 701 to 707 arranged on a foot 7C of the flash unit 7. To explain combinations of these contacts by pairs, contacts 101 and 701 constitute a positive power supply contact pair VDDO for charging a main capacitor provided in the boosting and flashing circuit 730, and contacts 102 and 702 a negative power supply contact pair PGND for grounding the boosting and flashing circuit 730. Contacts 103 and 703 constitute a power supply contact pair FVDD1 for the control circuit 700. Contacts 104 and 704 constitute a signal communicating contact pair F1 for transmitting the flash charging control signal FCHG and the switching signal from the X-contact switch 180. Contacts 105 and 705 constitute a data communicating contact pair F2 for the serial communication. Contacts 106 and 706 constitute a clock signal communicating contact pair F3 for the serial communication. Contacts 107 and 707 constitute a contact pair DGND for grounding the control circuit 700.

Reference 111 to 115 denote the group of contacts (referenced 17 in FIG. 1A) arranged inside the lens mount 1A of the camera body 1. When the objective lens 9 is attached to the lens mount 1A, these contacts 111 to 115 are connected for data communication with a group of contact 911 to 915 arranged in the lens 9. To explain combinations of these contacts by pairs, contacts 111 and 911 constitute a contact pair for grounding the lens circuit 900. Contacts 112 and 912 constitute a signal communicating contact pair for transmitting data from the lens circuit 900 to the body CPU 200 during the serial communication therebetween. Contacts 113 and 913 constitute a clock signal communicating contact pair for transmitting the clock signal from the body CPU 200 to the lens circuit 900 during the serial communication. Contacts 114 and 614 constitute a signal communicating contact pair for transmitting the lens select signal CSL during the serial communication. Contacts 115 and 915 constitute a contact pair for supplying power to the lens circuit 900.

References 121 to 125 denote a group of contacts for reading DX code arranged in a cartridge chamber, not shown, defined in the camera body 1. These contacts 121 to 125 read film sensitivity information through contact with the DX code which are provided in the form of a combination between conductive and nonconductive parts on a peripheral surface of a film cartridge.

Reference 270 denotes a group of input/output terminals for communicating outputting a control signal to and receiving a detection signal from the focus detecting circuit 400.

Reference 280 denotes a group of output terminals for driving a liquid crystal display drive circuit 510 included in the displaying and warning circuit 500 to display various information on the display panel 15 defined on the top surface of the camera body 1. Reference 290 denotes a group of output terminals for driving an LED display circuit 560 included in the displaying and warning circuit 500 to display various information in a viewfinder. Reference 298 denotes an output terminal for driving a buzzer 480 included in the displaying and warning circuit 500.

Each of the switches operable through buttons and keys disposed at various positions of the camera body 1 has one end grounded and the other end pulled up inside the body CPU 200. Thus, signals indicative of opening and closing of these switches are input to the body CPU 200.

Reference 630 denotes a main switch SWM operable with a sliding movement of the main switch 12 disposed on the top surface of the camera body 1. A signal indicative of the state of the main switch 12 is input to an input terminal 230 of the body CPU 200.

Reference 632 denotes a metering switch SW1 closable with a first-step depression of the release button 11. A signal indicative of the state of the metering switch SW1 is input to an input terminal 232 of the body CPU 200. The closure of the metering switch 632 starts the metering and autofocusing operations. Reference 634 denotes a release switch SW2 closable with a second-step depression following the first-step depression of the release button 11. A signal indicative thereof is input to an input terminal 234 of the body CPU 200. The closure of this release switch 634 starts the shutter releasing operation.

Reference 636 denotes a photographic mode changeover switch (SWmode) closable with a depression of the mode selector key 13. A signal indicative of its state is input to an input terminal 236 of the body CPU 200. The photographic mode is changed every time this changeover switch 636 is closed. Reference 638 denotes a self-timer switch (SWself) closable with a depression of the self-timer key 14. A signal indicative of its state is input to an input terminal 238 of the body CPU 200. A change is effected between an ordinary mode and a self-timer mode every time this self-timer switch 638 is closed.

Reference 640 denotes a halfway rewind switch (SWrew) closable with a depression of the halfway rewind switch disposed on the bottom face of the camera body 1. Reference 642 denotes a back cover release switch (SWrc) openable with an operation of the back cover release lever 19 and closable with closure of the back cover. Reference 644 denotes a lens mount switch (SWllk) closable with an operation of the lens change button 16. Reference 646 denotes a focusing mode changeover switch (SWaf/m) closable with an operation of the focusing mode selector lever 18. Signals indicative of states of these switches 640, 642, 644 and 646 are input to terminals 240, 242, 244 and 246 of the body CPU 200, respectively.

Reference 654 denotes a sprocket signal generating switch (SWsp) operable with rotation of a sprocket, not shown, which is rotatable with film advance. Reference 656 denotes an aperture encoder signal generating switch SWfp operable with an operation of an aperture encoder, not shown, which is operable with an operation of the aperture diaphragm. Signals indicative of states of these switches 654 and 656 are input to input terminals 254 and 256 of the body CPU 200, respectively.

Figure 3:
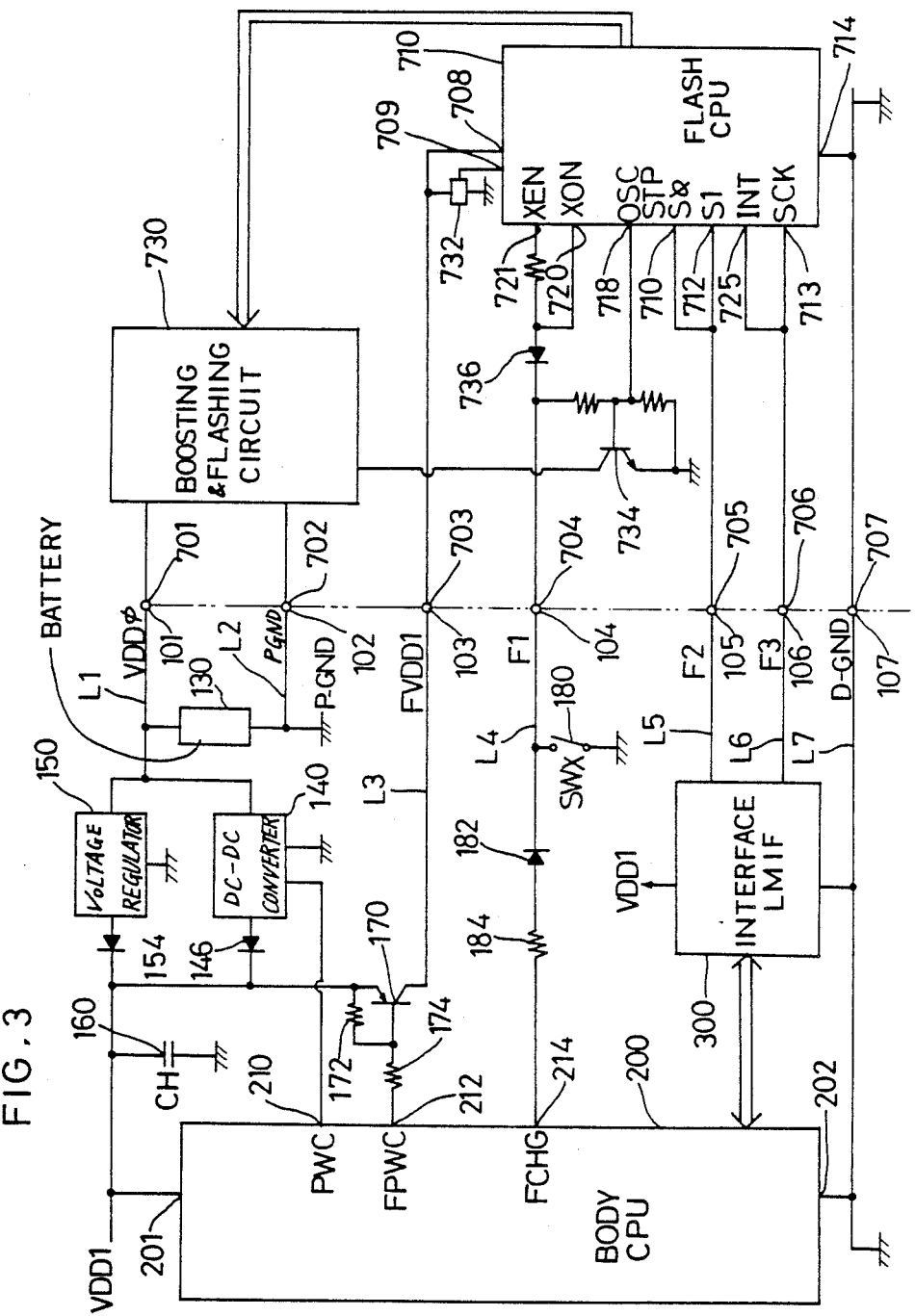
FIG. 3 is a diagram of a principal portion of the control circuitry.

The relationship between the body CPU 200 and the control circuit 700 of the flash unit 7 will be described further with reference to FIG. 3. In FIG. 3, like parts already described with reference to FIGS. 2A and 2B are labeled with like reference numerals, which parts will be described further as necessary.

As noted hereinbefore, the flash unit 7 is powered by the source battery 130 in the camera body 1. The boosting and flashing circuit 730 in the flash unit 7 is powered by the source battery 130 directly through power supply lines L1 and L2.

It is conceivable, therefore, that a great power consumption occurring during the power supply to the boosting and flashing circuit 730 may result in the power application to the body CPU 200 falling below a minimum operating voltage. To cope with such a situation, the backup capacitor 160 and the pair of diodes 146 and 154, as described hereinbefore, act in combination as a charge holding circuit for supplying power from the capacitor 160 to the body CPU 200 during the power supply to the boosting and flashing circuit 730.

During the power supply to the boosting and flashing circuit 730, the body CPU 200 is in a low-speed clock mode which consumes little power. In the low-speed state the body CPU 200 is inactive or sleeping (halt state), and is operable by the 32.768 KHz clock signal output as a system clock for processing from the low-speed clock oscillator circuit 192. In this state the body CPU 200 is operable in a normal way by a voltage application ranging from 2.5 to 5.5 V.

The body CPU 200 is operable in another mode which is a high-speed clock mode with a greater power consumption than the low-speed clock mode. In this state, the high-speed clock oscillator circuit 190 transmits the 8.38 MHz clock signal as the system clock to the body CPU 200 for enabling the body CPU 200 to control a series of photographing operations at a required high speed following a startup. At this time, the body CPU 200 is operable in a normal way by a voltage application ranging from 4.5 to 5.5 V.

The body CPU 200 terminates the operation of the boosting and flashing circuit 730 upon lapse of a predetermined time. Then, after waiting for recovery of the source battery 130, the body CPU 200 actuates the DC-DC converter 140 for charging the backup capacitor 160 up to about 5 V and changes the operating mode to the high-speed clock mode. After that, the body CPU 200 judges the charge of the flashing capacitor from the serial communication with the flash unit 7. If the charging operation has not been completed (this state being hereinafter referred to as the charging incomplete state), the body CPU 200 actuates the boosting and flashing circuit 730 for the predetermined time again (this operation being hereinafter referred to as the flash charging). This operation is repeated until the charging operation of the flashing capacitor is completed (this state being hereinafter referred to as the charging completed state). By intermittently carrying out the flash charging in this way, the source battery 130, although shared by the body CPU 200 and the flash unit 7 and without having an increased capacity, allows the body CPU 200 and the flash unit 7 to operate as if in parallel.

The feature that every intermittent flash charging takes place for the predetermined time, can dispense with a voltage detecting circuit which is necessary where, for example, the source voltage for the body CPU 200 is always checked directly by hardware means and the flash charging is interrupted when the voltage falls below a reference level. According to the present invention, the intermittent flash charging is carried out by utilizing a timer included in the body CPU 200 as an essential part thereof. As a result, the control system of the present invention has a very simple construction with a reduced number of parts, thereby rendering the camera inexpensive.

The body CPU 200 judges the capacity of the source battery 130 through the battery checking circuit 134 while the flash charging is not taking place (the operation carried out during this period being hereinafter referred to as the control operation). Only when a sufficient capacity is available for the flash charging, the flash charging is repeated until the charge voltage reaches the charging completed state.

Figure 4A:
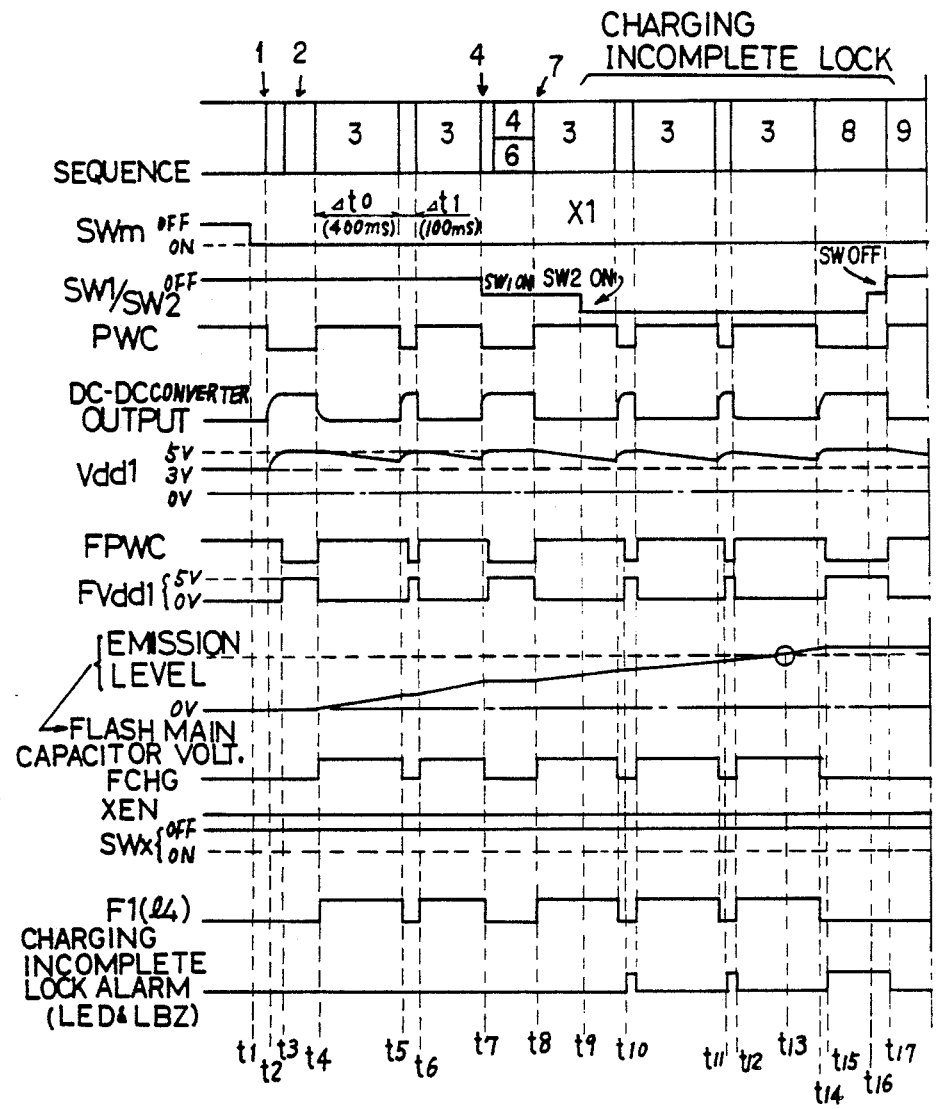
FIGS. 4A and 4B are a time chart illustrating an overall operation of the camera.
Figure 4B:
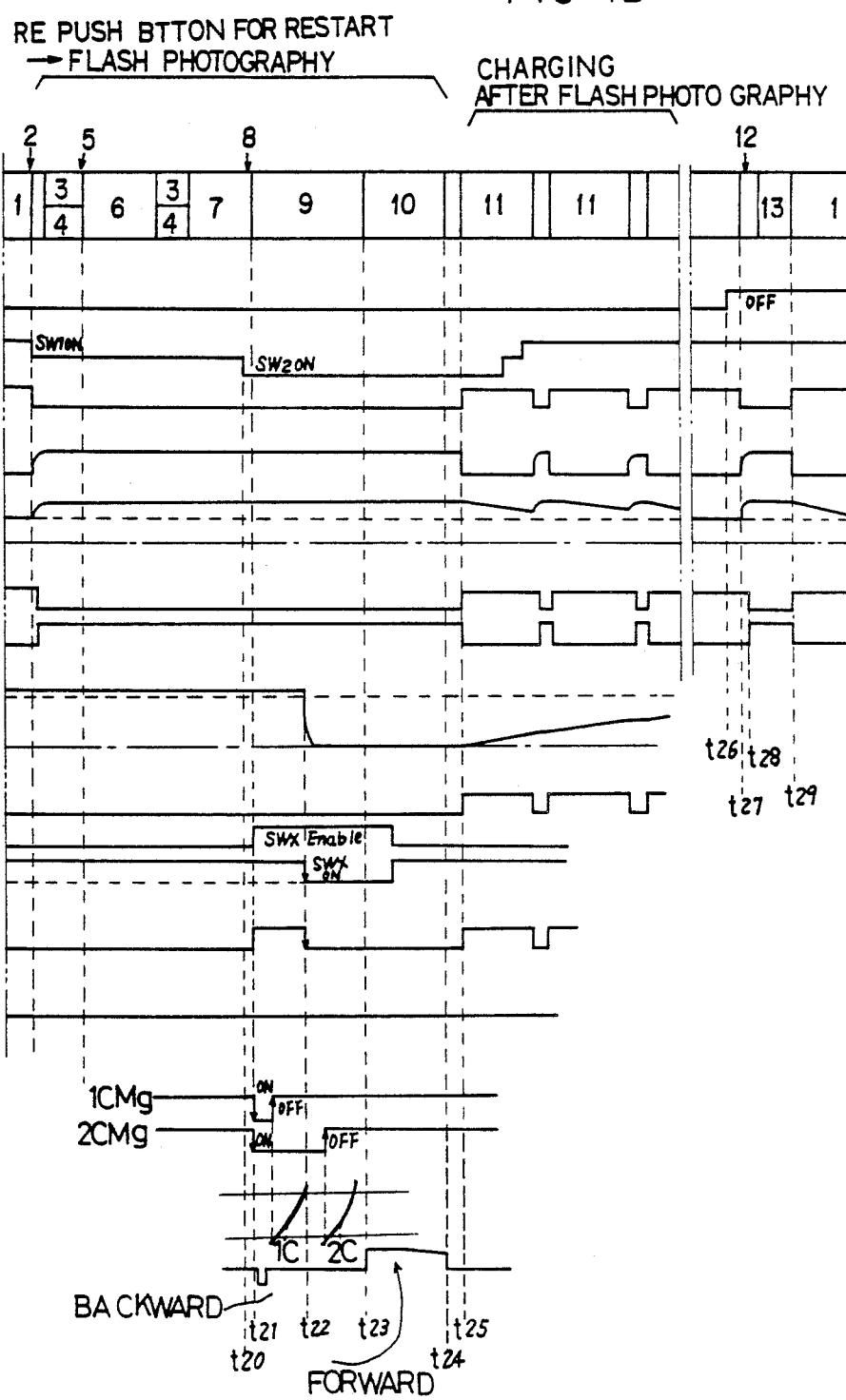
Figure 4C:
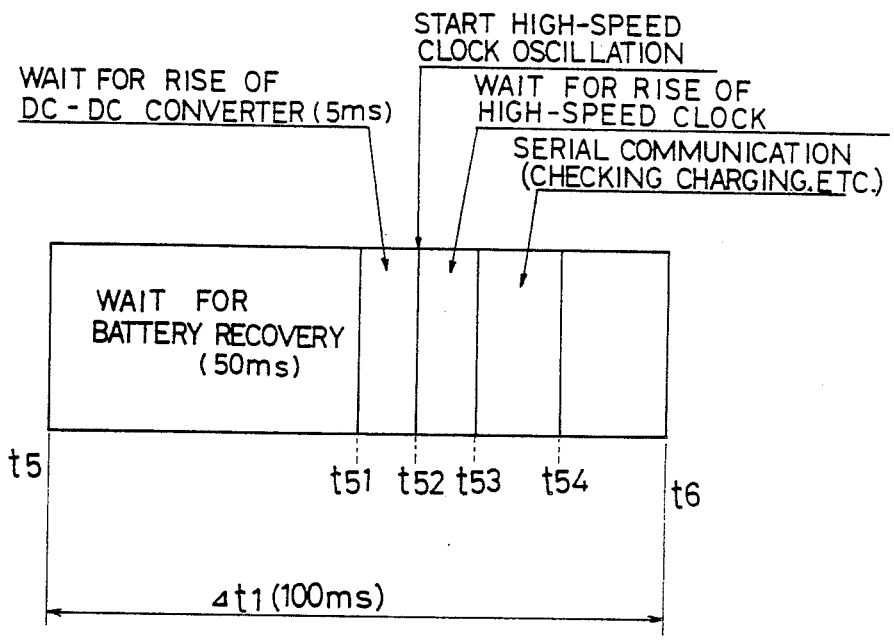
FIG. 4C is a partial time chart illustrating the operation of the camera.

The foregoing operation is described further with reference to the time charts shown in FIGS. 4A through 4C. As shown in FIGS. 4A and 4B, the flash charging takes place for 400 ms from a point of time t4 to a point of time t5. During this period the body CPU 200 is in the low-speed clock mode.

As shown in FIG. 4C, the body CPU 200 waits for recovery of the source battery 130 for 50 ms from the point of time t5 at which the flash charging is interrupted. The body CPU 200 changes the control signal PWC to low level for starting operation of the DC-DC converter 140 at a point of time t51. After waiting for a startup of the DC-DC converter 140 for 5 ms, the output of the high-speed clock signal is started at a point of time t52. After waiting for a rise of the high-speed clock signal for 2 ms, the system clock is switched to the high-speed clock at point of time t53 to establish the high-speed clock mode.

In the high-speed clock mode, the control signal FPWC is first changed to low level and the power supply to the control circuit 700 of the flash unit 7 is started. Thereafter the body CPU 200 makes the serial communication with the flash CPU 710 for checking the charge of the main capacitor and other states. Next, the body CPU 200 carries out operations for displaying and warnings in the displaying and warning circuit 500, etc. and checking the capacity of source battery 130. Then the system clock is switched to the low-speed clock to return to the low-speed clock mode. After changing the control signal PWC to high level to stop the DC-DC converter 140, the flash charging is resumed at a point of time t6 provided that the source battery 130 has a sufficient capacity. The period t5-t6 of flash charging interruption is about 100 ms.

As seen from FIG. 4A, the charge voltage of the main capacitor in the flash unit 7 gradually increases with the flash charging as repeated above, and reaches the charging completed state at a point of time t13.

The body CPU 200 controls the flash charging by means of the control signal (hereinafter referred to as the charging control signal) FCHG output from the output terminal 214 of the body CPU 200. Reverting to FIG. 3, the signal line L4 through which the charging control signal FCHG is transmitted acts also as a signal line for transmitting the switching signal of the X-contact switch 180. The charging control signal FCHG and the switching signal are transmitted with entirely separate timings, with the former transmitted before commencement of an exposure control operation and the latter only during the exposure control operation. In view of this fact, the same signal line L4 is utilized for transmission of these signals. This results in a reduced number of contacts arranged on the hot shoe 1B and the foot 7C of flash unit 7, a reduced area occupied by the hot shoe 1B, and a reduced number of parts associated with these contacts, thereby promoting economy and reliability.

The following construction is provided in order for the flash CPU 710 to receive the switching signal from the X-contact switch 180, and in order to prevent the switching signal from the flash charging.

The signal line L4 is connected to the base of a switching transistor 734 for starting and stopping the flash charging at the boosting and flashing circuit 730. When the charging control signal FCHG is in high level, the transistor 734 is conductive to enable a current flow between the base and emitter thereof, thereby actuating the boosting and flashing circuit 730. When the charging control signal FCHG is in low level, the transistor 734 is non-conductive and the boosting and flashing circuit 730 is not actuated. The charging control signal FCHG is maintained in low level during the exposure control operation. Further, the diode 736 is blocking the current flow to the flash CPU 710.

During the exposure control operation, the flash CPU 710 outputs a charging prohibit signal OSCSTP in low level from an output terminal 718 thereof, to maintain the transistor 734 non-conductive. The output terminal 718 of flash CPU 710 has an open-drain output circuit which is inoperable and shut off from the transistor 734 when the flash charging is not prohibited.

The flash CPU 710 further includes an output terminal 721 which is pulled up inside during the exposure control operation, with an output signal XEN therefrom maintained in high level. Accordingly, with the closure of the X-contact switch 180, the signal input to the input terminal 720 of flash CPU 710 changes from high level to low level, thereby enabling the flash CPU 710 to detect the closure of the X-contact switch 180. At this time the diode 182 is blocking the current flow to the body CPU 200.

Referring again to the time chart of FIG. 4B, the charging control signal FCHG is changed intermittently to high level to effect flash charging before the exposure control operation is started at a point of time t21 until the main capacitor of the flash unit 7 reaches the charging completed state. When the exposure control operation is started at the point of time t21, the output signal XEN from the flash CPU 710 becomes high level. The time chart of FIGS. 4A and 4B illustrates the state of the signal line L4 where the two signals FCHG and XEN are joined. At a point of time t22 during the exposure control operation, the X-contact switch 180 is closed in synchronism with completion of a run of the leading blade of the shutter. As a result, the input signal XON input to the input terminal 720 falls to the low level, thereby causing the flash unit 7 to emit light.

On the other hand, the flash CPU 710 is powered through a line L3 which is separate from the power supply lines L1 and L2 for the boosting and flashing circuit 730. The flash charging involves a far greater power consumption than the operation of flash CPU 710, and therefore the flash CPU 710 could malfunction of the flash CPU 710 shared power supply lines with the boosting and flashing circuit 730. This inconvenience is avoided by providing the separate power supply line which has a capacity suited to the amount of power supply and suitable contact constructions.

The power supply line L3 extends from the output sides of the DC-DC converter 140 and voltage regulator 150 to the flash CPU 710, and includes the switching transistor 170. This switching transistor 170 is controllable by the control signal FPWC output from the output terminal 212 of the body CPU 200.

At the time of flash charging, the body CPU 200 changes the control signal FPWC to high level for stopping the power supply to the flash CPU 710 and actuating only the boosting and flashing circuit 730 to achieve an early completion of its charging. At other times, the body CPU 200 maintains the control signal FPWC in low level for supplying the power to the flash CPU 710 to enable the serial communication. The power supply line L3 is connected also to a reset circuit 732 of the flash CPU 710 for resetting the flash CPU 710 when the control signal FPWC changes to low level to start the power supply.

The flash CPU 710 is operable by the high-speed clock in order to make the serial communication with the body CPU 200. Thus, as described hereinbefore, the flash CPU 710 is powered from the output side of the DC-DC converter 140. The control signal FPWC is changed to the low level for starting the power supply to the flash CPU 710 after the output of the DC-DC converter 140 is sufficiently stabilized. This change takes place, in the time chart of FIG. 4C, after the point of time t52, specifically at the point of time t53 at which the operating mode is switched to the high-speed clock mode.

Referring to FIG. 1A, the flash unit 7 of the camera according to the present invention, as will be described in detail later, includes a light emitter 7A switchable between an operable position projecting from a flash unit body 7B and an inoperable position contained in the flash unit body 7B. Upon detecting the closure of the main switch 630 resulting from a turn-on operation of the main switch 12 on the camera body 1 acting as the starter switch, the body CPU 200 outputs a control signal to the flash CPU 710 for causing the light emitter 7A to project from the flash unit body 7B (which is hereinafter referred to as the flash pop-up). As a result, the flash CPU 710 actuates a drive mechanism described later to project the light emitter 7A from the flash unit body 7B provided that an operating switch on the flash unit 7 is turned on to place the flash unit 7 in an operable state.

Thus, the light emitter 7A of the flash unit 7 is projected with the turn-on operation of the main switch 12 which is carried out whenever the camera is used. This assures the operation of the flash unit 7 whenever flash light is needed for successful photograph-taking, as distinct from where a separate control device is provided for the pop-up operation in which the user could forget to operate the control device. Moreover, since the flash unit 7 is placed in the operable state when the main switch 12 on the camera body 1 turns on, to be ready for an operation of the release button 11, a less time lag occurs than where the flash unit 7 is placed in the operable state in response to the result of a metering operation effected with a depression of the release button 11. According to the present invention, therefore, the flash unit 7 is promptly operable whenever the shutter releasing operation starts by depressing the release button 11.

Further, upon detecting the opening of the main switch 630 resulting from a turn-off operation of the main switch 12 on the camera body 1, the body CPU 200 outputs a control signal to the flash CPU 710 for causing the light emitter 7A to retract into the flash unit body 7B (which is hereinafter referred to as the flash pop-down). As a result, the flash CPU 710 actuates the drive mechanism to retract the light emitter 7A into the flash unit body 7B.

Thus, the body CPU 200 acts as control means, operable with the on/off operation of the main switch 12 acting as the starter switch, for actuating the above-mentioned drive mechanism to switch the flash unit 7 to the pop-up position with the turn-on operation of the main switch 12.

Accordingly, with the flash unit 7 switched on, the user may be able to judge the state of the main switch 12 on the camera body 1 from the position of the light emitter 7A. That is, the light emitter 7A projecting from the flash unit body 7B indicates the on-state of the main switch 12. This may prevent the user from forgetting to turn off the main switch 12 on the camera body 1.

When the operating switch of the flash unit 7 is in the off-state, the light emitter 7A remains contained in the flash unit body 7B regardless of the operation of the main switch 12. When the main switch 12 is in the on-state and the operating switch of the flash unit 7 is turned on, the flash pop-up takes place with closure of a metering switch 632.

The above operation will be described with reference to the time chart of FIGS. 4A and 4B. When the main switch 12 is turned on at the point of time t1 and this is detected at the point of time t2, the body CPU 200 changes the control signal PWC to low level to start operating the DC-DC converter 140. After waiting for the startup of the DC-DC converter 140 which takes place at the point of time t3, the body CPU 200 changes the control signal FPWC to low level for starting the power supply to the flash CPU 710, and causes the flash pop-up. The flash charging is started upon completion of the flash pop-up at the point of time t4.

When the main switch 12 is turned off at a point of time t26 and this is detected at a point of time t27, the body CPU 200 actuates the DC-DC converter 140 and starts the power supply to the flash CPU 710 as in the case of flash pop-up. The flash pop-down takes place at a point of time t28. After the flash pop-down is completed at a point of time t29, the body CPU 200 changes to the sleeping state.

With the closure of the metering switch 632, the body CPU 200 starts a metering operation and a focus detecting operation for an autofocusing operation. Then the body CPU 200 judges from the results of the metering operation whether a photograph must be taken by utilizing the flash light (which is hereinafter referred to as the flash photography) or not. Flash photography is judged necessary when a photographic object is dark with its luminance below a predetermined level and when the object is in rear light condition.

If flash photography is judged necessary, checking is first made of the electric charge of the main capacitor of the flash unit 7. If it is in the charging incomplete state, the flash charging is started, and the release button 11 is depressed to the second step so that a shutter releasing operation will not take place even when the release switch 634 is closed (this operation being hereinafter referred to as the charging incomplete release lock state).

When flash photography is judged necessary with the main capacitor of the flash unit 7 in the charging completed state, and when flash photography is judged unnecessary, the body CPU 200 carries out the autofocusing operation and, after the objective lens 9 is driven to an in-focus position, carries out the metering operation again to determine whether flash photography is necessary or not.

The flash charging and autofocusing operation cannot be carried out in parallel since the body CPU 200 and the flash unit 7 are powered by the single source battery 130 and, in addition, the flash charging is effected intermittently with the body CPU 200 and various operations of the body CPU 200 carry out therebetween. Therefore, the metering operation is first carried out whenever the objective lens 9 is in the in-focus position or not, to determine broadly whether flash photography is necessary or not. If flash photography is judged necessary and the flash charging is incomplete, the flash charging is effected first to prepare for flash photography. The autofocusing operation is effected upon completion of the charging. Thereafter the metering operation is carried out again with the objective lens 9 placed in the in-focus position for positively framing a photographic object, thereby to judge whether flash photography is necessary or not. In this way, the necessity of flash photography is judged correctly while giving priority to the flash charging to secure early availability of flash photography.

The above operation will be described with reference to the time chart of FIGS. 4A and 4B. The closure of the metering switch 632 applies an interrupt to the body CPU 200. With the interrupt taking place at a point of time t7, the body CPU 200 discontinues the flash charging, switches the operating mode to the high-speed clock mode, and then carries out the metering and focus detecting operations. The body CPU 200 judges that flash photography is necessary, and starts the flash charging at a point of time t8 since, at this time, the main capacitor of the flash unit 7 is in the charging incomplete state. The charging incomplete release lock state follows the point of time t8, and a release operation is not started when the release switch 634 is closed at a point of time t9.

This release lock state is notified to the user by utilizing a period in which the flash charging is off. The notification is effected by intermittently flashing an LED in the viewfinder through the LED display circuit 560 of the displaying and warning circuit 500, and intermittently sounding the buzzer 580 of the circuit 500.

This operation will be explained with reference to the time chart of FIG. 4A. A control signal to the displaying and warning circuit 500 is applied in high level for 25ms from points of time t10 and t11, respectively. This control signal is output, with reference to the timing of control operations by referring to FIG. 4C, after the point of time t54 at which the serial communication is completed.

The above release lock state is not canceled when the main capacitor of the flash unit 7 reaches the charging completed state, but is canceled when the metering switch 632 is opened once.

This is because, if the charging incomplete release lock state were canceled in response to charge of the main capacitor of the flash unit 7 to the charging completed state, the shutter release operation would be carried out with a timing different from an intended timing where the release button 11 is kept depressed to the second step.

When the charging is completed in the release lock state, the completion is notified to the user by continuing flashing of the LED in the viewfinder through the LED display circuit 560 of the displaying and warning circuit 500, and sounding of the buzzer 580 of the circuit 500 until the release lock is canceled.

This operation will be explained with reference to the time chart of FIGS. 4A and 4B. The flash charging started at a point of time t12 is completed at a point of time t13. The completion is detected through the serial communication started at a point of time t14. As a result, the control signal applied to the displaying and warning circuit 500 is changed to high level at a point of time t15.

After the release switch 634 is opened at a point of time t16, the metering switch 632 is opened at a point of time t17. As a result, the release lock state is canceled and the control signal to the displaying and warning circuit 500 is changed to low level.

Subsequently, when the metering switch 632 is closed as a result of the first-step depression of the release button 11 at a point of time t18, flash photography is judged necessary through the same operation described above. The flash charging has been completed by this time and, therefore, the focusing operation is started at a point of time t19 without effecting the flash charging and the charging incomplete release lock. After the focusing operation is completed, the metering and focus detecting operations are carried out again to move into an AE lock state (for locking aperture valve position and shutter speed to calculated values) and an AF lock state (for locking the objective lens 9 to its position). The shutter releasing operation is started with closure of the release switch 634 at a point of time t20 and detection of the closure at a point of time t21.

After a photograph is taken by utilizing the flash light, the shutter is charged and the film is wound by one frame at a point of time t23. The releasing operation ends at a point of time t24.

When flash photography is carried out with this camera, the flash charging is started again after the shutter releasing operation. When ordinary phototaking is carried out in an ambient light condition without using the flash light (which is hereinafter referred to as ambient light photography), the flash charging does not follow the shutter releasing operation.

More particularly, when a picture is taken by flash photography, it is highly probable that a next picture will also be taken by flash photography. Similarly, when a picture is taken by ambient light photography, a next picture will probably be taken likewise. Thus, only when flash photography is highly likely to occur, the shutter releasing operation is followed by the flash charging to be ready for further flash photography which involves a great power consumption. In this way, exhaustion of the source battery is reduced without causing inconvenience to flash photography. In the time chart of FIG. 4B, the flash charging is started again at a point of time t25 after flash photography is carried out.

Next, the operations of the body CPU 200 will be described with reference to the flow charts shown in FIGS. 5 through 14. The flags used in these flow charts and state signals exchanged through the serial communication between the body CPU 200 and flash CPU 710 will be described in advance of the description of the operations.

The flags will be described first.

Reference SMF denotes a main switch flag for memorizing the closure of the main switch SWm, which is set to "1" by the opening of the main switch SWm and to "0" by the closure thereof. Reference WAKEN denotes an interrupt permit flag for allowing an interrupt when the metering switch SW1 is closed. The flag WAKEN is set to "1" for allowing the interrupt and to "0" when prohibiting the interrupt.

Reference S1F denotes a metering switch flag for continuing the flash charging when the metering switch SW1 is closed. The flag S1F is set to "0" from the start the flash charging to the opening of the metering switch SW1, and to "1" at other times. Reference S2F denotes a release switch flag for continuing the flash charging control when the release switch SW2 is closed. The flag S2F is set to "0" from the start the flash charging to the opening of the release switch SW2, and to "1" at other times.

Reference RELDIS denotes a release prohibit flag for prohibiting the shutter releasing operation. The flag RELDIS is set to "1" when prohibiting the releasing operation, and to "0" when allowing the releasing operation. Reference AFTER denotes an after-release flag for indicating that the releasing operation has completed. The flag AFTER is set to "1" from completion of the releasing operation until the body CPU 200 becomes the sleeping state, and to "0" from its startup to the completion of the releasing operation.

Reference ELF denotes a flash mode flag for indicating a flash mode for the flash photography. The flag ELF is set to "1" for the flash mode, and to "0" for an ambient light mode for the ambient light photography. Reference CHGREQ denotes a flash charging request flag for indicating occurrence of a request for the flash charging. The flag CHGREQ is set to "1" in the presence of the request of the flash charging, and to "0" in the absence thereof. Reference GOFCHG denotes a charging start flag for indicating start of the flash charging. The flag GOFCHG is set to "1" when starting the flash charging with all conditions for the flash charging in order, and to "0" at other times.

Reference RDYLOCK denotes a charging incomplete lock flag for indicating the charging incomplete lock state. The flag RDYLOCK is set to "1" in the lock state, and to "0" at other times. Reference BZF denotes a buzzer flag for requesting sounding of the buzzer 560 in the charging incomplete lock state. The flag BZF is set to "1" when requesting the buzzer sounding, and to "0" at other times. Reference AFAEL denotes a lock flag for indicating the AF and AE lock states (hereinafter referred to as the AF/AE lock state). The flag AFAEL is set to "1" when the autofocusing operation is completed in a one-shot mode (i.e. in which, once the objective lens 9 is driven to an in-focus position, the lens 9 is locked in that position by stopping subsequent lens drive control), and to "0" at other times.

Reference RCF denotes a back-cover flag for memorizing the opening and closing of the back-cover of the camera. The flag RCF is set to "0" when the back-cover switch SWrc is opened with opening of the back-cover, and to "1" when the back-cover switch SWrc is closed with closure of the back-cover. Reference REWF denotes a rewind flag for indicating a rewinding state of a film. The flag REWF is set to "1" from completion of film rewinding to the opening of the back-cover, and to "0" at other times.

The state signals will be described next.

Reference SMOFF denotes a main switch opening and closing signal for indicating states of the main switch SWm included in the camera body 1. The signal SMOFF is set to "0" when the main switch SWm is closed, and to "1" when the main switch SWm is opened. Reference POPEN denotes a pop-up enable signal indicating availability of the flash pop-up. The signal POPEN is set to "1" when the flash pop-up is impossible, and to "0" when the flash pop-up is possible. The main switch opening and closing signal SMOFF and pop-up enable signal POPEN are transmitted from the body CPU 200 to the flash CPU 710.

Reference FLON denotes a flash on/off signal for indicating whether the flash unit 7 is operable or not. The signal FLON is set to "1" when the flash unit 7 is in an auto mode and the light emitter 7A is in the operable position projecting from the flash unit body 7B, and to "0" at other times. Reference RDY denotes a flash charging signal for indicating the charge of the main capacitor of the flash unit 7. The signal RDY is set to "1" when the main capacitor is in the charging completed state, and to "0" when the main capacitor is in the charging incomplete state. Reference INPOP denotes a popping state signal for indicating the state of flash popping action. The signal INPOP is set to "0" when the flash popping action (flash pop-up, flash pop-down) is in progress, and to "1" at other times. The flash on/off signal FLON, flash charging signal RDY and popping state signal INPOP are transmitted from the flash CPU 710 to the body CPU 200.

Figure 5:
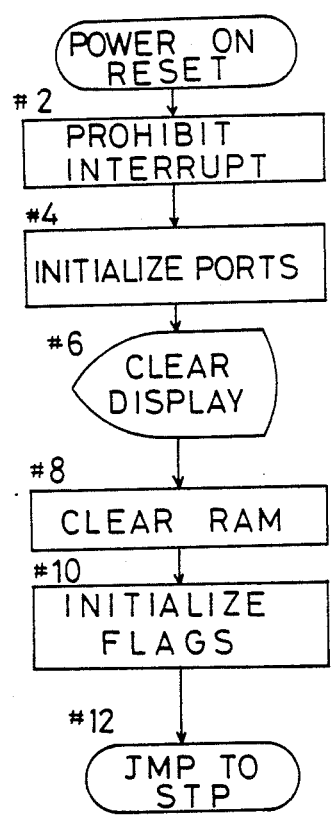
FIGS. 5 through 17 are flow charts illustrating operations of a body CPU.

FIG. 5 shows a flow chart of a starting routine "Power On Reset" which starts with loading of the source battery 130 into the camera body 1.

When the source battery 130 is loaded, step #2 first prohibits various interrupts which will be described later. Then, port initialization is carried out at step #4 for initializing the various terminals, thereby stopping operations of the motors and magnets, setting the control signal PWC to high level to stop the DC-DC converter 140, setting the control signal FPWC to high level to stop the power supply to the control circuit 700 of the flash unit 7, and setting the charging control signal FCHG to low level to prohibit the flash charging.

Subsequently, the displays and warnings are cleared at step #6 by stopping the drive output to the liquid crystal display circuit 510, LED display circuit 560 and buzzer 580 of the displaying and warning circuit 500. At step #8, the contents of a RAM are cleared. At step #10, the flags are initialized, thereby setting the main switch flag SMF to "1", the metering switch flag S1F to "1", the release switch flag S2F to "1", the release prohibit flag RELDIS to "0" to permit the shutter release operation, the after-release flag AFTER to "0" indicative of a pre-release state, the flash mode flag FLF to "0" indicative of the ambient light mode, the flash charging request flag CHGREQ to "0" indicative of the absence of the request, the charging start flag GOFCHG to "0" indicative of non-start, the lock flag AFAEL to "0" indicative of a non-AF/AE lock state, the back-cover flag RCF to "1" indicative of the closure of the back-cover, and the rewind flag REWF to "0" indicative of a film rewind incomplete state.

The program thereafter jumps to a stop routine "STP" at step #12.

Figure 6A:
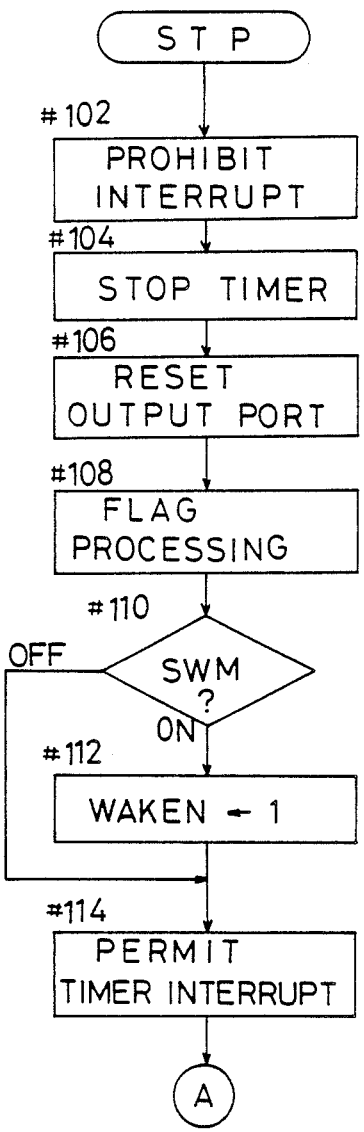
Figure 6B:
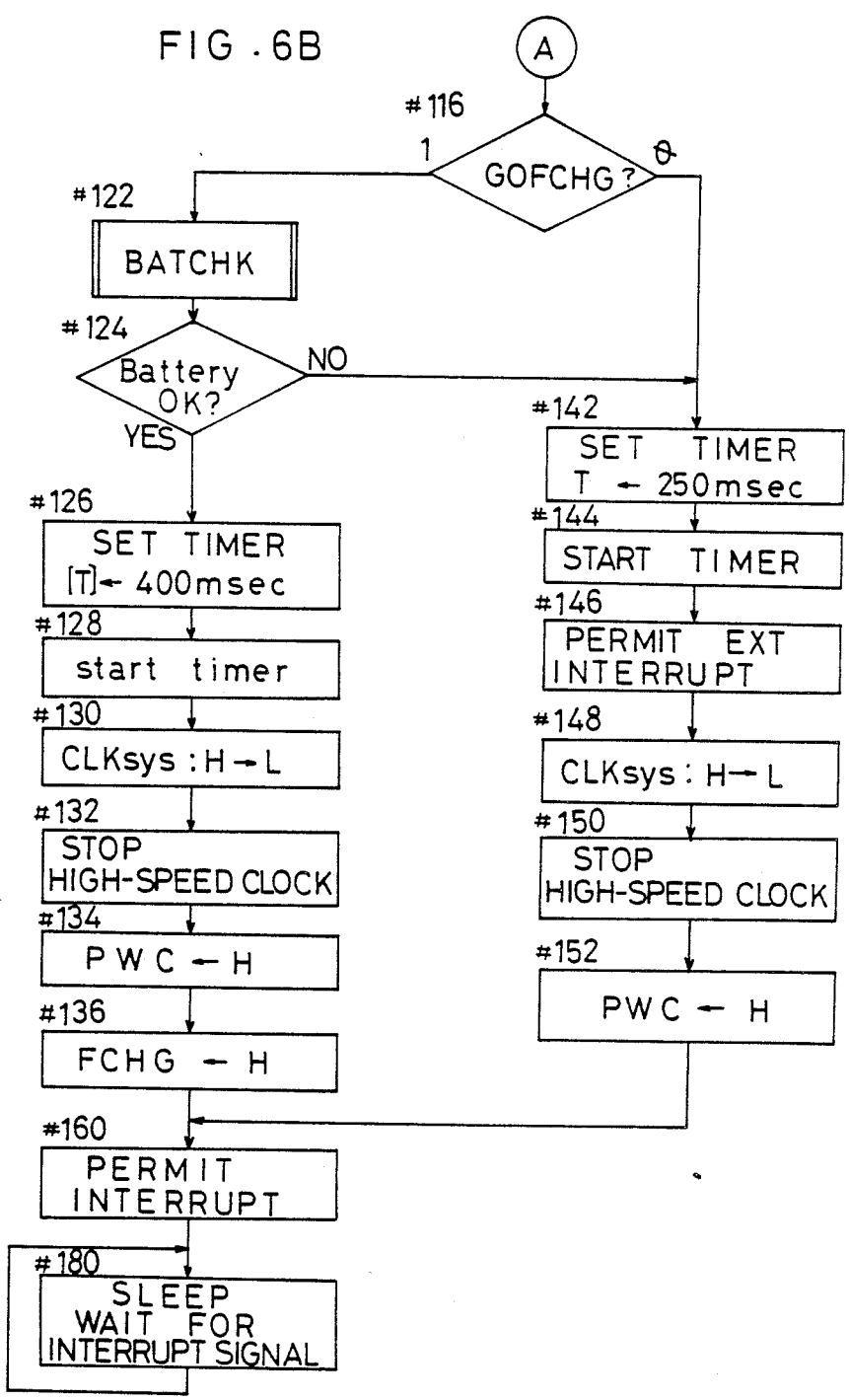

FIGS. 6A and 6B show the stop routine "STP" by which the body CPU 200 moves to the sleeping state.

In this routine, various interrupts are first prohibited at step #102 and the timer is stopped at step #104. At step #106, the output terminals are initialized as at step #4 of the "Power On Rest" routine, for turning off the displays and buzzer (with no processing carried out with respect to the liquid crystal display circuit 510). At step #108, flag processing is carried out for setting the release prohibit flag RELDIS to "0" to permit the shutter release operation, the after-release flag AFTER to "0" indicative of the pre-release state, the charging incomplete lock flag RDYLOCK to "0" indicative of a non-charging incomplete lock state, the buzzer flag BZF to "0" indicative of a state in which the buzzer sounding request is not made, and the lock flag AFAEL to "0" indicative of the non-AF/AE lock state.

Thereafter, the state of the main switch SWm is checked at step #110. Only when the main switch SWm is closed, the interrupt flag WAKEN is set to "1" at step #112 for permitting an interrupt due to the closure of the metering switch SW1, and thereafter a timer interrupt is permitted at step #114. As will be described later, this timer interrupt is made every 250ms when the flash charging is not taking place, for carrying out port scanning in order to check whether or not there are any changes in the inputs. Thereafter, the charging start flag GOFCHG is checked at step #116.

When the charging start flag GOFCHG is set for starting the flash charging, a battery capacity checking subroutine "BATCHK" is called at step #122 for checking the capacity of the source battery 130 by means of the battery checking circuit 134. If the result shows that the source battery has a sufficient capacity for the flash charging, the program moves to step #126. If not, the program jumps to step #142 for a no-flash charging sequence.

At step #126, 400ms are set as a count-up time of the timer. At step #128, the timer is started. At step #130, the system clock CLKsys is switched from the 8.38MHz high-speed clock signal to the 32.768KHz low-speed clock signal to establish the low-speed clock mode. After stopping the high-speed clock signal at step #132, the control signal PWC is changed to high level at step #134 for stopping the DC-DC converter 140. At step #136, the charging control signal FCHG is changed to high level for starting the flash charging, which is followed by step #160.

The program moves to step #142 when step #116 finds the charging start flag GOFCHG reset indicating that the flash charging need not be started or when step #124 finds the capacity of source battery 130 insufficient although the flash charging is requested. At step #142, 250ms are set as the count-up time of the timer. Thereafter, at step #144, the timer is started. At step #146, an external interrupt is permitted. At step #148, the system clock CLKsys is switched from the 8.38MHz high-speed clock signal to the 32.768KHz low-speed clock signal to establish the low-speed clock mode. After stopping the high-speed clock signal at step #150, the control signal PWC is changed to high level at step #152 for stopping the DC-DC converter 140, which is followed by step #160.

Interrupts are permitted at step #160. The interrupts permitted at this step are a timer interrupt at every 250ms during a non-flash charging, a timer interrupt at every 400ms during the flash charging, and a hardware interrupt resulting from the closure of the metering switch SW1. Thereafter, the program moves to step #180 at which the body CPU 200 changes to the sleeping state pending input of an interrupt signal. In this sleeping state, only the low-speed clock oscillator circuit 192, the liquid crystal display circuit 510 and the timer are in operation.

Figure 7A:
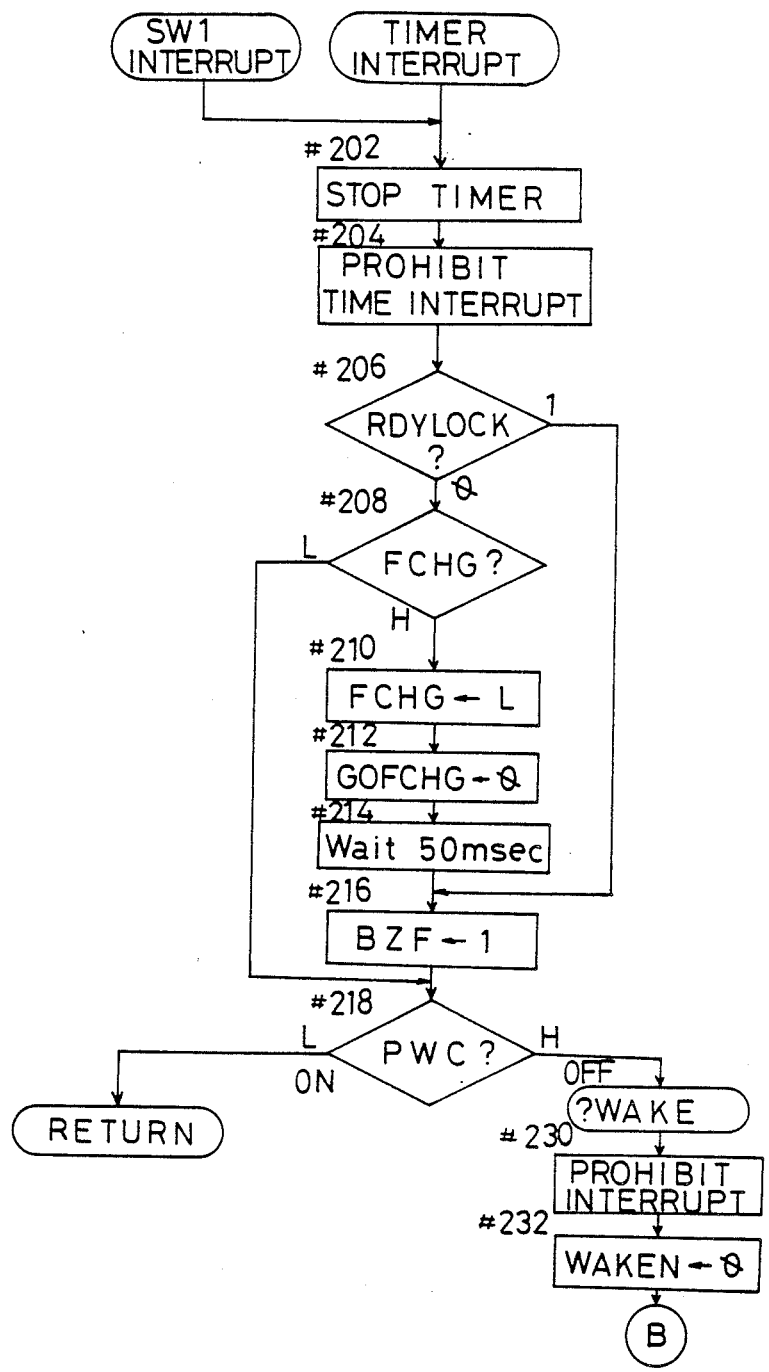
Figure 7B:
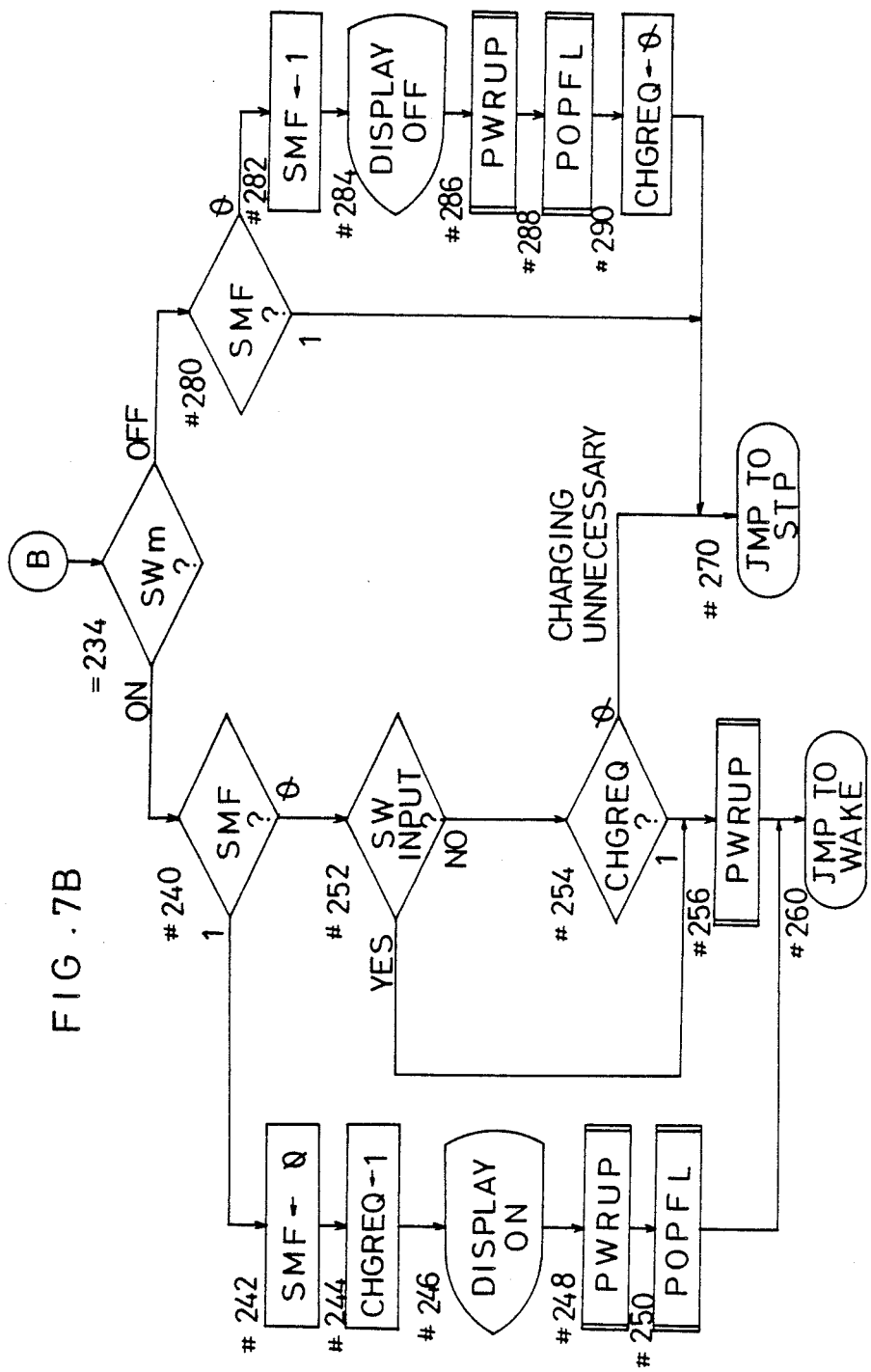

FIGS. 7A and 7B show a flow chart of an interrupt routine for carrying out the timer interrupt and hardware interrupt.

When the timer interrupt or hardware interrupt occurs, the timer is stopped at step #202, the timer interrupt is prohibited at step #204, and the charging incomplete lock flag RDYLOCK is checked at step #206. If the charging incomplete lock flag RDYLOCK is set for indicating the charging incomplete lock state, the program moves to step #216. If the charging incomplete lock flag RDYLOCK is reset for indicating the other state than the charging incomplete lock state, the charging control signal FCHG is checked at step #208. If the charging control signal FCHG is in low level, that is if the flash charging is not taking place, this interrupt is the timer or hardware interrupt occurring during the non-flash charging and the program moves to step #218. If the charging control signal FCHG is in high level, that is if the flash charging is taking place, this interrupt is the timer or hardware interrupt occurring during the flash charging, so that the charging control signal FCHG is changed to low level at step #210 for stopping the flash charging. Then the charging start flag GOFCHG is reset to "0" at step #212 and, after waiting for 50ms at step #214 for the recovery of the source battery 130 and charging of the backup capacitor 160, the program moves to step #216.

At step #216, the buzzer flag BZF is set to "1" for requesting sounding of the warning buzzer in the charging incomplete lock state. Then the program moves to step #218 for checking the control signal PWC.

If the control signal PWC is in low level, that is if the DC-DC converter 140 is in operation, this is the hardware interrupt during the high-speed clock mode and the program returns to the step at which the interrupt occurred. If, on the other hand, the control signal PWC is in high level, that is if the DC-DC converter 140 is out of operation, this is the interrupt occurring in the sleeping state and the program moves to a startup judging routine "?WAKE" beginning with step #230.

In the startup judging routine "?WAKE", interrupts are first prohibited at step #230. The interrupt permit flag WAKEN is reset to "0" at step #232 for prohibiting the hardware interrupt resulting from the closure of the metering switch SW1. Then the state of the main switch SWm is checked at step #234. If the main switch SWm is closed, the program moves to step #240. If the main switch SWm is open, the program moves to step #280. In either case, the main switch flag SMF is checked.

If step #240 finds the main switch flag SMF set to "1", this indicates that the main switch SWm was closed after an open state. Then the main switch flag SMF is reset to "0" at step #242, and the flash charging request flag CHGREQ is set to "1" at step #244 for requesting the flash charging. An ON display indicating a startup is given at step #246. A subroutine "PWRUP" for switching to the high-speed clock mode is called at step #248, and a subroutine "POPFL" for carrying out the flash pop-up is called at step #250. Thereafter, at step #260, the program jumps to the startup routine "WAKE".

If step #240 finds the main switch flag SMF reset to "0", this indicates that the main switch SWm was not closed just now but has been closed for some time. Then, checking is made at step #252 as to the presence or absence of inputs resulting from the closure of back-cover release switch SWrc, focusing mode changeover switch SWaf/m and lens mounting switch SWllk. If an input is found, the program moves to step #256. If not, the charging request flag CHGREQ is checked at step #254. If the charging request flag CHGREQ is reset to "0", this means that the flash charging is unnecessary, so that the program jumps to a stop routine "STP" at step #270. If charging request flag CHGREQ is set "1", this means that the flash charging is necessary and the program moves to step #256. The subroutine "PWRUP" is called at step #256, after which, at step #260, the program jumps to the startup routine "WAKE".

If step #280 finds the main switch flag SMF set to "1", this indicates that the main switch SWm was not opened just now but has seen opened for some time. Then, at step #270, the program jumps to the stop routine "STP". If the main switch flag SMF is reset to "0" at step #280, this indicates that the main switch SWm was opened from a closed state. Then, at step #282, the main switch flag SMF is set to "1" and, at step #284, an OFF display is given indicating that the main switch 12 is turned off. After the subroutine for switching to the high-speed clock mode is called at step #286, the subroutine POPFL is called at step #288 for carrying out the flash pop-down. At step #290, the charging request flag CHGREQ is set to 0 for not requesting the flash charging. The program then jumps at step #270 to the stop routine "STP".

Figure 8A:
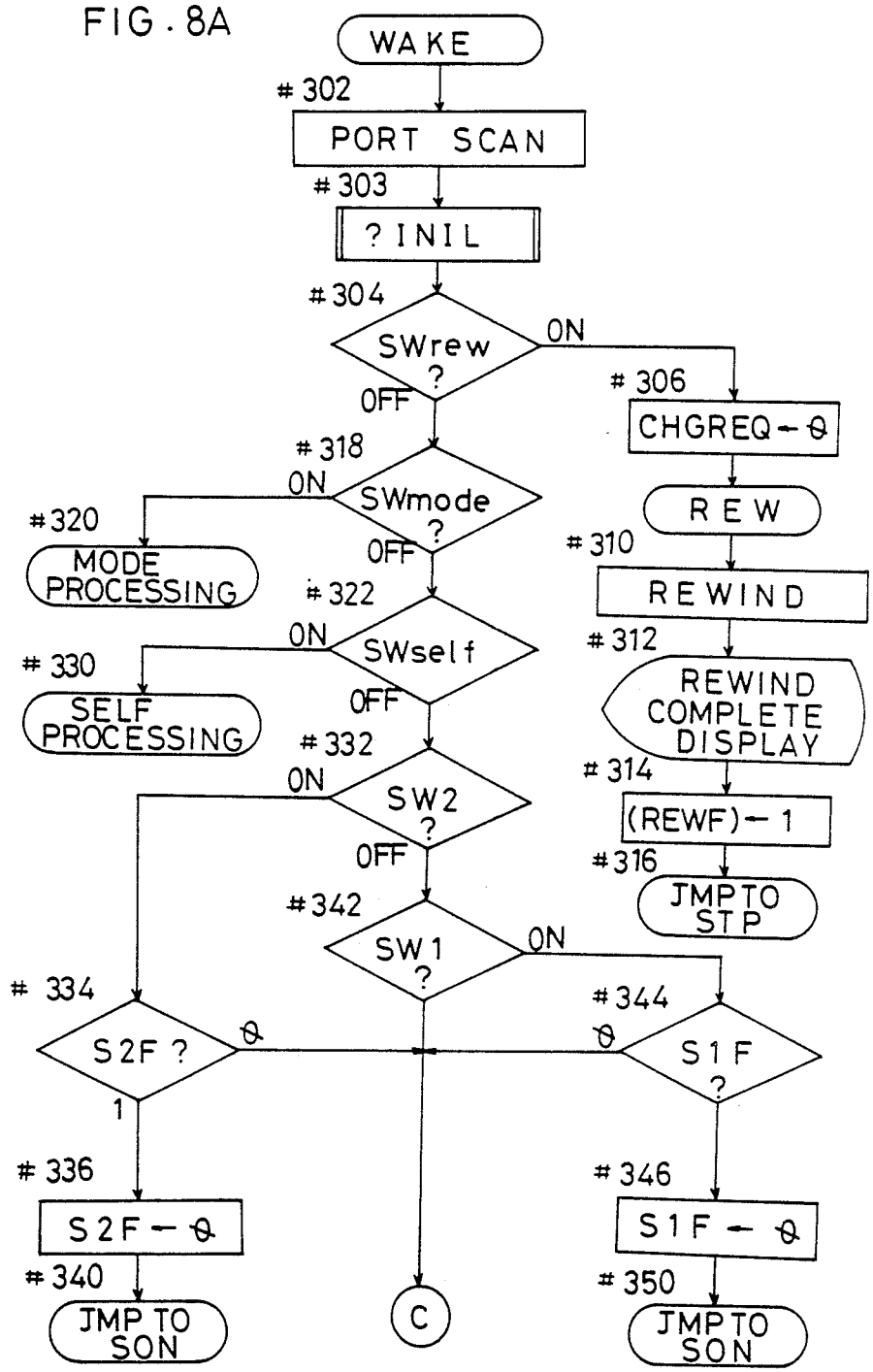
Figure 8B:
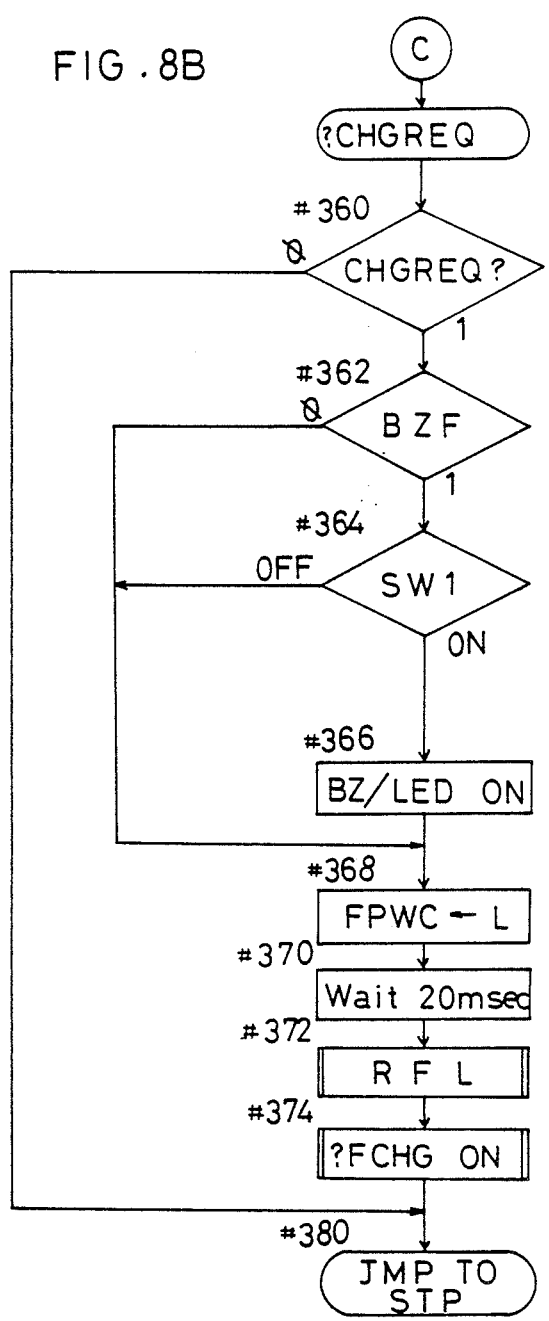

FIGS. 8A and 8B show a flow chart of the startup routine "WAKE".

In this routine, the port scanning is first carried out at step #302 for checking if there are changes in the inputs. Thereafter, a subroutine "?INIL" is called at step #303 for checking the state of the back-cover switch SWrc to judge whether an initial film winding operation in which the film is automatically advanced to frame 1 is necessary or not. The initial film winding operation is carried out as necessary.

Next, the halfway rewind switch SWrew is checked at step #304. If the halfway rewind switch SWrew is closed, the charging request flag CHGREQ is reset to "0" at step #306 for not requesting the flash charging. Thereafter, the program moves to step #310 to carry out a rewind control routine for rewinding the film by driving the motor 391. When the film rewinding is completed, the liquid crystal display circuit 510 is driven at step #312 for displaying the completion of the film rewinding on the display panel 15. At step #314, the rewind flag REWF is set to "1" indicative of the completion of the film rewinding. At step #316, the program jumps to the stop routine "STP".

If the halfway rewind switch SWrew is not closed, the photographic mode changeover switch SWmode is checked at step #312. If the photographic mode changeover switch SWmode is closed, the program moves to step #320 to carry out a mode processing routine for switching the photographic mode. This routine is not described herein.

If the photographic mode changeover switch SWmode is not closed, the state of the self-timer switch SWself is checked at step #322. If the self-timer switch SWself is closed, the program moves to step #330 to carry out a self processing routine for switching between the self-timer mode and the ordinary mode. This routine is not described herein.

If the self-timer switch SWself is not closed, the state of the release switch SW2 is checked at step #332. If the release switch is closed, the release switch flag S2F is checked at step #334. If the release switch flag S2F is set to "1", this indicates that the release switch SW2 was closed after an open state. Then, after resetting the release switch flag S2F to "0" at step #336, the program jumps at step #340 to a switch processing routine "SON".

If step #334 finds the release switch flag S2F reset to "0", this indicates that the release switch SW2 has been closed for some time. Then the program moves to a charging request judging routine "?CHGREQ" beginning with step #360.

If step #332 finds the release switch SW2 closed, the state of the metering switch SW1 is checked at step #342. If the metering switch SW1 is closed, the metering switch flag S1F is checked at step #344. If the metering switch flag S1F is set to "1", this indicates that the metering switch SW1 was closed from an open state. After resetting the metering switch flag S1F to "0" at step #346, the program jumps at step #350 to the switch processing routine "SON".

If step #344 finds the metering switch flag S1F reset to "0", this indicates that the metering switch SW1 has been closed for some time. Then the program moves to the charging request judging routine "?CHGREQ" beginning with step #360.

Also when step #342 finds the metering switch SW1 not closed, the program moves to the charging request judging routine "?CHGREQ" beginning with step #360.

In the charging request judging routine "?CHGREQ", the charging request flag CHGREQ is first checked at step #360. If the charging request flag CHGREQ is reset to "0" indicating that the flash charging is unnecessary, the program jumps at step #380 to the stop routine "STP".

If the charging request flag CHGREQ is set to "1" indicating that the flash charging is necessary, the buzzer flag BZF is checked at step #362. If the buzzer flag BZF is reset to "0" indicating that sounding of the buzzer 580 is unnecessary, the program moves to step #368. If the buzzer flag BZF is set to "1" indicating that sounding of the buzzer 580 is necessary, the state of the metering switch SW1 is checked at step #364. If the metering switch SW1 is open, the program moves to step #368. If the metering switch SW1 is closed, is indicated that present condition is in the charging con-complete state at step #366 by means of the buzzer 580 and LED display circuit 560, and the program moves to step #368. The indication started from step #366 by means of the buzzer 580 and LED display circuit 560 is stopped at step #106 of the stop routine "STP".

At step #368, the control signal FPWC is changed to low level for starting the power supply to the control circuit 700 of the flash unit 7. After waiting for 20 ms at step #370 to reset the flash CPU 710, a subroutine "RFL" is called at step #372 for receiving data from the flash CPU 710 in the serial communication. A subroutine "?FCHGON" is called at step #374 for judging whether the flash charging is possible or not. Thereafter, at step #380, the program jumps to the stop routine "STP".

Figure 9A:
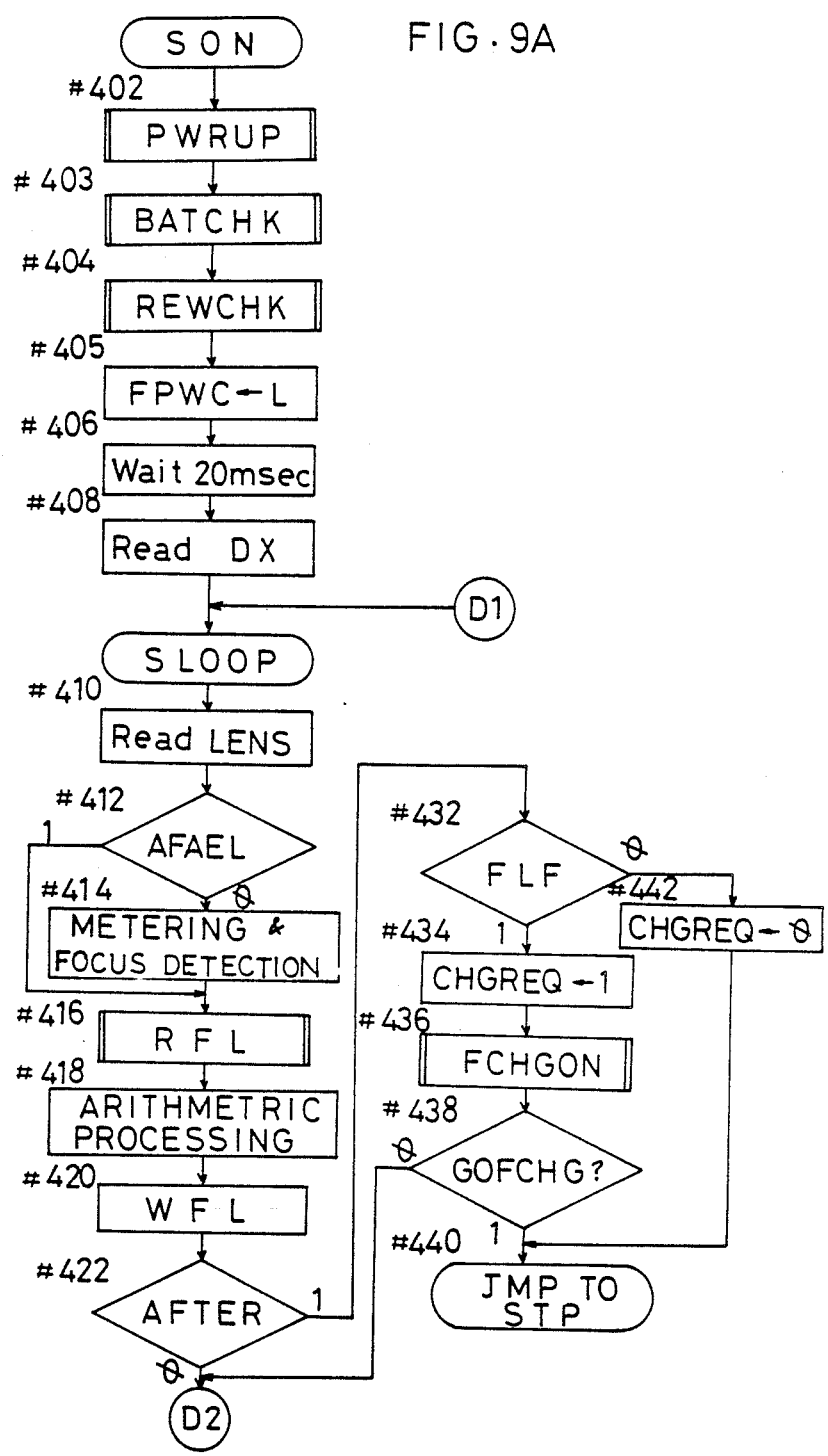
Figure 9B:
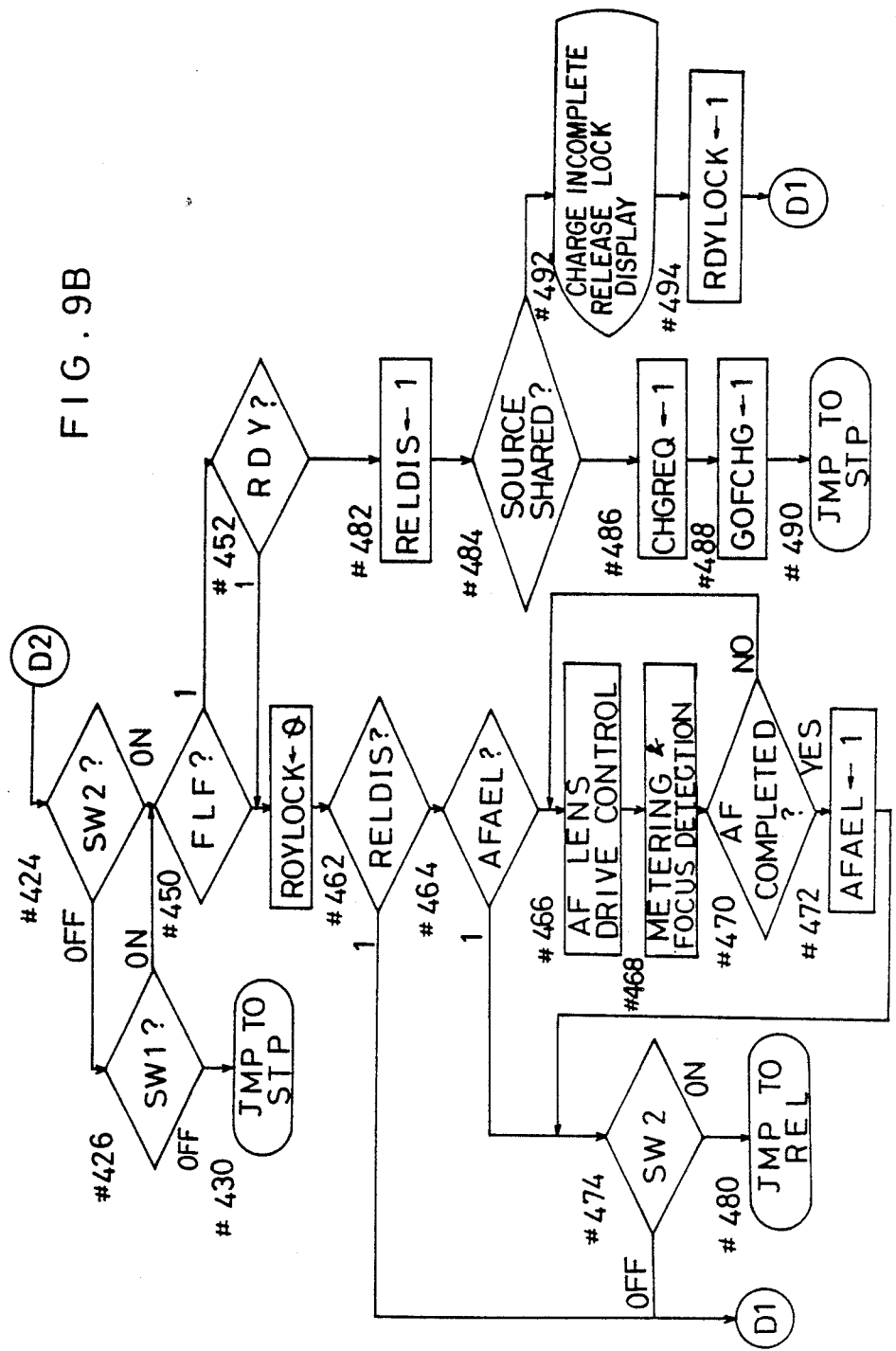

FIGS. 9A and 9B show a flow chart of the switch processing routine "SON".

In this routine, the subroutine "PWRUP" is first called at step #402 for switching to the high-speed clock mode. At step #403, the battery capacity checking subroutine "BATCHK" is called for checking exhaustion of the source battery 130. Thereafter, at step #404, a film rewind judging subroutine "REWCHK" is called for checking whether the film rewinding is completed or not. If the film rewinding is completed, the release lock process described later is carried out.

Subsequently, the control signal FPWC is changed to low level at step #405 for starting the power supply to the control circuit of the flash unit 7. After waiting for 20 ms at step #406 for resetting of the flash CPU 710, film sensitivity information is read at step #408, and moves to a metering routine "SLOOP" beginning with step #410.

In the metering routine "SLOOP", various lens data (such as the open f-value and focal length) are first read at step #410 through the serial communication with the lens circuit 900. Then the lock flag AFAEL is checked at step #412. The metering and focus detecting operation is carried out at step #414 only when the lock flag AFAEL is reset to "0" and the AF/AE lock is off.

Subsequently, a subroutine "RFL" is called at step #416 for making the serial communication with the flash CPU 710. In the subroutine "RFL", the flash on/-off signal FLON and flash charge signal RDY are input from the flash CPU 710.

Then arithmetic processing is carried out at step #418 for carrying out an exposure operation by the APEX system and judging as to the necessity of flash photography. When a photographic object is dark or is in the rear light condition as compared with predetermined levels, the flash mode flag FLF is set to "1" to establish the flash mode for allowing flash photography. At other times, the flash mode flag FLF is reset to "0" to establish the ambient light mode for allowing ambient-light photography. At step #420, the flash mode flag is transmitted to the flash CPU 710 through the serial communication. Thereafter, the after-release flag AFTER is checked at step #422.

If the after-release flag AFTER is reset to "0" indicating that a shutter releasing operation has not taken place, the release switch SW2 is checked at step #424. If the release switch SW2 is closed, the program moves to step #450. If the release switch SW2 is open, the metering switch SW1 is checked at step #426. If the metering switch SW1 is closed, the program moves to step #450. If the metering switch SW1 is open, the program jumps at step #430 to the stop routine "STP".

On the other hand, if step #422 finds the after-release flag AFTER is set to "1" indicating that the shutter releasing operation has completed, the flash mode flag FLF is checked at step #432. If the flash mode flag FLF is reset to "0" indicating the ambient-light mode, the flash charging request flag CHGREQ is reset to "0" at step #442. Thereafter, at step #440, the program jumps to the stop routine "STP".

If step #432 finds the flash mode flag FLF set to "1" indicating the flash mode, the flash charging request signal CHGREQ is set to "1" at step #434. At step #436, a subroutine "?FCHGON" is called at step #436 for judging whether the flash charging is possible or not. Thereafter, the charging start flag GOFCHG is checked at step #438. If the charging start flag GOFCHG is set to "1" for starting the flash charging, the program jumps at step #440 to the stop routine "STP". If the charging start flag GOFCHG is reset to "0" for not starting the flash charging, the program moves to step #424. If either the release switch SW2 or the metering switch SW1 is closed, the program moves to step #450. Otherwise, the program jumps at step #430 to the stop routine "STP".

At step #450, the flash mode flag FLF is checked again. If the flash mode flag FLF is reset to "0" indicating the ambient-light mode, the program moves directly to step #460. If the flash mode flag ELF is set to "1" indicating the flash mode, the flash charge signal RDY is checked at step #452. If the flash charge signal RDY is set to "1" indicating the charging complete state, the program moves to step #460.

At step #460 the charging incomplete lock flag RDYLOCK is reset to "0", and at step #462 the release prohibit flag RELDIS is checked at step #462. If the release prohibit flag RELDIS is set to "1" indicating the release prohibit state following the shutter releasing operation, the program returns to step #410 for repeating the above operation. If the release prohibit flag RELDIS is reset to "0" indicating the release permit state, the lock flag AFAEL is checked at step #464.

If the lock flag AFAEL is reset to "0" indicating that the AF/AE lock is off, the lens drive control for auto focusing adjustment is effected at step #466 which includes input of the lens data from the lens circuit 900. After carrying out the metering and focus detecting operation at step #468, checking is made at step #470 whether the auto focusing operation has completed or not. Steps #466–#470 are repeated until the auto focusing operation is completed. When the auto focusing operation is completed, the lock flag AFAEL is set to "1" indicating the lock state at step #472. Then the program moves to step #474.

On the other hand, if step #464 finds the lock flag AFAEL set to "1" indicating that the AF/AE lock state is already on, the program moves straight to step #474. At step #474 the release switch SW2 is checked. If the release switch SW2 is open, the program returns to step #410 to repeat the above operation. If the release switch SW2 is closed, the program jumps at step #480 to a release routine "REL" for carrying out the shutter releasing operation.

If step #452 finds the flash charge signal RDY reset to "0" indicating the charging incomplete state, the release prohibit flag RELDIS is set to "1" at step Thereafter, checking is made at step #484 whether or not the flash unit attached to the camera body 1 is the type powered from the source battery 130 in the camera body 1 (the flash unit of this type being hereinafter referred to as the source sharing type).

If the flash unit 7 is the source sharing type, the flash charging request flag CHGREQ is set to "1" for requesting the flash charging at step #486, and the charging start flag GOFCHG is set to "1" at step #488 for starting the flash charging. Then, at step #490, the program jumps to the stop routine "STP".

If step #484 finds the flash unit 7 to be not the source sharing type, at step #492 display meaning the charging incomplete lock state is displayed. After setting the charging incomplete flag RDYLOCK to "1" at step #494, the program returns to step #410 to repeat the above operation.

Figure 10:
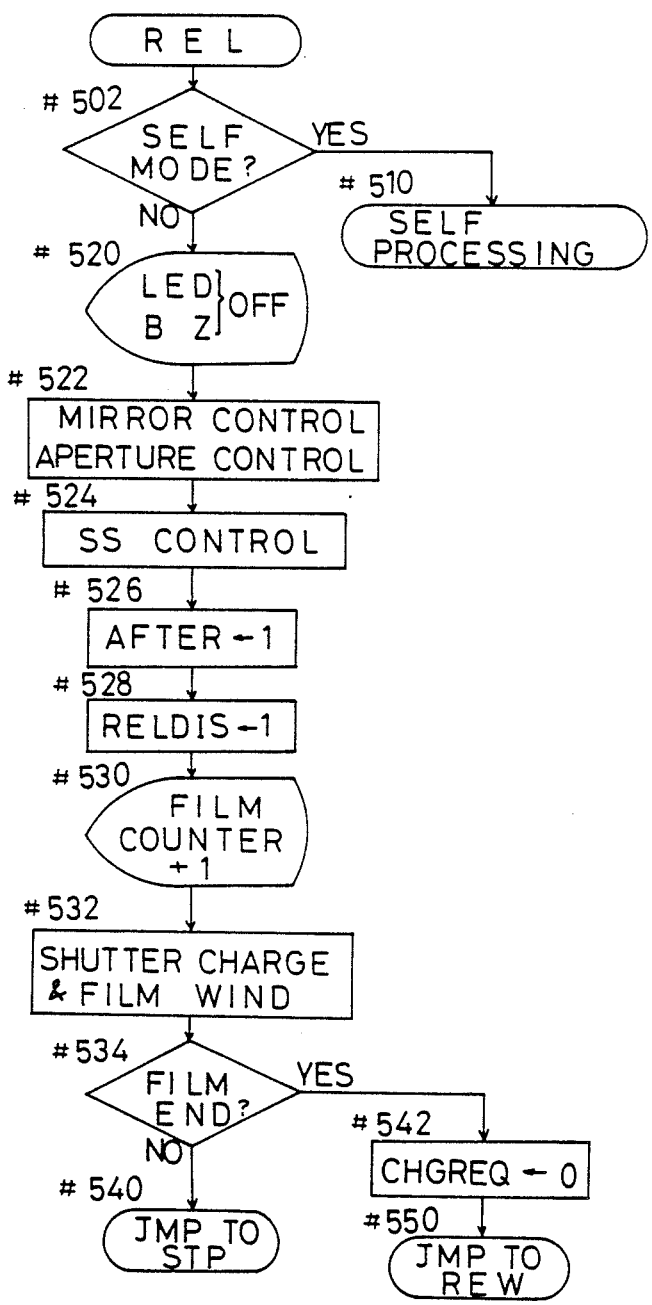

FIG. 10 shows a flow chart of the release routine REL for carrying out the shutter releasing operation.

In this routine, step #502 first checks whether the self-timer mode is on or not. If the self-timer mode is on, the program moves to step #510 to execute the self-timer processing routine for actuating a self-timer to delay start of the shutter releasing operation for a predetermined time. This routine is not described herein.

If step #502 finds that the self-timer mode is off, the control signal is output to the LED drive circuit 560 and the buzzer 580 at step #520 for stopping the display and alarm. At step #522, mirror control operation is effected to turn up a mirror, and aperture control operation is effected to set the aperture to a calculated aperture vale. At step #524, shutter control operation is effected to control the leading and trailing blades of the shutter for exposing the film by a calculated shutter speed.

Thereafter, at step #526, the after-release flag AFTER is set to "1". At step #528, the release prohibit flag RELDIS is set to "1" indicating the prohibit state. At step #530, a film counter in the display panel 15 is incremented. At step #532, the shutter is charged and the film is advanced by one frame.

Subsequently, checking is made at step #534 whether the film is finished (end of roll) or not. If the film is not finished, the program jumps to the stop routine "STP" at step #540. If the film is finished, the flash charging request flag CHGREQ is reset to "0" for not requesting the flash charging at step #542. Then, at step #550, the program jumps to the rewind control routine "REW" for rewinding the film into the cartridge.

Figure 11:
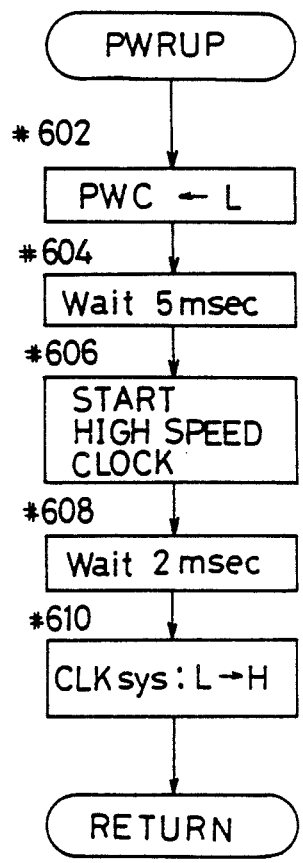

FIG. 11 is a flow chart of the subroutine "PWRUP" for switching the operating mode to the high-speed clock mode.

In this subroutine, the control signal PWC is first changed to low level at step #602 for starting the DC-DC converter 140. After waiting for 5 ms at step #604 till stabilization of operation of the DC-DC converter 140, oscillation of the 8.38 MHz high-speed clock signal is started at step #606. After waiting for 2 ms at step #608 till stabilization of the high-speed clock signal oscillation, the system clock CLKsys is switched to the high-speed clock signal at step #610. As a result, the operating mode is switched to the high-speed clock mode. Thereafter, the program returns to the routine called earlier.

Figure 12:
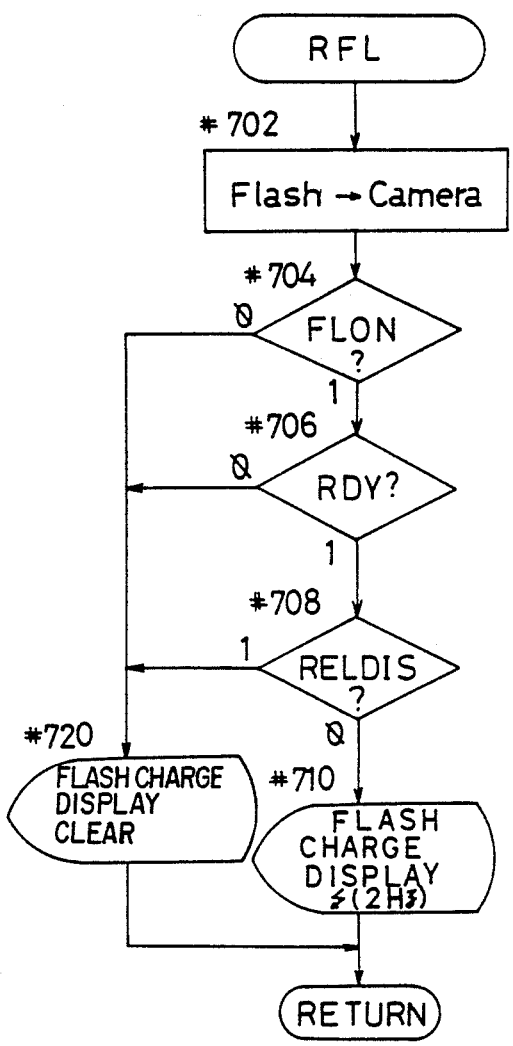

FIG. 12 shows a flow chart of the subroutine "RFL" for receiving flash data from the flash CPU 710 through the serial communication therewith.

When this subroutine is called, various flash data are input at step #702 through the serial communication with the flash CPU 710. The flash data includes a signal indicating the type of the flash unit 7, flash on/off signal FLON, flash charge signal RDY, popping state signal INPOP, etc.

Subsequently, the flash on/off signal FLON and flash charge signal RDY are checked at steps #704 and #706. The release prohibit flag RELDIS is checked at step #708. At step #710, the display meaning the charging completed state is displayed in a 2 Hz cycle by the LED if the flash unit 7 is in the auto mode, the light emitter 7A is projecting from the flash unit body 7B, the main capacitor of the flash unit 7 is charged fully, and the release prohibit flag RELDIS is reset to "0" permitting the shutter releasing operation. In the event that even one of these conditions is not met, the charging completed state display is turned off at step #720 and the program returns to the routine called earlier.

Figure 13:
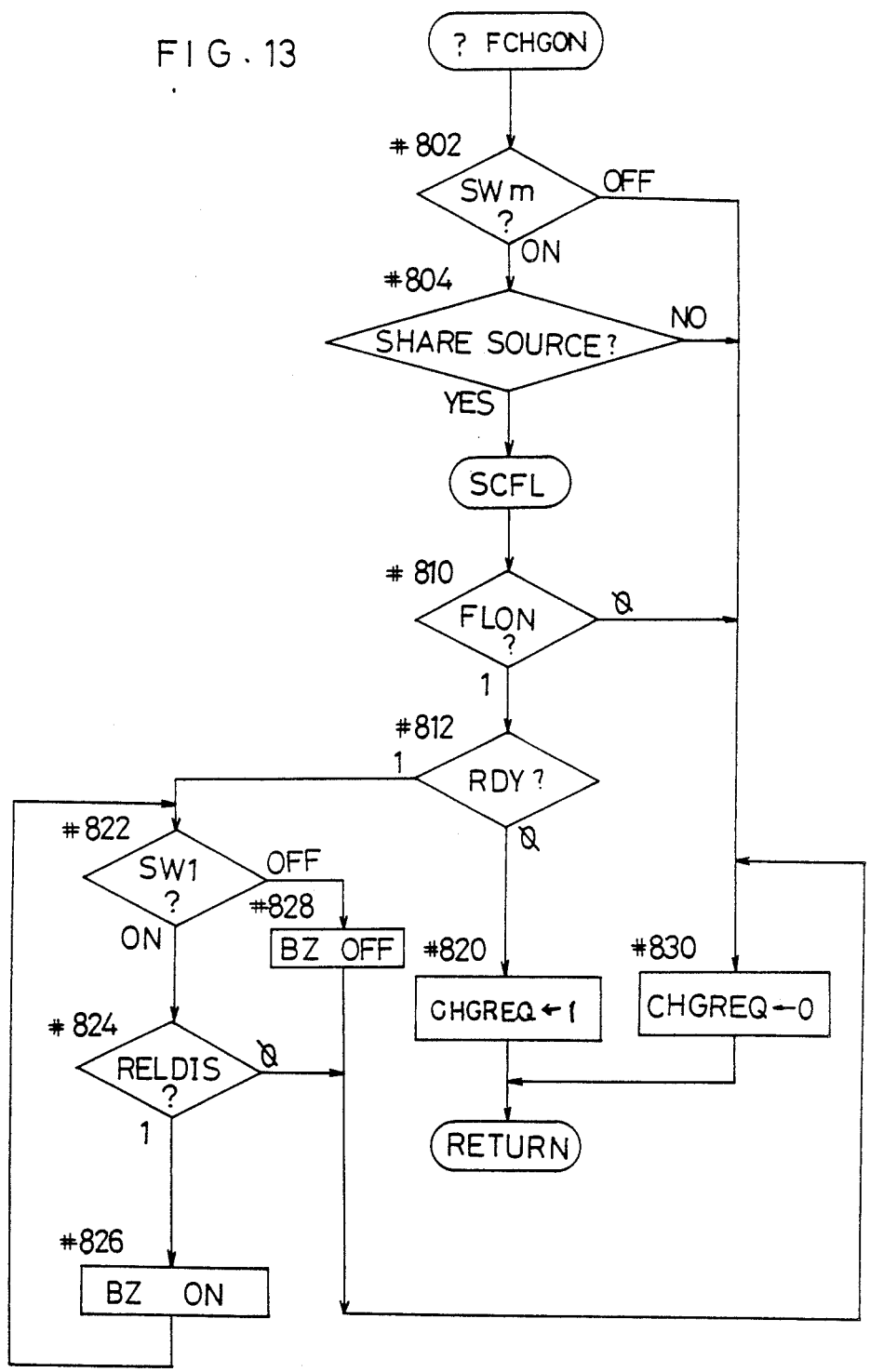

FIG. 13 shows a flow chart of the subroutine "?FCHGON" for judging whether the flash charging is possible or not.

When this subroutine is called, the state of the main switch SWm is first checked at step #802. If the main switch SWm is open, the flash charging request flag CHGREQ is reset to "0", and the program returns to the routine called earlier.

If step #802 finds the main switch SWm closed, checking is made as to the type of the flash unit attached to the camera body 1 at step #804. If the flash unit is not the source sharing type, flash charging request flag CHGREQ is reset to "0", and the program returns to the routine called earlier.

If step #804 finds the flash unit 7 to be the source sharing type, the program moves to a source sharing type processing routine SCFL beginning with step #810. In this routine, the flash on/off signal FLON is first checked at step #810. If the flash on/off signal FLON is reset to "0" indicating that the flash unit 7 cannot be used, the flash charging request flag CHGREQ is reset to "0" at step #830, and the program returns to the routine called earlier.

If step #810 finds the flash on/off signal FLON set to "1" indicating that the flash unit 7 can be used, the flash charge signal RDY is checked at step #812. If the flash charge signal RDY is reset to "0" indicating the charging incomplete state, the flash charging request flag CHGREQ is set to "1" at step #820 for requesting the flash charging. Thereafter, the program returns to the routine called earlier.

If step #812 finds the flash charge signal RDY set to "1" indicating the charging completed state, the metering switch SW1 is checked at step #822. If the metering switch SW1 is closed, the release prohibit flag RELDIS is checked at step #824. If the release prohibit flag RELDIS is set to "1" prohibiting the shutter release operation, the drive signal is output to the buzzer 580 at step #826 for continuously sounding the buzzer 580 to notify the user that the charging incomplete release lock state has changed into the charging completed state. The program then returns to step #822 to repeat the loop to step #826 until the metering switch SW1 is opened.

If step #822 finds the metering switch SW1 open, the drive signal to the buzzer 580 is stopped at step #828, which is followed by step #830. If step #824 finds the release prohibit flag RELDIS reset to "0" permitting the shutter release operation, the program just moves to step #830. After resetting the flash charging request flag CHGREQ to "0" at step #830, the program returns to the routine called earlier.

Figure 14:
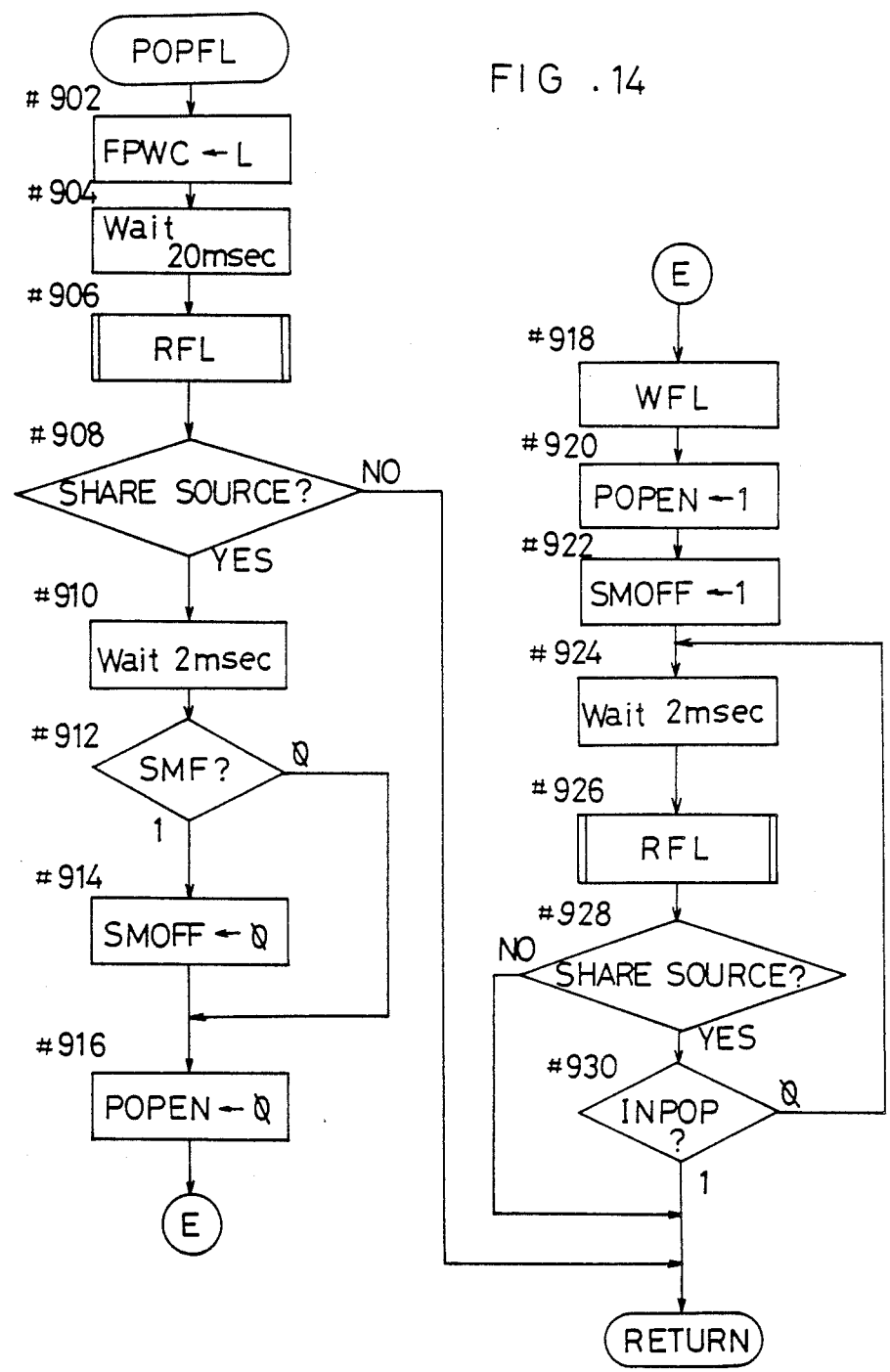

FIG. 14 shows the subroutine "POPFL" for causing the flash popping operation of the flash unit 7.

When this subroutine is called, the control signal FPWC is first changed to low level at step #902 for starting the power supply to the control circuit 700 of the flash unit 7. After waiting for 20 ms at step #904 for resetting of the flash CPU 710, the subroutine "RFL" is called at step #906 for receiving the flash data from the flash CPU 710 through the serial communication therewith. Thereafter, at step #908, the type of the flash unit is judged from the flash data obtained through the serial communication.

If the flash unit is not the source sharing type, the program just returns to the routine called earlier. If the flash unit 7 is the source sharing type, the program waits for 2 ms at step #910 and then checks the main switch flag SMF at step #912. Only when the main switch flag SMF is set to "1" with the main switch SWm open, the main switch opening and closing signal SMOFF is reset to "0" at step #914 for causing the flash pop-down. Thereafter, at step #916, the popping enable signal POPEN is reset to "0".

Subsequently, at step #918, the serial communication is made with the flash CPU 710 for transmitting the main switch opening and closing signal SMOFF and popping enable signal POPEN to the flash CPU 710. Then the two signals SMOFF and POPEN are set to "1" at steps #920 and #922.

After waiting for 2 ms at step #924, the subroutine RFL is called at step #926 for receiving the flash data from the flash CPU 710 through the serial communication therewith. Thereafter, at step #928, the type of the flash unit is judged from the flash data obtained through the serial communication.

If the flash unit is not the source sharing type, the program just returns to the routine called earlier. If the flash unit 7 is the source sharing type, the state of the popping state signal INPOP is checked at step #930. If the popping state signal INPOP is set to "1" indicating that the flash-popping action is not taking place, the program returns to the routine called earlier. If the popping state signal INPOP is reset to "0" indicating that the flash-popping action is taking place, the program returns to step #924 for repeating the above operation.

Figure 15:
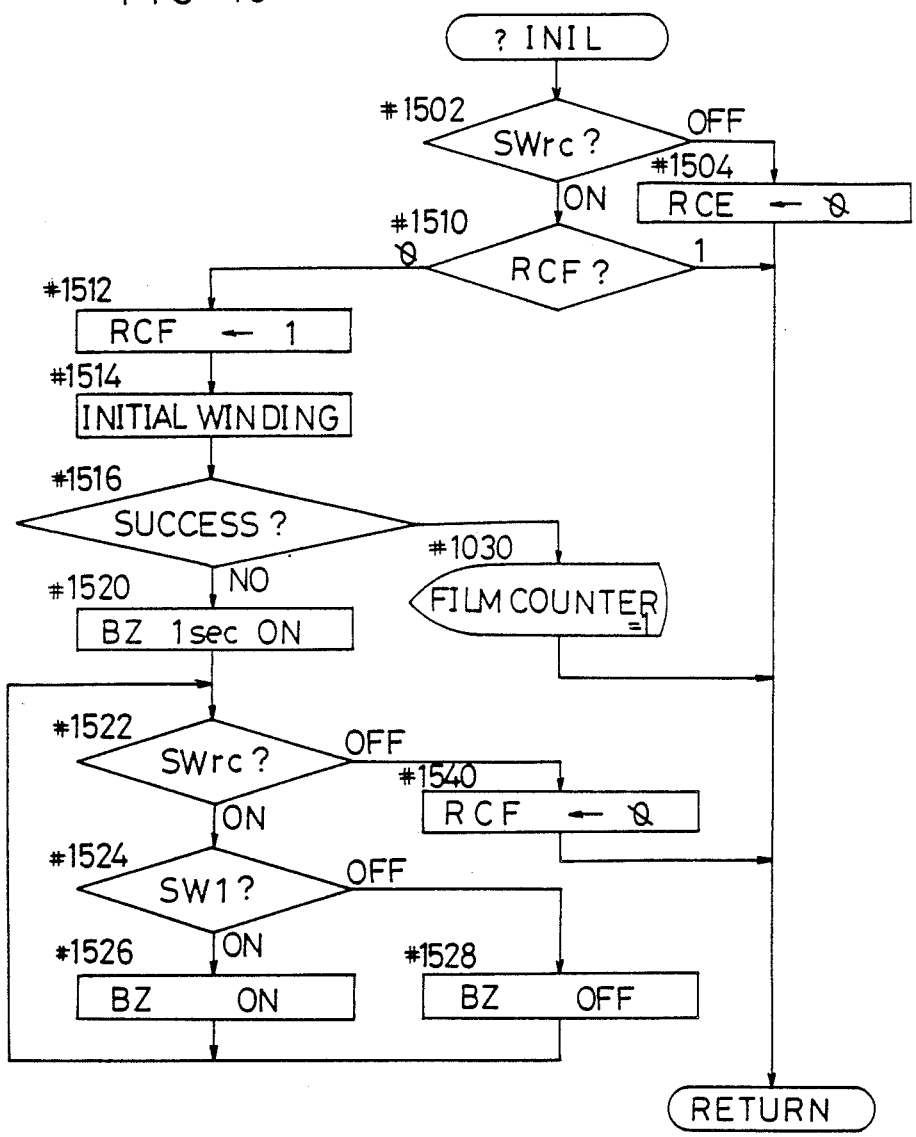

FIG. 15 shows a flow chart of the subroutine "?INIL" for carrying out the initial film winding operation and judging its success or failure.

This subroutine is associated with the loading of the film and is executed for automatically advancing and setting the film to the first frame when the back cover of the camera is closed.

When this subroutine is called, the state of the back-cover switch SWrc is first checked at step #1502. If the back cover is open, the back-cover flag RCF is reset to "0" at step #1504. Thereafter the program returns to the routine called earlier.

If step #1502 finds the back cover closed, the back-cover flag RCF is checked at step #1510. If the back-cover flag RCF is set to "1", it indicates that the back cover has remained closed since the previous checking. Thus the program just returns to the routine called earlier. If the back-cover flag RCF is reset to "0", it indicates that the back cover is closed from an open state. Thus the back-cover flag RCF is set to "1" at step #1512.

Next, the winding motor 391 is driven at step #1514 for starting the initial film winding operation and advancing the film a predetermined amount (four frames, for example) to be ready for photographtaking.

Various methods have heretofore been proposed regarding the initial film winding, which themselves do not pertain to the subject matter of the present invention and are not particularly described herein. In any case, the initial film winding could fail when the back cover of the camera is closed with the leading end of the film set to an inappropriate position or by other causes. If the user takes photographs without knowing this failure, the results would be as if the camera were empty of a film. The following routine is provided so that, even if such a winding failure should occur, it would not result in serious consequences.

At step #1516, checking is made after completion of the initial film winding operation whether the operation was successful or not. If the operation was successful, the liquid crystal display circuit 510 is driven at step #1530 for displaying the film count "1" on the display panel 15. Thereafter the program returns to the routine called earlier. If the initial film winding operation failed, the buzzer 580 is sounded for one second by way of warning at step #1520. The program then executes the release lock processing routine beginning with step #1522.

At step #1522, the state of the back-cover switch SWrc is checked. If the switch SWrc is closed, the state of the metering switch SW1 is checked at step #1524. If the metering switch SW1 is closed, the buzzer 580 is sounded at step #1526. If the metering switch SW1 is open, the buzzer 580 is stopped and the program returns to step #1522.

Thus, in the event of a failure in the initial film winding operation, the release lock state is established. When in this state the shutter release button 11 is operated, the buzzer 580 is sounded for warning the user while the release button 11 is operated.

When step #1522 detects opening of the back-cover switch SWrc indicating opening of the back cover, the back-cover flag RCF is reset to "0" at step #1540. Thereafter the program returns to the routine called earlier. In other words, when a failure occurs in the initial film winding operation, the release lock is turned on until the back cover is opened.

Figure 16:
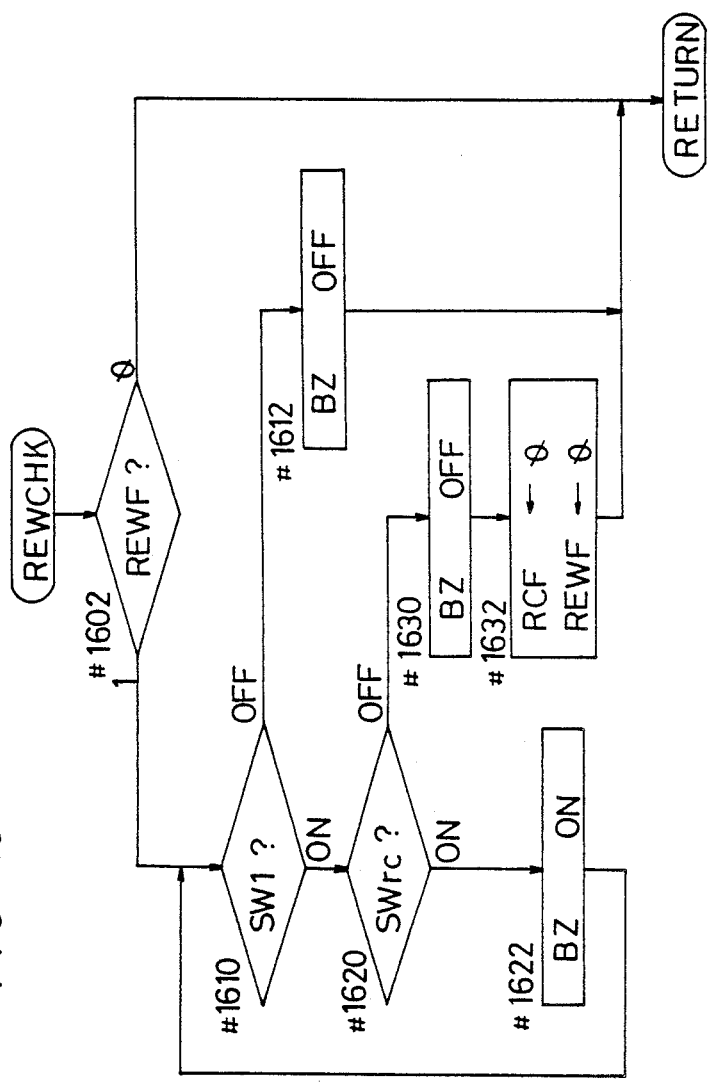

FIG. 16 shows a flow chart of the subroutine "REWCHK" for checking the film rewinding.

This subroutine checks the state of film rewinding and includes a process for preventing photo-taking by turning on the release lock when the rewinding is completed.

When this subroutine is called, the rewind flag REWF is first checked at step #1602. If the rewind flag REWF is reset to "0", it indicates a normal state and the program returns to the routine called earlier. If the rewind flag REWF is set to "1", it indicates the rewinding completed state and, therefore, the metering switch SW1 is checked at step #1610.

If the metering switch SW1 is closed, the back-cover switch SWrc is checked next at step #1620. If the back-cover switch SWrc is closed, the buzzer 580 is sounded at step #1622. The program then returns to step #1610. If step #1610 finds the metering switch SW1 open, the buzzer 580 is stopped at step #1612 and the program returns to the routine called earlier.

If step #1620 finds the back-cover switch SWrc open indicating that the back cover is opened, the buzzer 580 is stopped at step #1630, and both the back-cover flag RCF and rewind flag REWF are reset to "0". Thereafter the program returns to the routine called earlier.

This subroutine is called to the switch processing routine "SON", that is when the release button is depressed. Therefor, when the film rewinding is completed, this subroutine moves around the loop steps #1610 to #1622 and back to #1610 until the operation of the release button 11 is stopped or the back lid is opened to take out the film. In this way the user is notified of the rewinding completed state in a simple and effective way.

Figure 17:
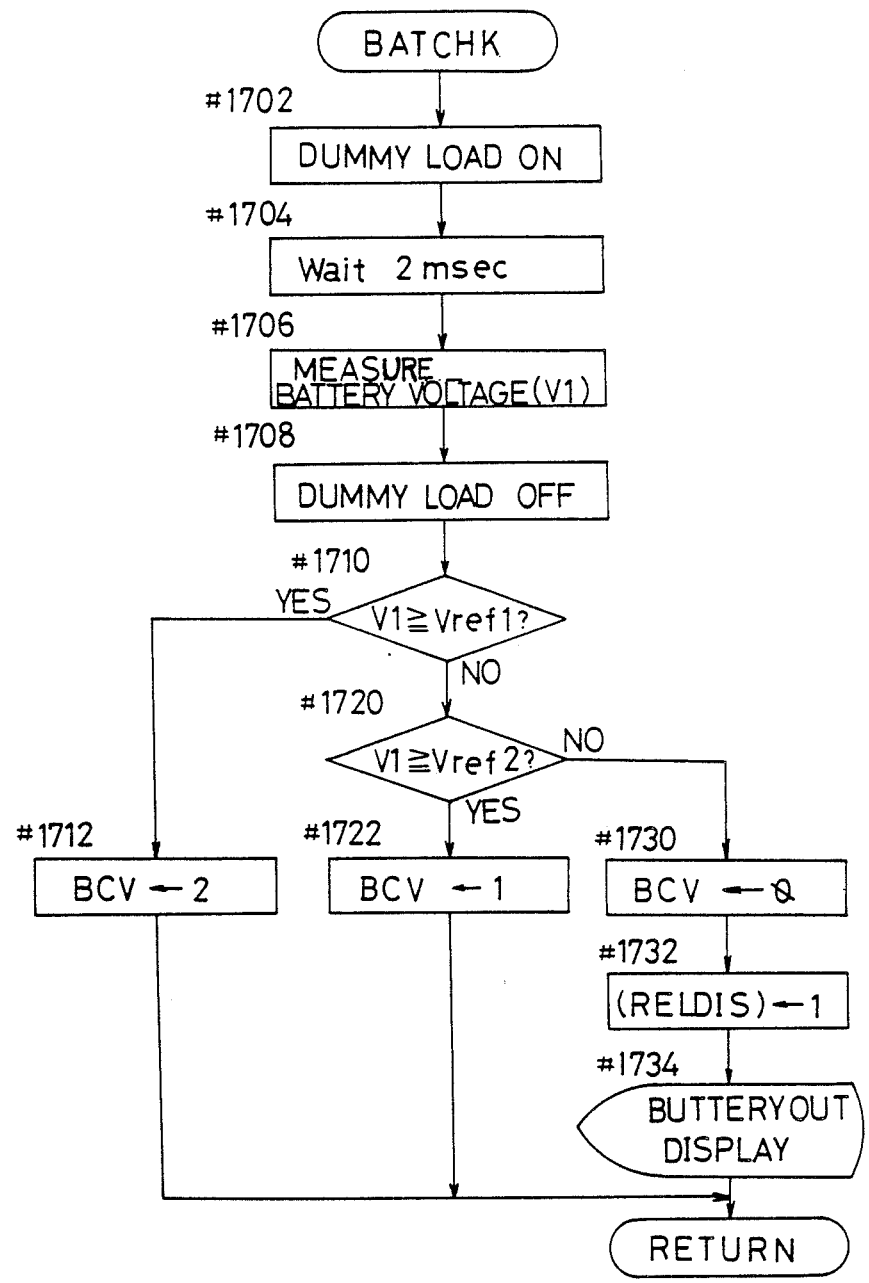

FIG. 17 shows the subroutine "BATCHK" for checking the battery capacity.

This subroutine checks the capacity of the source battery 130 by actuating the battery checking circuit 134, and outputs results of the checking in the following three ways: $BCV=2$ when a sufficient capacity is available for the flash charging, $BCV=1$ when the capacity is not sufficient for the flash charging but allows a camera operation in the ambient-light mode without flash light, and $BCV=0$ when the source battery 130 is so exhausted that it does not assure even a normal operation in the ambient-light mode.

The battery checking circuit 134 causes a dummy current to flow to a dummy load only when checking the battery capacity. A value V1, which is derived by dividing the battery voltage Vdd0 of the source battery 130 by the resistance, is measured as a value relating to a decrease in the battery voltage of the time. This value V1 is compared with reference values Vref1 and Vref2 (wherein Vref1 is greater than Vref2), whereby the above BCV values are determined.

When this subroutine "BATCHK" is called, a signal is output to the battery checking circuit 134 at step #1702 for causing the dummy current to flow to the dummy load. After waiting for 2 ms at step #1704 until the load state becomes stable, the value V1 derived by dividing the battery voltage Vdd0 is measured at step #1706. Then a signal is output at step #1708 for stopping the flow of the dummy current to the dummy load.

Next, the value V1 measured at step #1706 is compared with the reference value Vref1 at step #1710. If the value V1 is equal to or greater than the reference value Vref1, it is judged that only a minor decrease has occurred in the battery voltage, leaving a sufficient capacity for the flash charging. Then, after setting $BCV=2$ at step #1712, the program returns to the routine called earlier.

If step #1710 finds the value V1 smaller than Vref1, step #1720 compares the value V1 with the reference value Vref2 which is smaller than Vref1. If the value V1 is equal to or greater than Vref2, which means that the value V1 is smaller than Vref1 and equal to or greater than Vref2, it is judged that the battery capacity is not sufficient for the flash charging but allows a the normal operation in the ambient-light mode without the flash light. Then, after setting $BCV=1$ at step #1722, the program returns to the routine called earlier.

If step #1720 finds the value V1 smaller than Vref2, it is judged that the source battery 130 is so exhausted that the normal camera operation is not assured. Then, $BCV=0$ is set at step #1730, the release prohibit flag RELDIS is set to "1" at step #1732, indicating the release prohibit state, and the liquid crystal display circuit 510 is driven at step #1734 for indicating that the camera operation is impossible because of battery exhaustion. Then the program returns to the routine called earlier.

Figure 18:
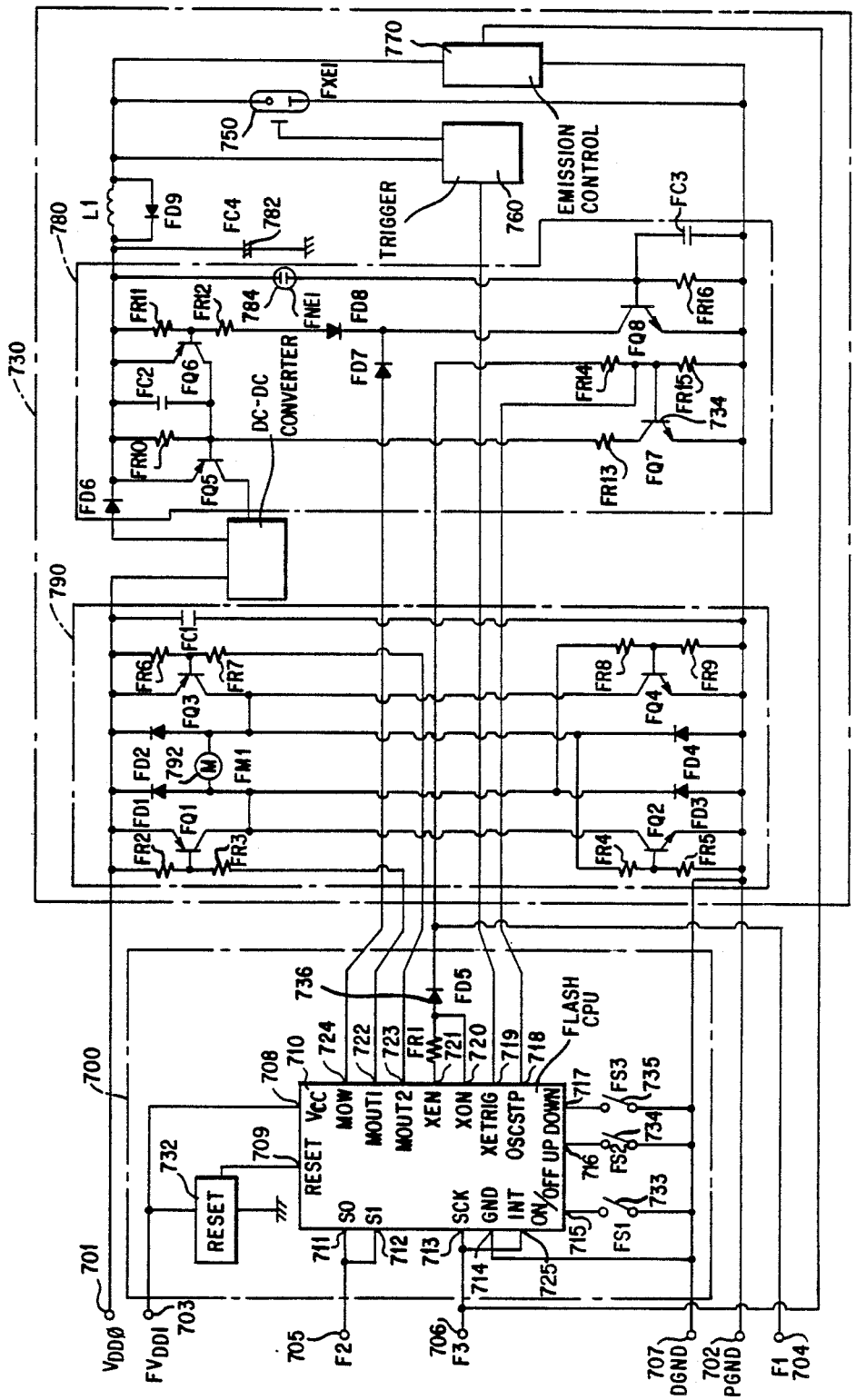
FIG. 18 is a diagram showing a circuitry in the flash unit.

Next, the internal electric circuit of flash unit 7 will be described further with reference to FIG. 18.

As already described, reference 700 denotes the control circuit, and reference 710 denotes the flash CPU for controlling the flash charging and flash light emission and making the serial communication with the body CPU 200. Reference 732 denotes the reset circuit, and reference 730 denotes the boosting and flashing circuit. References 701 to 707 denote the group of contacts arranged on the foot of the flash unit 7.

The boosting and flashing circuit 730 includes a DC-DC converter 740 for boosting the voltage supplied from the camera body 1. Reference 750 denotes a xenon tube mounted in the light emitter 7A for flashing light. Reference 760 denotes a trigger circuit for actuating the xenon tube 750. Reference 770 denotes a flash light amount control circuit for stopping the xenon tube 750 in response to results of the detected flash light amount provided from the camera body 1.

Reference 780 denotes a charging control circuit for controlling charging of the main capacitor 782 for flashing. The charging control circuit 780 includes a neon tube 784 which is turned on to allow charging of the main capacitor 782 when the voltage applied to the main capacitor 782 exceeds a predetermined level.

Reference 790 denotes an up-down circuit for moving the light emitter 7A into and out of the flash unit body 7B. The up-down circuit 790 drives a popping motor 792 in opposite directions for effecting the flash pop-up and flash pop-down (the flash popping operation) through the drive mechanism described later.

Reference 708 denotes a source terminal of the flash CPU 710. Reference 709 denotes a reset terminal, and the flash CPU 710 is reset and started by a pulse signal in low level input through the reset terminal 709. Reference 714 denotes a grounding terminal of the flash CPU 710.

Reference 711 denotes a data output terminal S0 for outputting the data in the serial communication with the body CPU 200. Reference 712 denotes a data input terminal S1 for receiving the data in the serial communication with the body CPU 200. Reference 713 denotes an input terminal for receiving the clock signal during the serial communication.

Reference 733 denotes an operating switch FSW1 of the flash unit 7, whose signal is input to an input terminal 715 of the flash CPU 710. Reference 734 denotes an up detection switch FSW2 which is closed when the light emitter 7A is projected, and whose signal is input to an input terminal 716 of the flash CPU 710. Reference 735 denotes a down detection switch FSW3 which is closed when the light emitter 7A is retracted, and whose signal is input to an input terminal 717 of the flash CPU 710. Each of the switches FSW1–FSW3 has one end thereof grounded and the other end pulled up inside the flash CPU 710.

Reference 718 denotes an output terminal for outputting a control signal OSC-STP to effect boosting operation of the boosting and flashing circuit 730. The boosting operation is stopped when the control signal OSC-STP is in low level. Reference 719 denotes an output terminal for outputting a trigger signal XWTRIG to actuate the xenon tube 750.

Reference 720 denotes an input terminal for receiving the state signal XON of the X-contact switch 180 in the camera body 1. As described hereinbefore, the closure of the X-contact switch 180 occurring during the shutter releasing operation is detected on the basis of the change to low level of the signal line L4 pulled up during the shutter releasing operation. Reference 711 denotes an output terminal for outputting a signal XEN to pull up the signal line L4 during the shutter releasing operation. References 722 and 723 denote output terminals for outputting control signals MOUT1 and MOUT2 to the motor 792 of the up-down circuit 790.

Reference 724 denotes an input terminal for receiving a charge detection signal MON to detect the charging state. The charge detection signal MON is in low level in the charging completed state, and in high level in the charging incomplete state.

Reference 725 denotes an interrupt input terminal. An interrupt occurs when the clock signal is input from the body CPU 200 to the interrupt input terminal 725 during the serial communication with the body CPU 200.

The table below shows states of the flash popping operation in relation to operations of the camera body 1 and to states of the switches FSW1–FSW3 of the flash CPU 710.

Figure 19A:
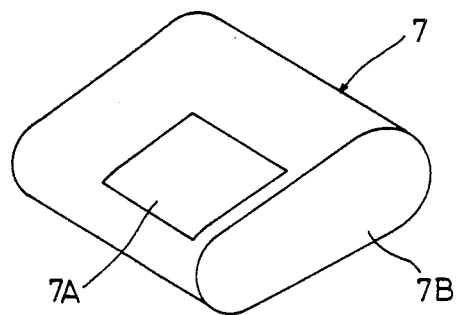
FIG. 19A is a perspective view of the flash unit in a contained position.
Figure 19B:
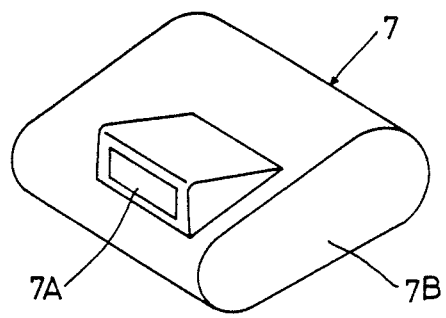
FIG. 19B is a perspective view of the flash unit in a projecting position.

In the column of the flash popping state in this table, the "down" represents the contained position of the light emitter 7A shown in FIG. 19A, and the "up" represents the projecting position thereof shown in FIG. 19B.

Next, the drive mechanism DM mounted in the flash unit 7 for effecting the flash popping operation will be described.

Figure 20A:
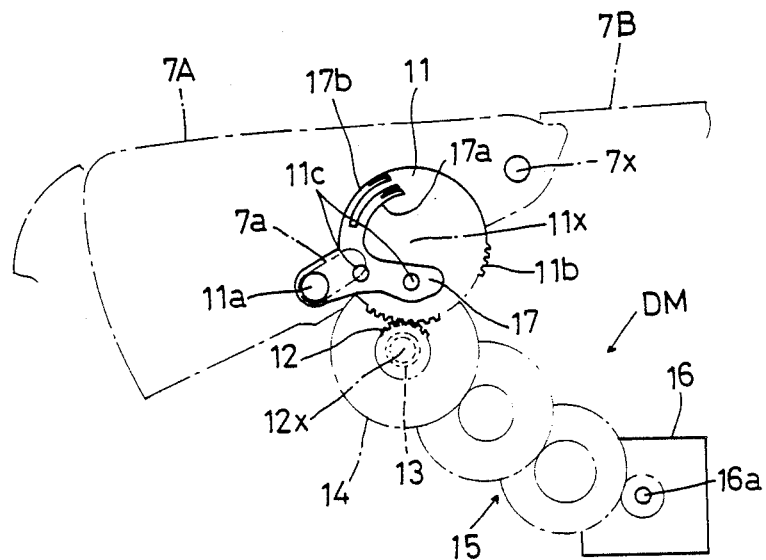
FIG. 20A is a side view of a drive mechanism installed in the flash unit in the contained position.
Figure 20B:
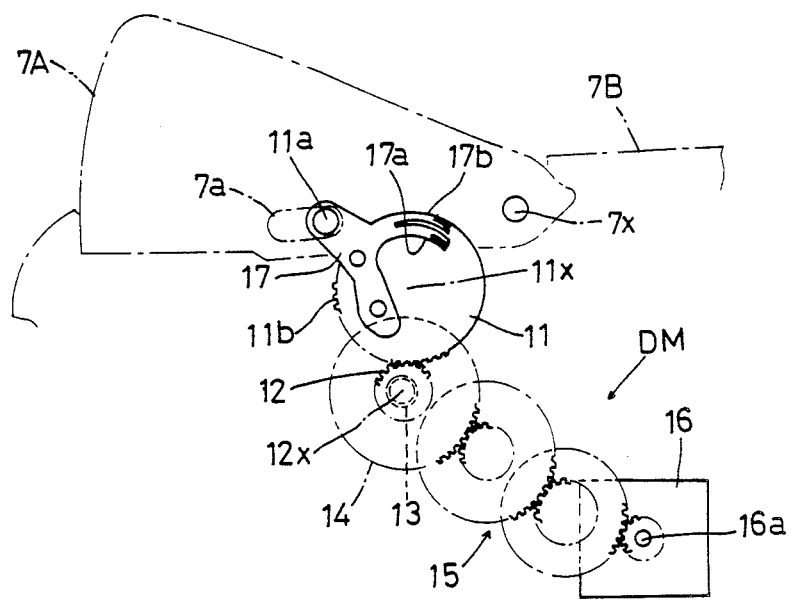
FIG. 20B is a side view of the drive mechanism installed in the flash unit in the projecting position.

As shown in FIGS. 20A and 20B, the light emitter 7A is attached to the flash unit body 7B to be pivotable on an axis 7x. The light emitter 7A defines a cam bore 7a in a lateral position thereof. The cam bore 7a receives a drive pin 11a secured to one end of a drive member 11 rotatable on an axis 11x. The drive member 11 defines a gear portion 11b on a peripheral position thereof, and a pinion 12 is meshed with this gear portion 11b. The pinion 12 is connected through a compression coil spring 13 to a gear 14 rotatable on an axis 12x on which the pinion 12 is also rotatable. The gear 14 is operatively connected through a gear train 15 to a drive shaft 16a of the pop motor 16 (referenced 792 in FIG. 18) of the up-down circuit 790.

FIG. 20A shows the light emitter 7A in the contained position. When, in this position, the pop motor 16 is driven clockwise in the drawing, the gear 14 is rotated counterclockwise through the gear train 15. The pinion 12 connected to the gear 14 through the compression coil spring 13 is also rotated counterclockwise, whereby the drive member 11 rotates clockwise with the drive pin 11a moving rightward in the drawing inside the cam bore 7a of the light emitter 7A. Consequently, the light emitter 7A pivots clockwise on the axis 7x to project from the flash unit body 7B. This is the flash pop-up.

FIG. 20B shows the light emitter 7A in the operable position projecting as a result of the above flash pop-up. When, in this position, the pop motor 16 is driven counterclockwise in the drawing, the gear 14 is rotated clockwise through the gear train 15. The pinion 12 connected to the gear 14 through the compression coil spring 13 is also rotated clockwise, whereby the drive member 11 rotates counterclockwise with the drive pin 11a moving leftward inside the cam bore 7a of the light emitter 7A. Consequently, the light emitter 7A pivots counterclockwise on the axis 7x to retract into the flash unit body 7B. This is the flash pop-down.

The light emitter 7A is set to the contained and projecting positions through abutment with stoppers (not shown), respectively. The pop motor 16 is kept driven for a brief time after the light emitter 7A comes into abutment with either stopper, so that the light emitter 7A is positively held in the projecting or contained position. At this time the compression spring 12 disposed between the pinion 12 and gear 14 allows slippage therebetween, whereby no excessive force will act on the pop motor 16, gear train 15 and other components of the drive mechanism DM.

The light emitter 7A may be stopped moving during

| Camera Operation | State Signal | Operating Switch | Up Detect Switch | Down Detect Switch | Flash Popping | Flash Possibility |
|---|---|---|---|---|---|---|
| *main sw ON | POPEN = 0 | ON | 0 | 1 | stay up | possible |
|  |  |  | 1 | 1 | move up | possible aft move up |
|  |  |  | 1 | 0 |  |  |
| *meter sw OFF |  | OFF | 0 | 1 | move down | not possible |
|  |  |  | 1 | 1 |  |  |
|  |  |  | 1 | 0 | stay down |  |
| *main sw OFF | POPEN = 0 | ON | 0 | 1 | move down |  |
|  |  |  | 1 | 1 |  |  |
|  | AND |  | 1 | 0 | stay down |  |
|  | SMOFF = 0 | OFF | 0 | 1 | move down |  |
|  |  |  | 1 | 1 |  |  |
|  |  |  | 1 | 0 | stay down |  | the flash pop-up or pop-down by some cause such as by contact with a hand of the user. The compression spring 13 will then similarly allow slippage between the pinion 12 and gear 14 for protecting the drive mechanism DM from the excessive force.

Further, this construction allows the user to manually move the light emitter 7A from the contained position to the projecting position or vice versa when, for example, the capacity of source battery 130 is not sufficient for driving the pop motor 16.

In other words, the compression spring 13 has such a spring constant that allows slippage between the pinion 12 and gear 14 under a torque exceeding a normal drive torque for causing the flash popping.

Figure 21:
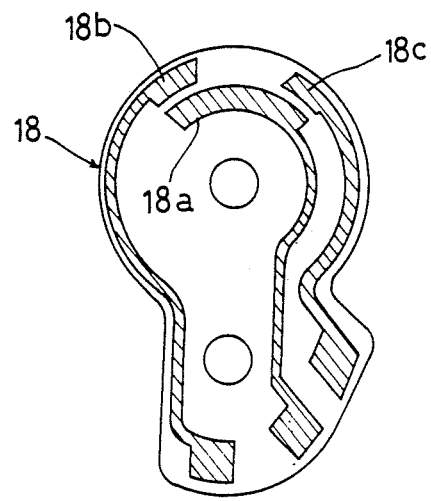
FIG. 21 is a front view of a switch substrate in the drive mechanism.

The drive member 11 defines a pair of bosses 11c to which a switch armature 17 is secured by caulking. The switch armature 17 is opposed to a switch substrate 18 patterned as shown in FIG. 21.

The switch armature 17 includes a pair of brushes 17a and 17b. The first brush 17a slidable on a first pattern 18a of the switch substrate 18 with the rotation of the drive member 11 over an entire range of rotation. The second brush 17b is slidable on a second pattern 18b of the switch substrate 18 with the rotation of the drive member 11 at one end of the range of rotation corresponding to the contained position of the light emitter 7A, and on a third patter 18c of the switch substrate 18 with the rotation of the drive member 11 at the other end of the range of rotation corresponding to the projecting position of the light emitter 7A.

The second pattern 18b and the third pattern 18c of the switch substrate 18 are connected to the input terminals 717 and 716 of the flash CPU 710, respectively, with the first pattern 18a grounded. The first pattern 18a and the third pattern 18c constitute the up detecting switch FSW2 for detecting the light emitter 7A in the projecting position. The first pattern 18a and the second pattern 18b constitute the down detection switch FSW3 for detecting the light emitter 7A in the contained position.

The second brush 17b of the switch armature 17 comes into sliding contact with the third pattern 18c or the second pattern 18b of the switch substrate 18 just before the light emitter 7A in the projecting or contained position abuts upon the stopper. Thus, the flash CPU 710 positively sets the light emitter 7A to either position by continuously driving the pop motor 16 for a predetermined time after the closure of the detection switch FSW1 or FSW2 resulting from the sliding contact.

Figure 22:
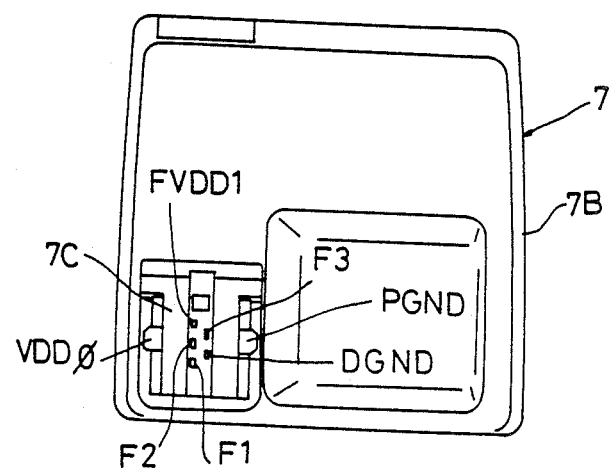
FIG. 22 is a bottom view of the flash unit.

FIG. 22 is a bottom view of the flash unit 7. The group of contacts 701-707 (Vdd0, PGND, FVdd1, F1, F2, F3 and DGND) are arranged on the foot 7C as shown in FIG. 22. On the other hand, the group of contacts 101-107 (Vdd0, PGND, FVdd1, F1, F2, F3 and DGND) are arranged on the hot shoe 1B of the camera body 1 as shown in FIG. 1C.

FIG. 1A shows the flash unit (hereinafter referred to as the new flash unit) 7 having the group of contacts 701-707 arranged on the foot 7C as shown in FIG. 22, attached to the camera body (hereinafter referred to as the new camera body) 1 having the group of contacts 101-107 arranged on the hot shoe 1B as shown in FIG. 1C.

In addition, a known flash unit (hereinafter referred to as the old flash unit) 7' may be attached to the new camera body 1 by employing a first adapter 21 therebetween. Conversely, the new flash unit 7 may be attached to a known camera body (hereinafter referred to as the old camera body) 1' by employing a second adapter 22 therebetween.

Figure 23:
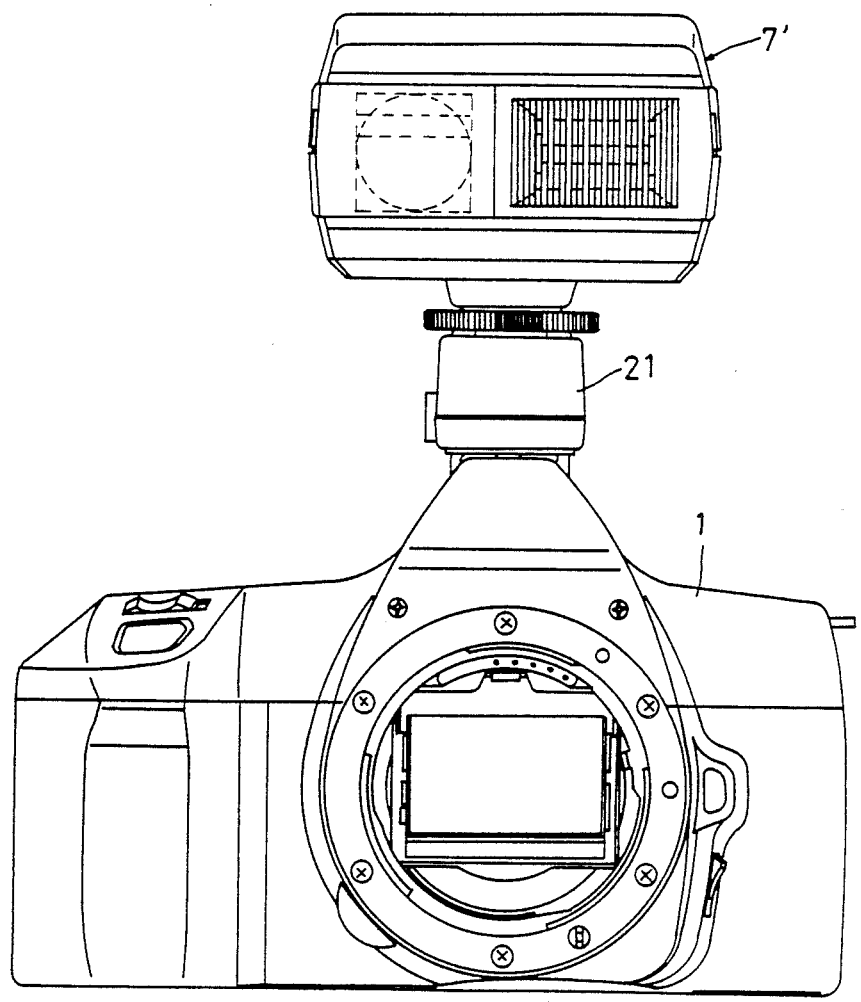
FIGS. 23 and 24 are front views of camera systems, respectively.
Figure 24:
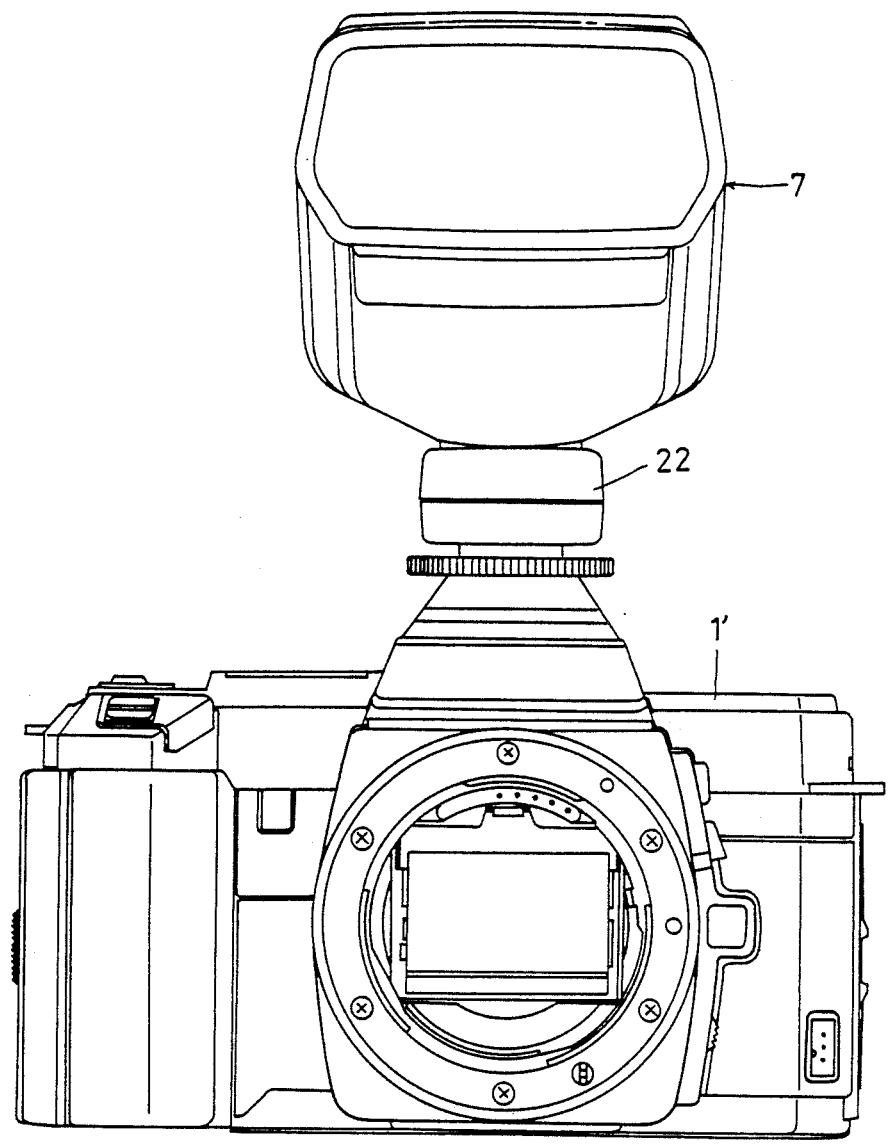

FIG. 23 shows the old flash unit 7' attached to the new camera body 1. FIG. 24 shows the new flash unit 7 attached to the old camera body 1'. The old camera body 1' shown in FIG. 24 is not adapted for supplying power to the flash unit 7. Accordingly, the illustrated new flash unit 7 is the type containing a source battery for its exclusive use.

FIGS. 25A through 25E show the first adapter 21 for attaching the old flash unit 7' to the new camera body 1.

FIGS. 26A through 26D show the second adapter 22 for attaching the new flash unit 7 to the old camera body 1'.

The old flash unit 7' may include a control circuit, a boosting and flashing circuit and the like operable by an opposite voltage to the new camera body 1. Therefore, as shown in FIG. 27, the first adapter 21 includes a reverse voltage proofing diode 21a interposed between the contact F1 for transmitting the control signal and the ground terminal DGND.

Next, the operation of the flash CPU 710 will be described with reference to the flow charts shown in FIGS. 28 through 32. The state signals and the like used in these flow charts will be described first.

Reference POPB denotes a popping flag for judging states of the flash popping operation. The flag POPB is set to "0" during a standstill, to "1" during the flash pop-up, and to "2" during the flash pop-down. Reference POPOK denotes a pop stop detection flag which is set to "1" while the light emitter 7A is moving after the closure of the up or down detection switch FSW2 or FSW3 (which movement is hereinafter referred to as the after-run), and to "0" when the light emitter 7A stands still.

Reference FS1 denotes a state signal of the operating switch FSW1. This state signal is set to "0" when the switch FSW1 is closed and to "1" when the switch FSW1 is open. Reference FS2 denotes a state signal of the up detection switch FSW2. This state signal is set to "0" when the switch FSW2 is closed. Reference FS3 denotes a state signal of the down detection switch FSW3. This state signal is set to "0" when the switch FS3 is closed.

Reference FC, CF and REL are all interrupt flags for judging types of interrupts applied to the flash CPU 710. The flag FC relates to the interrupt caused by a signal transmitted from the flash CPU 710 to the body CPU 200. The flag CF relates to the interrupt caused by a signal transmitted from the body CPU 200 to the flash CPU 710. The flag REL relates to the interrupt caused by the release signal. These interrupts are discriminated by means of the flags FC, CF and REL from differences in their ON periods which are FC<CF<REL.

Reference CTR1 denotes a first timer for controlling an operating time for the flash pop-up. The first timer CTR1 has an expiration time set to 2.5 s. Reference CTR2 denotes a second timer for controlling a time for the movement of the light emitter 7A after the closure of the up detection switch FS1 or down detection switch FS2, namely the after-run of the light emitter 7A. The second timer CTR2 has an expiration time set to 10 ms.

Figure 28:
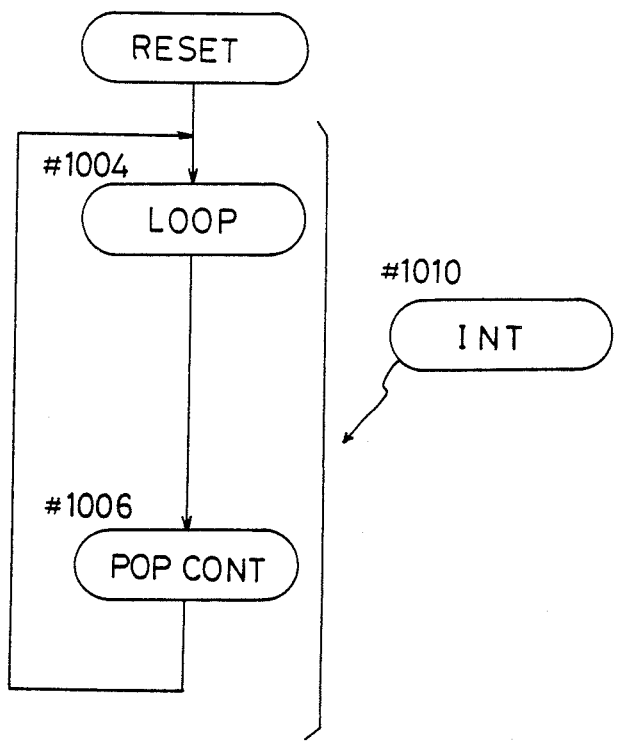
FIGS. 28 through 32 are flow charts illustrating operations of a flash CPU.

FIG. 28 shows a flow chart of a main routine started with the power supply from the body CPU 200.

When this routine is started, a reset routine "RESET" is first executed for carrying out initialization at step #1002. Thereafter, at step #1004, a loop routine "LOOP" is executed for checking the switch inputs and charge state. At step #1006, a pop routine "POPCONT" is executed for controlling the flash popping operation. The program then returns to step #1004 for repeating the above routines. An interrupt routine "INT" is executed at step #1010 when the interrupt is caused by the clock signal input from the body CPU 200 during the loop routine "LOOP" or pop routine "POPCONT".

Figure 29:
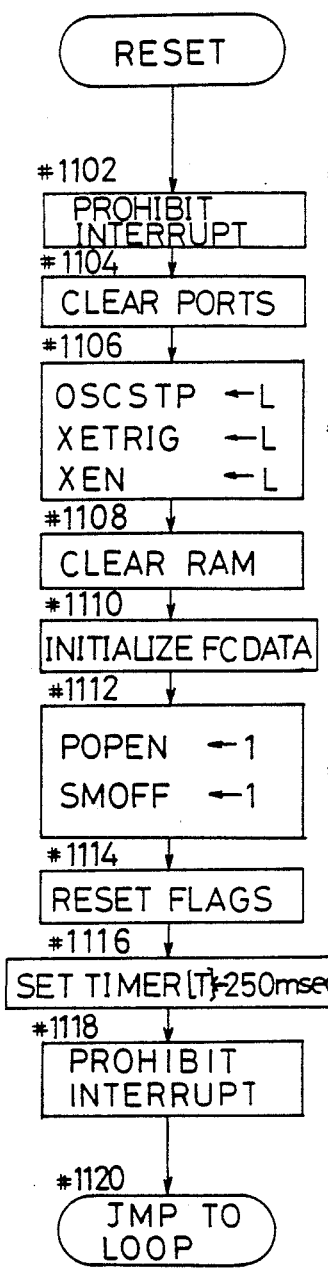

FIG. 29 shows a flow chart of the reset routine "RESET" for carrying out initialization.

In this routine, the various interrupts are first prohibited at step #1102. At step #1104, output port resetting is carried out for initializing the output terminals. At step #1106, the output signals OSCSTP, XETRIG and XEN are all set to low level. At step #1108, the contents of the RAM are cleared. At step #1110, the flash data are initialized. At step #1112, the popping enable signal POPEN and main switch on/off signal SMOFF are set to "1" representing the initial state. Thereafter, the flags are reset at step #1114. At step #1116, the expiration time of the timer is set to 250 ms. After permitting the interrupts at step #1118, the program jumps to the loop routine "LOOP".

Figure 30:
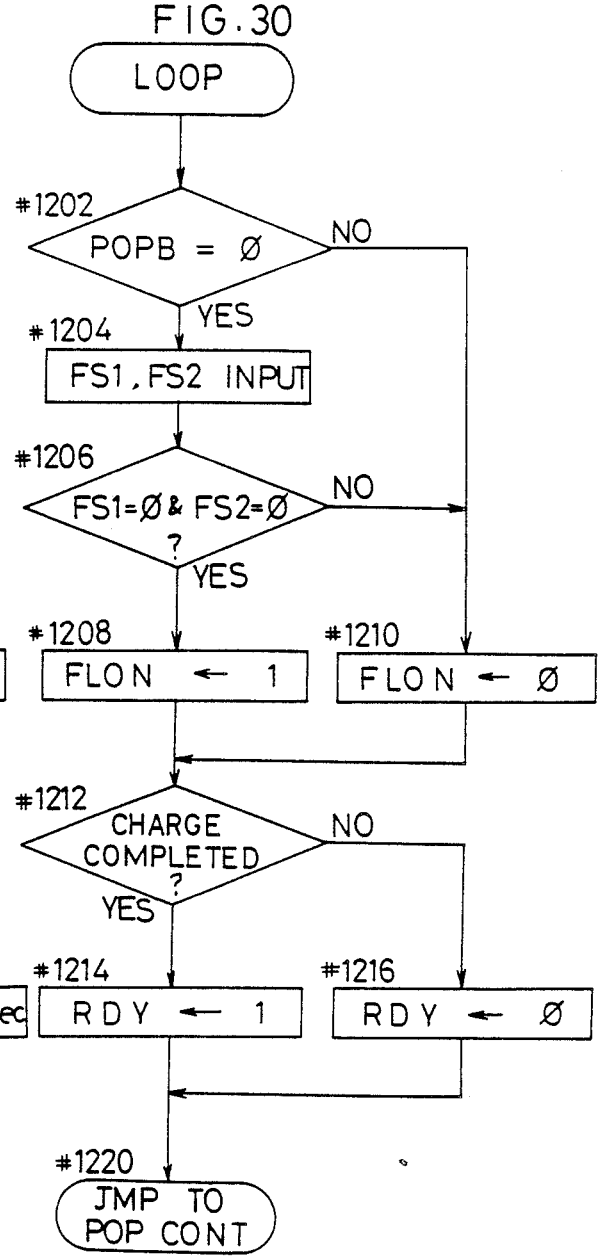

FIG. 30 shows a flow chart of the loop routine "LOOP" for checking the switch inputs and charge state.

In this routine, the popping flag POPB is first checked at step #1202. If the popping flag POPB is reset to "0", that is if the flash popping operation is not taking place, the state signals FS1 and FS2 of the operating switch FSW1 and up detection switch FSW2 are input at step #1204. Thereafter, the state signals FS1 and FS2 are checked at step #1206. If both are closed, that is if the operating switch FSW1 is turned on with the light emitter 7A in the projecting position, the flash on/off signal FLON is set to "1" at step #1208. Then the program moves to step #1212.

If, on the other hand, step #1202 finds the popping flag POPB not set to "0" which means that the flash popping operation is taking place, and if step #1206 finds at least either one of the operating switch FSW1 and up detection switch FSW2 is open, the flash on/off signal FLON is reset to "0" at step #1210 before the program moves to step #1212.

At step #1212, the charge state of the main capacitor 782 is checked. If the charging is completed, the flash charge signal RDY is set to "1" at step #1214. If the charging is incomplete, the flash charge signal RDY is reset to "0" at step #1216. Thereafter, at step #1220, the program jumps to the pop routine "POPCONT".

Figure 31A:
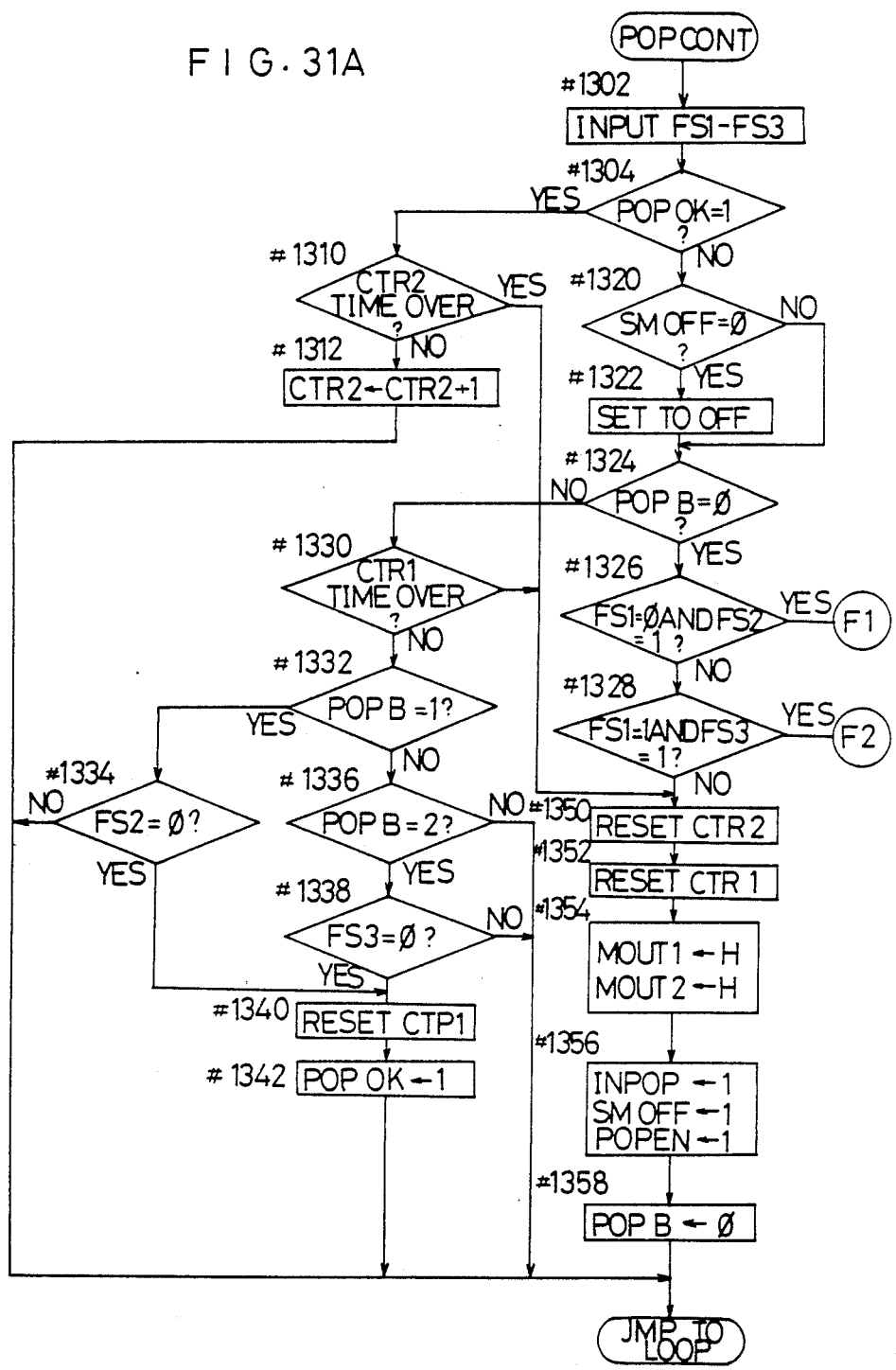
Figure 31B:
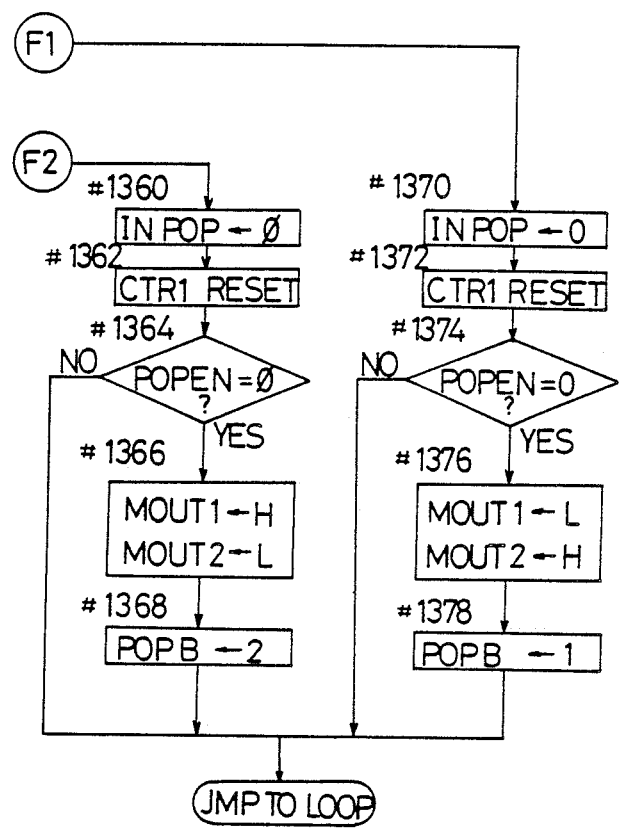

FIGS. 31A and 31B show a flow chart of the pop routine "POPCONT" for controlling the flash popping operation.

In this routine, the state signals FS1, FS2 and FS3 of the operating switch FSW1, up detection signal FSW2 and down detection signal FSW3 are first input at step #1302. At step #1304, the pop stop detection flag POPOK is checked. If the pop stop detection flag POPOK is set to "1" indicating that the light emitter 7A is in the after-run, checking is made at step #1310 whether the second timer CTR2 has expired or not. If the second timer CTR2 has not expired, the light emitter 7A is still in the after-run. Then, after incrementing the second timer CTR2 at step #1312, the program jumps at step #1390 to the loop routine "LOOP". If the second timer CTR2 has expired, the program moves to step #1350.

If, on the other hand, step #1304 finds the pop stop detection flag POPOK reset to "0" with the light emitter 7A standing still, the main switch signal SMOFF is checked at step #1320. Since the main switch signal SMOFF is set to "1" when the flash unit 7 is started, the program normally skips step #1322 and moves to step #1324. The main switch signal SMOFF is reset to "0" when the opening of the main switch SWm is transmitted in the serial communication from the body CPU 200 during the interrupt routine "INT". In this case, the flash unit 7 is forcibly turned off at step #1322 as a result of the closure of the main switch SWm in the camera body 1. Thereafter the program moves to step #1324.

At step #1324, the popping flag POPB is checked. If the popping flag POPB is not reset to "0", this indicates that the flash pop-up or pop-down is taking place. Then, checking is made at step #1330 whether the first timer CTR1 has expired or not.

If the first timer CTR1 has not expired, this indicates that the flash pop-up is taking place. Then, the popping flag POPB is checked steps #1332 and #1336.

If step #1332 finds the popping flag POPB set to "1", this indicates that the flash pop-up is taking place. Then, the up detection signal FS2 is checked at step #1334. If the up detection signal FS2 is "1" yet, the program jumps at step #1390 to the loop routine "LOOP". If the up detection signal FS2 is "0", the program moves to step #1340. If step #1332 finds the popping flag POPB set to "2", this indicates that the flash pop-down is taking place. Then, the down detection signal FS3 is checked at step #1338. If the down detection signal FS3 is "1" yet, the program jumps at step #1390 to the loop routine "LOOP". If the down detection signal FS3 is "0", the program moves to step #1340.

At step #1340, the first timer CTR1 is reset. Next, at step #1342, the pop stop detection flag POPOK is set to "1" indicating the after-run. Thereafter, at step #1390, the program jumps to the loop routine "LOOP".

If, on the other hand, step #1324 finds the popping flag POPB reset to "0", this indicates that the light emitter 7A is standing still. Then, the state signals FS1, FS2 and FS3 are checked at steps #1326 and #1328, for carrying out different processes in accordance with combinations thereof.

If step #1326 finds the operating switch FSW1 is closed and the up detection switch FSW2 is open, the program moves to step #1370. If not, the program moves to step #1328. If step #1328 finds the operating switch FSW1 is open and the down detection switch FSW3 is open, the program moves to step #1360. If not, the program moves to step #1350. In other words, the light emitter 7A need not be moved when the light emitter 7A is in the projecting position with the operating switch FSW1 closed and when the light emitter 7A is in the contained position with the operating switch FSW1 open. In this case, the program moves to a rest routine beginning with step #1350 for maintaining the light emitter 7A at a standstill.

The program moves to step #1350 also when step #1310 finds the second timer CTR2 expired, that is the after-run has completed, and when step #1330 finds the first timer CTR1 expired, that is a first stage of the flash popping operation has completed leaving only an after-run.

At step #1350, the second timer CTR2 is reset. Next, at step #1352, the first timer CTR1 is reset. Thereafter, at step #1354, the two motor control signals MOUT1 and MOUT2 are both set to high level for stopping the pop motor 792. At step #1356, the popping state signal INPOP is set to "1" indicating that the flash popping operation is not taking place, and the two state signals SMOFF and POPEN are both set to "1". At step #1358, the popping flag POPB is reset to "0" indicating a standstill state. Thereafter, at step #1390, the program jumps to the loop routine "LOOP".

If, on the other hand, step #1328 finds the operating switch FS1 open and the flash pop-down incomplete, the program moves to a flash pop-down routine beginning with step #1360 for moving the light emitter 7A to the contained position.

At step #1360, popping state signal INPOP is reset to "0" indicating that the flash popping operation is taking place. At step #1362, the first timer CTR1 is reset. At step #1364, the popping enable signal POPEN is checked. If the popping enable signal POPEN is set to "1" indicating that the flash popping is impossible, the program jumps at step #1390 to the loop routine "LOOP". If the popping enable signal POPEN is reset to "0" indicating that the flash popping is possible, a pop-down drive signal is output at step #1366 with the first motor control signal MOUT1 in high level and the second motor control signal MOUT2 in low level. At step #1368, the popping flag POPB is set to "2" indicating that the flash pop-down is taking place. Then, at step #1390, the program jumps to the loop routine "LOOP".

Further, if step #1326 finds the operating switch FSW1 closed and the flash pop-up incomplete, the program moves to a flash pop-up routine beginning with step #1370 in order to move the light emitter 7A to the projecting position.

At step #1370, popping state signal INPOP is reset to "0" indicating that the flash popping operation is taking place. At step #1372, the first timer CTR1 is reset. At step #1374, the popping enable signal POPEN is checked. If the popping enable signal POPEN is set to "1" indicating that the flash popping is impossible, the program jumps at step #1390 to the loop routine "LOOP". If the popping enable signal POPEN is reset to "0" indicating that the flash popping is possible, a pop-up drive signal is output at step #1376 with the first motor control signal MOUT1 in low level and the second motor control signal MOUT2 in high level. At step #1378, the popping flag POPB is set to "1" indicating that the flash pop-up is taking place. Then, at step #1390, the program jumps to the loop routine "LOOP".

Figure 32A:
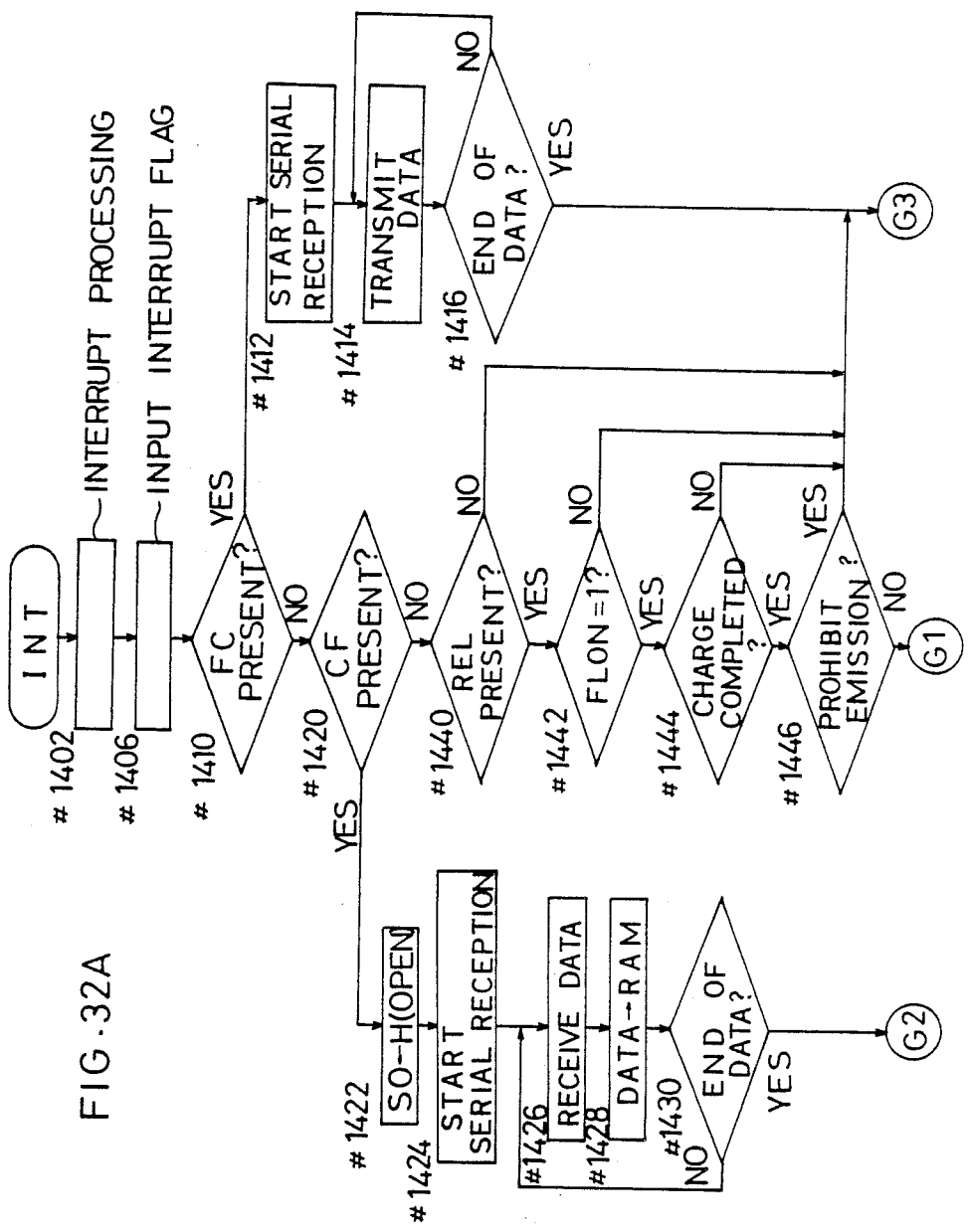
Figure 32B:
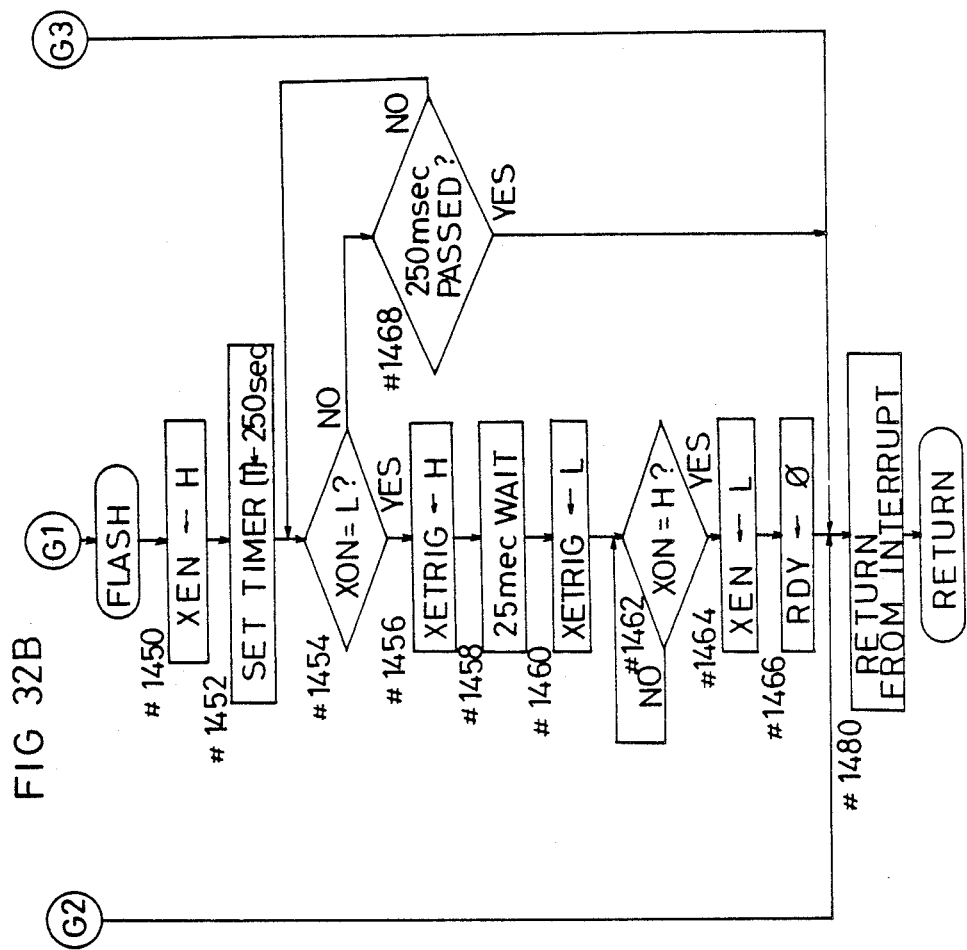

FIGS. 32A and 32B show a flow chart of the interrupt routine executed when an interrupt is caused by the clock signal input from the body CPU 200 during the loop routine "LOOP" or pop routine "POPCONT".

In this routine, an interrupt process is first carried out at step #1402 for prohibiting the interrupts and storing the contents of the register. At step #1404 the interrupt flags are input. Thereafter, at steps #1410, #1420 and #1440, the type of interrupt is judgest from the continuation period of the interrupt flags.

If step #1410 finds the interrupt flag FC, this indicates start of the serial communication from the flash CPU 710 to the body CPU 200. At step #1412, the clock signal begins to be accepted for enabling the serial communication. At step #1414, the data are transmitted synchronously with the clock signal. At step #1416, checking is made whether the data transmission has completed or not. The data transmission is repeated till completion. When the data transmission is completed, the program moves to step #1480.

If step #1420 finds the interrupt flag CF, this indicates start of the serial communication from the body CPU 200 to the flash CPU 710. At step #1422, the output SO from the output terminal 711 of the flash CPU 710 is changed to high level to allow the signal from the input terminal 712 to input since the signal line L5 is shared between the output terminal 711 and the input terminal 712. Thereafter, at step #1424, the clock signal begins to be accepted for enabling the serial communication. At step #1426, the data are received synchronously with the clock signal. At step #1428, the data are stored in the RAM. At step #1430, checking is made whether the data reception has completed or not. Steps #1426–#1428 are repeated till completion. When the data reception is completed, the program moves to step #1480.

Further, if step #1440 finds the interrupt flag REL, this indicates start of the shutter releasing operation. Then, at step #1442, the flash on/off signal FLON is checked. At step #1444, checking is made whether the charging of the main capacitor 782 has completed or not. At step #1446, checking is made whether a state in which the flash emission is prohibited is established by the body CPU 200. The program moves to the flash routine "FLASH" only when the flash on/off signal FLON is set to "1", the charging is completed, and the prohibit state is off. Otherwise, the program moves to step #1480.

In the flash routine "FLASH", the output signal XEN is first changed to high level at step #1450 for enabling detection of the closing signal of the X-contact switch 180. The expiration time of the timer is set to 250 ms at step #1452. Then checking is made at step #1454 whether the X-contact switch 180 is closed or not.

If the X-contact switch 180 is not closed, the timer is checked at step #1468 whether the 250 ms have elapsed or not. Until the 250 ms elapse, the program repeats routine of step #1454 to step #1468 to wait for the closure of the X-contact switch 180. Upon lapse of the 250 ms, the program moves to step #1480.

If step #1454 finds the X-contact switch 180 closed, the flash control signal XETRIG is changed to high level at step #1456 for starting the falsh emission. After waiting for 2.5 ms at step #1458, the flash control signal XETRIG is changed to low level for stopping the flash emission. Thereafter the program waits at step #1462 until the X-contact switch 180 is opened, namely until the shutter charging is completed. When the X-contact switch 180 is opened, the output signal XEN is returned to low level at step #1464. After resetting the flash charge signal RDY to "0" representing the charging incomplete state, the program moves to step #1480.

At step #1480, processing is carried out for a return from the interrupt routine by returning the stored contents to the register again and permitting the interrupts. Thereafter, the program returns to the routine from which the interrupt routine started.

Modified embodiments of the present invention are set out hereunder.

(1) In the foregoing embodiment, the flash unit 7 is removably attached to the camera body. The present invention is applicable also to the type of camera having a flash unit 7 fixed to or contained in the camera body 1.

(2) The drive mechanism DM may have varied specific constructions. Instead of the described construction, the drive mechanism may include a rack and pinion device for transmitting the drive of the pop motor 16. A solenoid system may be employed instead of the combination of the pop motor 16 and the gear. Further, the drive mechanism DM in the foregoing embodiment and in the above modifications carries out the projecting and retracting operation solely by means of the drive of the motor or the like. This construction may be modified by employing a spring for urging the light emitter 7A toward the projecting position, an engaging mechanism for maintaining the light emitter 7A in the contained position within the flash unit body 7B against the force of the spring, and a release mechanism for undoing the engaging mechanism. In this case, the light emitter 7A in the projecting position is retracted to the contained position by the user pressing it down, while the light emitter 7A in the contained position is projected by operating the release mechanism through the body CPU 200 in response to turning on of the main switch 12. Further, the construction for moving the light emitter 7A from the projecting position to the contained position may be selected as desired, which may be independent of the construction for moving the light emitter 7A from the contained position to the projecting position.

(3) Where the flash unit 7 is removably attached to the camera body 1, the flash unit 7 may have its own source battery instead of being powered by the source battery 130 in the camera body.

(4) The starter switch serves the purpose if it switches the camera between a prohibit state and a permit state of the actual photograph-taking operation. For example, the starter switch may comprise a power source switch for turning on and off the power supply from the power source to the operating system of the camera.

(5) In the foregoing embodiment, the X-contact SWx is disposed between the signal line L4 and the grounding line. Instead, the X-contact SWx may be disposed between the signal line L4 and the power source line. In this case, the flash CPU 710 acting as the voltage applying means maintains the output signal XEN in low level, i.e. pulls it down, during the exposure control.

(6) One or both of the charging prohibit means and voltage applying means may be disposed in the camera body 1.

(7) In the foregoing embodiment, the group of contacts 101-107 and 701-707 are arranged on the hot shoe 1B and foot 7C for communicating signals between the camera body 1 and flash unit 7. Instead, all or part of the contacts 101-107 and 701-707 may be arranged separately from the hot shoe 1B and foot 7C.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera system having a flash device with a light emitter and a capacitor for accumulating energy necessary for emission from the light emitter, and a camera body to which the flash device is detachably attached, said camera system comprising:
   a synchronizing switch, provided in said camera body, for outputting a first signal to cause emission from the light emitter in response to completion of a leading blade run of a focal plane shutter;
   a contact disposed between said flash device and said camera body and connected to said synchronizing switch for communicating said first signal and a second signal from said camera body to said flash device;
   charging means, provided in said flash device, for charging said capacitor in response to said second signal; and
   charge prohibiting means, provided in said flash device, for prohibiting charging operation of said capacitor during an exposure control operation.

2. A camera system as claimed in claim 1, further comprising:
   control means, provided in said camera body, for outputting said second signal intermittently to said flash device until the exposure control operation begins;
   wherein said charging means charges said capacitor intermittently in response to said second signal.

3. A camera system as claimed in claim 2, further comprising:
   timer means, provided in said camera body, for alternately counting a first predetermined period and a second predetermined period, which is shorter than the first predetermined period;
   wherein said control means outputs said second signal during said first predetermined period and does not output said second signal during said second predetermined period.

4. A camera system as claimed in claim 3, further comprising:
   a power source, provided in said camera body, for supplying electrical power to said flash device and said camera body; and
   a microcomputer for inputting said first signal and controlling said charge prohibiting means;
   wherein said microcomputer is supplied said electrical power during said second predetermined period and is not supplied said electrical power during said first predetermined period.

5. A camera system as claimed in claim 1, further comprising:
   voltage applying means for applying a potential difference between opposite ends of said synchronizing switch, from said flash device through said contact during the exposure operation.

6. A camera system having a flash device with a light emitter and a capacitor for accumulating energy necessary for emission from the light emitter, and a camera body to which the flash device is detachably attached, said camera system comprising:
   a synchronizing switch, provided in said camera body, for outputting a first signal to cause emission from the light emitter in response to completion of a leading blade run of a focal plane shutter;
   a contact disposed between said flash device and said camera body and connected to said synchronizing switch for communicating said first signal and a second signal from said camera body to said flash device; and
   charging means, provided in said flash device, for charging said capacitor in response to said second signal.

7. A camera system as claimed in claim 6, further comprising:
   control means, provided in said camera body, for outputting said second signal intermittently to said flash device until the exposure control operation begins;
   wherein said charging means charges said capacitor intermittently in response to said second signal.

8. A camera system as claimed in claim 7, further comprising:
   timer means, provided in said camera body, for alternately counting a first predetermined period and a second predetermined period, which is shorter than the first predetermined period;
   wherein said control means outputs said second signal during said first predetermined period and does not output said second signal during said second predetermined period.

9. A camera system as claimed in claim 8, further comprising:
  a power source, provided in said camera body, for supplying electrical power to said flash device and said camera body; and
  a microcomputer for inputting said first signal and controlling said charge prohibiting means;
  wherein said microcomputer is supplied said electrical power during said second predetermined period and is not supplied said electrical power during said first predetermined period.

10. A camera system as claimed in claim 6, further comprising:
  voltage applying means for applying a potential difference between opposite ends of said synchronizing switch, from said flash device through said contact during the exposure operation.

11. A camera system having a flash device with a light emitter and a capacitor for accumulating energy necessary for emission from the light emitter, and a camera body to which the flash device is detachably attached, said camera system comprising:
  charging means, provided in said flash device, for charging said capacitor;
  a power source, provided in said camera body, for supplying electrical power to said flash device for charging operation of said charging means; and
  charge prohibiting means, provided in said flash device, for prohibiting charging operation of said capacitor during an exposure control operation.

* * * * *